United States Patent
Rappaport

(10) Patent No.: US 10,623,468 B1
(45) Date of Patent: Apr. 14, 2020

(54) SYSTEMS AND METHODS FOR SIMULTANEOUS ELECTRONIC FILE EXCHANGE

(71) Applicant: Matthew B. Rappaport, Austin, TX (US)

(72) Inventor: Matthew B. Rappaport, Austin, TX (US)

(73) Assignee: MBR Innovations LLC, Austin, TX (US)

( * ) Notice: Subject to any disclaimer, the term of this patent is extended or adjusted under 35 U.S.C. 154(b) by 562 days.

(21) Appl. No.: 14/717,049

(22) Filed: May 20, 2015

Related U.S. Application Data

(60) Provisional application No. 62/005,986, filed on May 30, 2014, provisional application No. 62/026,491, filed on Jul. 18, 2014, provisional application No. 62/029,302, filed on Jul. 25, 2014.

(51) Int. Cl.
*H04L 9/00* (2006.01)
*H04L 29/08* (2006.01)

(52) U.S. Cl.
CPC .......... *H04L 67/06* (2013.01); *H04L 67/1097* (2013.01)

(58) Field of Classification Search
CPC ............................ H04L 67/06; H04L 67/1097
See application file for complete search history.

(56) References Cited

U.S. PATENT DOCUMENTS

| | | | |
|---|---|---|---|
| 4,397,455 A | 8/1983 | Hickey | |
| 4,885,777 A | 12/1989 | Takaragi et al. | |
| 5,170,412 A | 12/1992 | Massey | |
| 5,553,145 A | 9/1996 | Micali | |
| 5,629,982 A | 5/1997 | Micali | |
| 5,666,420 A | 9/1997 | Micali | |
| 6,055,518 A | 4/2000 | Franklin et al. | |
| 6,061,792 A * | 5/2000 | Simon ................ | G06Q 20/3821 705/76 |
| 6,134,326 A | 10/2000 | Micali | |
| 6,137,884 A | 10/2000 | Micali | |
| 6,141,750 A * | 10/2000 | Micali ................ | G06Q 20/00 713/168 |
| 6,145,079 A | 11/2000 | Mitty et al. | |
| 6,263,436 B1 * | 7/2001 | Franklin ............. | G06Q 20/02 713/167 |
| 6,629,082 B1 | 9/2003 | Hambrecht et al. | |
| 7,031,972 B2 | 4/2006 | Ren et al. | |

(Continued)

FOREIGN PATENT DOCUMENTS

| | | | |
|---|---|---|---|
| WO | 9827688 A2 | 6/1998 | |
| WO | 0207376 A1 | 1/2002 | |

OTHER PUBLICATIONS

PipeBytes FAQ, available at http://host03.pipebytes.com/faq.html (retrieved Jun. 18, 2014).

(Continued)

*Primary Examiner* — Philip J Chea
*Assistant Examiner* — Wuji Chen
(74) *Attorney, Agent, or Firm* — W&C IP

(57) ABSTRACT

Generally systems and methods for simultaneous file exchange are disclosed. In some embodiments systems and methods for the simultaneous exchange of electronic files are disclosed, wherein the systems and methods employ one or more storage object, and wherein one or more entities are associated with the one or more storage object.

22 Claims, 44 Drawing Sheets

(56) References Cited

U.S. PATENT DOCUMENTS

| | | | |
|---|---|---|---|
| 7,143,290 B1* | 11/2006 | Ginter | G06F 21/10 |
| | | | 713/176 |
| 7,171,559 B1* | 1/2007 | Bao | H04L 9/3013 |
| | | | 713/169 |
| 7,281,133 B2 | 10/2007 | Ginter et al. | |
| 7,707,118 B2 | 4/2010 | James | |
| 7,801,826 B2 | 9/2010 | Labrou et al. | |
| 8,401,960 B2 | 3/2013 | Pinson | |
| 8,548,864 B2 | 10/2013 | Bhogal et al. | |
| 8,677,460 B2 | 3/2014 | Haff et al. | |
| 8,718,283 B2 | 5/2014 | Whyte | |
| 2002/0026321 A1 | 2/2002 | Faris et al. | |
| 2002/0156895 A1* | 10/2002 | Brown | G06Q 10/00 |
| | | | 709/226 |
| 2003/0074330 A1 | 4/2003 | Asokan et al. | |
| 2004/0073790 A1* | 4/2004 | Ateniese | G06F 21/606 |
| | | | 713/165 |
| 2005/0228754 A1* | 10/2005 | Pezzaniti | G06Q 20/382 |
| | | | 705/64 |
| 2006/0085314 A1* | 4/2006 | Grim, III | G06Q 30/02 |
| | | | 705/35 |
| 2006/0095514 A1* | 5/2006 | Wang | G06Q 10/107 |
| | | | 709/204 |
| 2007/0005707 A1* | 1/2007 | Teodosiu | G06Q 10/107 |
| | | | 709/206 |
| 2007/0214284 A1* | 9/2007 | King | G06Q 40/04 |
| | | | 709/245 |
| 2007/0282951 A1* | 12/2007 | Selimis | H04L 67/06 |
| | | | 709/205 |
| 2008/0010116 A1 | 1/2008 | Hersey | |
| 2008/0114767 A1* | 5/2008 | Garbow | H04L 67/06 |
| 2008/0133396 A1 | 6/2008 | De La Motte | |
| 2008/0235319 A1* | 9/2008 | Zargham | G06F 16/258 |
| | | | 709/201 |
| 2008/0262956 A1 | 10/2008 | De La Motte | |
| 2009/0037327 A1* | 2/2009 | Rosca | G06Q 20/10 |
| | | | 705/39 |
| 2009/0075696 A1* | 3/2009 | Kanapur | G06Q 30/0207 |
| | | | 455/557 |
| 2009/0113006 A1 | 4/2009 | McWana | |
| 2012/0101952 A1* | 4/2012 | Raleigh | G06Q 30/016 |
| | | | 705/304 |
| 2012/0215684 A1* | 8/2012 | Kidron | G06F 15/167 |
| | | | 705/39 |
| 2012/0221944 A1 | 8/2012 | Bloomfield et al. | |
| 2012/0296756 A1* | 11/2012 | Shah | G06Q 30/00 |
| | | | 705/26.2 |
| 2012/0297451 A1* | 11/2012 | Ozzie | H04L 63/08 |
| | | | 726/3 |
| 2013/0091172 A1* | 4/2013 | Kelesis | G06F 21/6218 |
| | | | 707/785 |
| 2013/0318589 A1* | 11/2013 | Ford | H04L 63/08 |
| | | | 726/7 |
| 2013/0321912 A1* | 12/2013 | Igler | G02B 27/2214 |
| | | | 359/463 |
| 2014/0067929 A1* | 3/2014 | Kirigin | H04L 67/06 |
| | | | 709/204 |
| 2014/0108956 A1* | 4/2014 | Varenhorst | G06F 3/04842 |
| | | | 715/748 |
| 2014/0122592 A1* | 5/2014 | Houston | H04L 67/1095 |
| | | | 709/204 |
| 2014/0165176 A1* | 6/2014 | Ow | H04L 63/10 |
| | | | 726/8 |
| 2015/0032840 A1* | 1/2015 | Daly, Jr. | H04L 67/1097 |
| | | | 709/216 |
| 2015/0269392 A1* | 9/2015 | Lauder | G06F 21/6245 |
| | | | 726/30 |
| 2016/0026815 A1* | 1/2016 | Staley | G06F 21/6218 |
| | | | 707/785 |
| 2017/0041296 A1* | 2/2017 | Ford | G06F 16/951 |

OTHER PUBLICATIONS

Zeta Uploader, available at www.zetauploader.com (retrieved Jun. 18, 2014).

"How to simultaneously exchange information", Ask.Metafilter.com, Oct. 26, 2009, available at http://ask.metafilter.com/136502/How-to-simultaneously-exchange-information (retrieved Jun. 18, 2014).

Gilles Brassard, David Chaum, and Claude Crepeau, Minimum Disclosure Proofs of Knowledge, Journal of Computer and System Sciences, vol. 37, pp. 156-189, 1988.

Manuel Blum, Coin Flipping by Telephone, Proceedings of CRYPTO 1981, pp. 11-15, 1981, reprinted in SIGACT News vol. 15, pp. 23-27, 1983, available at http://www.cs.cmu.edu/~mblum/research/pdf/coin/.

Time Cave: Future Email Scheduling and Reminders, available at http://www.timecave.com/timecave/about.jsp (retrieved Jun. 18, 2014).

Michael Iachini, "Design Diary: Mansion Builder chapter 2—Auction Systems", Mar. 20 , 2014, available at http://claycrucible.com/2014/03/designer-diary-mansion-builder-chapter-2-auction-methods/ (retrieved Jun. 18, 2014).

David Easley and Jon Kleinberg, Networks, Crowds, and Markets: "Reasoning about a Highly Connected World", Cambridge University Press, 2010, available at http://www.cs.cornell.edu/home/kleinber/networks-book/.

Engelbrecht-Wiggans, Richard and Katok, Elena, "Regret and Feedback Information in First-Price Sealed-Bid Auctions", Article submitted to Management Science; MS-00574-2006-R2, revised Jun. 26, 2007, available at http://www.utdallas.edu/~emk120030/regret_post.pdf.

David Cohen, "Report: 'Slingshot' Video-Sharing App May Be Facebook's Answer to Snapchat", May 19, 2014 available at http://allfacebook.com/slingshot_b131799 (retrieved Jul. 9, 2014).

Tim Wortstall, "Snapchat's Possibly Ghastly Mistake In Rebuffing Facebook; Here Comes Slingshot", May 29, 2014 available at http://www.forbes.com/sites/timworstall/2014/05/19/snapchats-possibly-ghastly-mistake-in-rebuffing-facebook-here-comes-slingshot/ (retrieved Jul. 9, 2014).

Zach Honig, "Facebook may launch 'Slingshot' Snapchat competitor this month", May 18, 2014 available at http://www.engadget.com/2014/05/18/facebook-slingshot/ (retrieved July 9, 2014).

David Murphy, "Rumor: Facebook Working on New Snapchat-Like App, 'Slingshot'", May 18, 2014 available at http://www.pcmag.com/article2/0,2817,2458208,00.asp (retrieved Jul. 9, 2014).

Todd Wasserman, "Report: Facebook Working on Another Snapchat Competitor, Slingshot", May 19, 2014 available at http://mashable.com/2014/05/19/facebook-snapchat-slingshot/ (retrieved Jul. 9, 2014).

Paul Heckel, "A Technique for Isolating Differences Between Files", Communications of the ACM 21: 264-268, Apr. 1978, available at http://documents.scribd.com/docs/10ro9oowpo1h81pgh1as.pdf, (retrieved Jul. 17, 2014).

Ben—Or et al., "A Fair Protocol for Signing Contracts," IEEE Transactions on Information Theory, v. 36 n. 1, pp. 40-46 (Jan. 1990).

Ashokan, N. et al., "Optimistic Fair Exchange of Digital Signatures" IEEE Journal on Selected Areas in Communications, vol. 18, Issue: 4, Apr., 2000 pp. 593-610.

Choi, S. G. et al. "Two-Party Computing with Encrypted Data" ASIACRYPT 2007, LNCS 4833, pp. 298-314, 2007.

De Santis, A., et al. "Secret Sharing and Perfect Zero-Knowledge" Proc. of Crypto 93, Sprionger Verlag LNCS series.

Naor, M. et al., "Privacy Preserving Auctions and Mechanism Design" Proceedings of the 1st ACM conf. on Electronic Commerce, Nov. 1999.

Hogan, C. And Bauer, R, "Privacy Classification Systems: Recall and Precision Optimization as Enabler of Trusted Information Sharing" AAAI Publications, 2010 AAAI Spring Symposium Series, Mar. 23, 2010.

(56) References Cited

OTHER PUBLICATIONS

Yao, A.C., "How to Generate and Exchange Secrets" Proc. 27th Annual Symposium on Foundations of Computer Science, Institute of Electrical and Electronics Engineers Computer Society Press, Los Alamitos, 1986, pp. 162-167.

Blumenthal, M.A. "Auctions with constrained information: blind bidding for motion pictures" The Review of Economics and Statistics, 1988.

Ray, Indrajit and Ray, Indrakshi, "Fair Exchange in E-commerce", ACM SIGecom Exchange, vol. 3, No. 2, May 2002, pp. 9-17, available at http://www.cs.odu.edu/~mukka/cs772s04/slides/Fairexchange.pdf (retrieved Jun. 13, 2014).

* cited by examiner

700

Create a Storage Object Screen 702

Select Storage Object Name: [ _ _ _ _ _ _ _ _ _ ] 704

Select Storage Object Type: Unlock at Specific Time [ _ ]
Unlock After Parties Have Uploaded [ _ ]
Unlock At or After Specific Time Once Parties Have Uploaded [ _ ] 706
Unlock At Specific Time if Parties Have Uploaded [ _ ]

Require Confirmation Before Unlock? Yes [ _ ] No [ _ ] 707

Select Unlock Date: [ _ _ _ _ _ _ _ _ _ ] 708

Invite Contributors: [ _ _ _ _ _ _ _ _ _ ] 710

Invite Non-Contributors: [ _ _ _ _ _ _ _ _ _ ] 711

Create Storage Object 712

Storage Object List 1002

1) Storage Object Name: FirstTestStorageObject 1004

Storage Object ID: 082562 1005

Storage Object Type: Unlock at Specific Time 1006

Creation Date: May 25, 2014 1007

Unlock Date: October 21, 2015 1008

Storage Object Status: Locked 1009

Contributors Invited: FriendOne@SomeOtherBusiness.com 1010

[ Go To Storage Object Detail Page 1003 ]

2) Storage Object Name: SecondTestStorageObject 1014

Storage Object ID: 070984 1015

Storage Object Type: Unlock After Parties Have Uploaded 1016

Creation Date: May 26, 2014 1017

Unlock Date: N/A 1018

Storage Object Status: Unlocked 1019

Contributors Invited: FriendTwo@NeighborhoodBusiness.com, FriendThree@LawFirm.com 1020

[ Go To Storage Object Detail Page 1013 ]

To: FriendOne@SomeOtherBusiness.com 1304

From: StorageObjectAnnoucements@StorageObjectWebsite.com 1306

Subject: You are invited to participate in a Storage Object 1308

Dear FriendOne@SomeOtherBusiness.com,

YourEmailAddress@YourEmail.com has invited you to contribute to the storage object FirstTestStorageObject.
To access the storage object click here.

Thank you,

Storage Object Website Administration 1310

Fig. 13

| Contributor A 2302A | Contributor B 2302B | System 2302C |
|---|---|---|
| (08:00) Submit request to create storage object 2304A | (08:00) | (08:00) Receive request to create storage object and create storage object 2304C |
| (09:00) Submit request to invite Contributor B to storage object 2306A | (09:00) Receive invitation to storage object 2306B | (09:00) Receive request to invite Contributor B to storage object and invite Contributor B to storage object 2306C |
| (10:00) | (10:00) | (10:00) |
| (11:00) | (11:00) | (11:00) |
| (12:00) | (12:00) | (12:00) |

Fig. 23

| Contributor A 2802A | Contributor B 2802B | System 2802C |
|---|---|---|
| (08:00) Submit request to create storage object where exchange is to occur once both parties make contributions and where exchange occurs at or after 11:00 2804A | (08:00) | (08:00) Create storage object where exchange is to occur once both parties make contributions and where exchange occurs at or after 11:00 2804C |
| (09:00) Make file contribution to storage object 2806A | (09:00) | (09:00) |
| (10:00) | (10:00) Make file contribution to storage object 2808B | (10:00) |
| (11:00) | (11:00) | (11:00) Perform simultaneous file exchange by providing contributions made to storage object to both parties 2810C |
| (12:00) | (12:00) | (12:00) |

Fig. 28

| Contributor A 2902A | Contributor B 2902B | System 2902C |
|---|---|---|
| (08:00) Submit request to create storage object where exchange is to occur once both parties make contributions and where exchange occurs at or after 11:00 2904A | (08:00) | (08:00) Create storage object with exchange to occur once both parties make contributions and where exchange occurs at or after 11:00 2904C |
| (09:00) Make file contribution to storage object 2906A | (09:00) | (09:00) |
| (10:00) | (10:00) | (10:00) |
| (11:00) | (11:00) | (11:00) |
| (12:00) | (12:00) Make file contribution to storage object 2908B | (12:00) Perform simultaneous file exchange by providing contributions made to storage object to both parties 2908C |

Fig. 29

| Contributor A 3002A | Contributor B 3002B | System 3002C |
|---|---|---|
| (08:00) Submit request to create storage object where exchange is to occur once both parties make contributions 3004A | (08:00) | (08:00) Create storage object with exchange to occur once both parties make contributions 3004C |
| (09:00) Make file contribution to storage object 3006A | (09:00) | (09:00) |
| (10:00) | (10:00) Make file contribution to storage object 3008B | (10:00) Perform simultaneous file exchange by providing contributions made to storage object to both parties 3008C |
| (11:00) | (11:00) | (11:00) |
| (12:00) | (12:00) | (12:00) |

Fig. 30

| Contributor A 3102A | Contributor B 3102B | System 3102C |
|---|---|---|
| (08:00) Submit request to create storage object where exchange is to occur once both parties make contributions 3104A | (08:00) | (08:00) Create storage object with exchange to occur once both parties make contributions 3104C |
| (09:00) Make file contribution to storage object 3106A | (09:00) | (09:00) |
| (10:00) | (10:00) | (10:00) |
| (11:00) | (11:00) | (11:00) |
| (12:00) | (12:00) Make file contribution to storage object 3108B | (12:00) Perform simultaneous file exchange by providing contributions made to storage object to both parties 3108C |

Fig. 31

| Contributor A 3202A | Contributor B 3202B | System 3202C |
|---|---|---|
| (08:00) Submit request to create storage object where exchange is to occur once both parties make contributions, once both parties confirm, and where exchange occurs at or after 11:00 3204A | (08:00) | (08:00) Create storage object where exchange is to occur once both parties make contributions, once both parties confirm, and where exchange occurs at or after 11:00 3204C |
| (09:00) Make file contribution to storage object 3206A | (09:00) | (09:00) |
| (10:00) Confirm contribution has been made 3208A | (10:00) Make file contribution to storage object and confirm contribution has been made 3208B | (10:00) |
| (11:00) | (11:00) | (11:00) Perform simultaneous file exchange by providing contributions made to storage object to both parties 3210C |
| (12:00) | (12:00) | (12:00) |

Fig. 32

| Contributor A 3302A | Contributor B 3302B | System 3302C |
|---|---|---|
| (08:00) Submit request to create storage object where exchange is to occur once both parties make contributions, once both parties confirm, and where exchange occurs at or after 11:00 3304A | (08:00) | (08:00) Create storage object with exchange to occur once once both parties make contributions, once both parties confirm, and where exchange occurs at or after 11:00 3304C |
| (09:00) Make file contribution to storage object 3306A | (09:00) | (09:00) |
| (10:00) Confirm contribution has been made 3308A | (10:00) | (10:00) |
| (11:00) | (11:00) | (11:00) |
| (12:00) | (12:00) Make file contribution to storage object and confirm contribution has been made 3310B | (12:00) Perform simultaneous file exchange by providing contributions made to storage object to both parties 3310C |

Fig. 33

| Contributor A 3402A | Contributor B 3402B | System 3402C |
|---|---|---|
| (08:00) Submit request to create storage object where exchange is to occur once both parties make contributions and once both parties confirm 3404A | (08:00) | (08:00) Create storage object with exchange to occur once both parties make contributions once both parties confirm 3404C |
| (09:00) Make file contribution to storage object 3406A | (09:00) | (09:00) |
| (10:00) Confirm contribution has been made 3408A | (10:00) Make file contribution to storage object 3408B | (10:00) |
| (11:00) | (11:00) Confirm contribution has been made 3410B | (11:00) Perform exchange by providing contributions made to storage object to both parties 3410C |
| (12:00) | (12:00) | (12:00) |

Fig. 34

| Contributor A 3502A | Contributor B 3502B | System 3502C |
|---|---|---|
| (08:00) Submit request to create storage object where exchange is to occur once both parties make contributions and once both parties confirm 3504A | (08:00) | (08:00) Create storage object with exchange to occur once both parties make contributions and once both parties confirm 3504C |
| (09:00) Make file contribution to storage object 3506A | (09:00) | (09:00) |
| (10:00) | (10:00) | (10:00) |
| (11:00) Confirm contribution has been made 3508A | (11:00) | (11:00) |
| (12:00) | (12:00) Make file contribution to storage object and confirm contribution has been made 3510B | (12:00) Perform exchange by providing contributions made to storage object to both parties 3510C |

Fig. 35

| Contributor A 4102A | Contributor B 4102B | System 4102C |
|---|---|---|
| (08:00) Provide acceptable spread of "less than $50" 4104A | (08:00) | (08:00) Receive acceptable spread of "less than $50" 4104C |
| (09:00) Make file contribution to storage object with value of $275 4106A | (09:00) | (09:00) Receive file contribution from Contributor A with value of $275 4106C |
| (10:00) | (10:00) Make file contribution to storage object with value of $200 4108B | (10:00) Receive file contribution from Contributor B with value of $200, determine values do not satisfy spread, and do not allow storage object to change state 4108C |
| (11:00) | (11:00) | (11:00) |
| (12:00) | (12:00) | (12:00) |

Fig. 41

| Contributor A 4202A | Contributor B 4202B | System 4202C |
|---|---|---|
| (08:00) Provide acceptable spread of "less than $50" 4204A | (08:00) | (08:00) Receive acceptable spread of "less than $50" 4204C |
| (09:00) Make file contribution to storage object with value of $275 4206A | (09:00) | (09:00) Receive file contribution from Contributor A with value of $275 4206A |
| (10:00) | (10:00) Make file contribution to storage object with value of $250 4208B | (10:00) Receive file contribution from Contributor B with value of $250, determine values satisfy spread, and allow storage object to change state 4208C |
| (11:00) | (11:00) | (11:00) |
| (12:00) | (12:00) | (12:00) |

Fig. 42

| Contributor A 4302A | Contributor B 4302B | System 4302C |
|---|---|---|
| (08:00) Provide acceptable spread of "greater than $50" 4304A | (08:00) | (08:00) Receive acceptable spread of "greater than $50" 4304C |
| (09:00) Make file contribution to storage object with value of $275 4306A | (09:00) | (09:00) Receive file contribution from Contributor A with value of $275 4306C |
| (10:00) | (10:00) Make file contribution to storage object with value of $200 4308B | (10:00) Receive file contribution from Contributor B with value of $200, determine values satisfy spread, and allow storage object to change state 4308C |
| (11:00) | (11:00) | (11:00) |
| (12:00) | (12:00) | (12:00) |

Fig. 43

| Contributor A 4402A | Contributor B 4402B | System 4402C |
|---|---|---|
| (08:00) Provide acceptable spread of "greater than $50" 4404A | (08:00) | (08:00) Receive acceptable spread of "greater than $50" 4404C |
| (09:00) Make file contribution to storage object with value of $275 4406A | (09:00) | (09:00) Receive file contribution from Contributor A with value of $275 4406A |
| (10:00) | (10:00) Make file contribution to storage object with value of $250 4408B | (10:00) Receive file contribution from Contributor B with value of $250, determine values do not satisfy spread, and do not allow storage object to change state 4408C |
| (11:00) | (11:00) | (11:00) |
| (12:00) | (12:00) | (12:00) |

Fig. 44

SYSTEMS AND METHODS FOR SIMULTANEOUS ELECTRONIC FILE EXCHANGE

CROSS-REFERENCE TO RELATED APPLICATIONS

This application claims priority to U.S. Provisional Application No. 62/005,986 filed May 30, 2014, U.S. Provisional Application No. 62/026,491 filed Jul. 18, 2014, and U.S. Provisional Application No. 62/029,302 filed Jul. 25, 2014. All three provisional applications are herein incorporated by reference.

FIELD OF THE INVENTION

The invention generally relates to systems and methods for exchanging electronic files through computer networking.

BACKGROUND

Parties need to perform or desire to perform a simultaneous electronic file exchange in a variety of situations. For example, sometimes parties seek to exchange electronic files simultaneously in the course of negotiations, where no party wishes to be disadvantaged by providing their file (and the information therein) before another party. As a further example, sometimes parties seek to exchange electronic files simultaneously with one another when the exchange is compelled by an authority, such as a judge. As a further example, sometimes two parties seek to exchange electronic files simultaneously when each party wants information from the other party, but no party is willing to provide their file first (e.g., due to doubts that the other party will provide their file, due to fear that the other party will alter their file if they have the opportunity to incorporate information garnered from the file they receive, etc.).

However, attempting a simultaneous exchange of electronic files using prior systems and methods brings about risks of both undesirable outcomes and inefficiencies.

For example, using email, parties can agree ahead of time to disclose their files to one another by sending emails containing the files to be exchanged to one another at a certain agreed time (e.g., 7:00 pm on a certain day). Likewise, as a further example, using a shared network service (e.g., Dropbox, Google Drive, an ftp site, etc.), parties can agree ahead of time to disclose their files to one another by both providing the files to be exchanged to the shared network service at a certain agreed time (e.g., 7:00 pm on a certain day).

When using email, shared network services, and other prior systems and methods to attempt a simultaneous file exchange, a party risks that they will provide their file at the agreed time, and the other party will not provide their file. In such a situation the disclosing party is disadvantaged in that they provided their file (and the information contained therein) and received nothing in return. Moreover, the disclosing party may feel taken advantage of because they expected the non-disclosing party to have provided their file at the agreed time. Such sentiments may exist regardless of the intention of the non-disclosing party.

When using email, shared network service, and other prior art systems and methods to attempt a simultaneous file exchange, a party also risks that they will provide their file at the agreed time, only to find that the other party provides their file at a later time. In such a situation the first-disclosing party is disadvantaged if the second-disclosing party created or modified the file that they sent to the first-disclosing party with knowledge from the file provided by the first-disclosing party. The first-disclosing party's awareness of the possibility of the second-disclosing party creating or modifying the file that they sent to the first-disclosing party with knowledge from the file provided by the first-disclosing party can lead the first-disclosing party to feel taken advantage of. Moreover, the first disclosing party may feel taken advantage of because they expected the second-disclosing party to have provided their file at the agreed time. Such sentiments may exist regardless of the intention of the second-disclosing party.

When a simultaneous file exchange is attempted using prior art systems and methods the risk that one party will disclose their file and the other will not, as well as the risk that one party will disclose their file after the other, is enhanced by the extent to which human involvement is required in the process of providing files at the time the parties have agreed. For example, where a human needs to perform the action of sending an email or providing a file to a shared network service at an agreed upon time, forgetfulness, emergency situations, or physical inaccessibility to a computer or a network connection may lead the person to fail to provide their file at the agreed time. Furthermore, humans can misremember times or fail to understand the time that an agreed simultaneous exchange was to take place. Moreover, humans are prone to bungle time conversions, such as time zone conversions, daylight savings time conversions, conversions between twenty-four hour notation and AM/PM notations, etc. which can throw off the timing of what was to be a simultaneous file exchange. Moreover, humans can misread clocks, use misaligned clocks, use broken clocks, etc. which can also throw off the timing of what was to be a simultaneous file exchange.

Another risk taken by a party when they use email, shared network service, and other prior art systems and methods to attempt a simultaneous file exchange is that the party will provide their file to the other party, where the file they provide contains the type of information the other party expects, but the file received from the other party will not contain the type of information the party expects. For example, in a litigation where two parties are to exchange expert reports, and email is employed to attempt a simultaneous exchange of the expert reports, where one party correctly attaches their expert report file to an email they send at the agreed time there is a risk to that party that the other party will send a file that is not the other party's expert report in their email (e.g., the other party sends a file in their email that is an image of the property that is the subject of the parties' dispute instead of the expert report, the other party sends a blank file instead of the expert report, etc.). As a further example, when two parties in a negotiation arrange for a simultaneous file exchange through a shared network service to swap settlement offers using prior systems and methods, there is a risk that one party will provide a file with the expected information on a settlement number (e.g., a dollar amount) to the shared network service and the other party will provide a file that does not contain expected information on a settlement number (e.g., instead the other party provides an explanation why that party cannot give a dollar amount as a settlement number at this time) to the shared network service. As a further example, when two parties agree to provide copies of a signature page of a contract to one another to an ftp site, where one party provides a file with a scanned copy of a signed signature page as expected, there is a risk to that party that the other party will provide a scanned copy of an unsigned signature page.

Using existing systems and methods in an attempt to achieve a simultaneous file exchange requires the parties to determine an agreed time in the future for the simultaneous file exchange to occur. This is because in order for the exchange to be simultaneous, it cannot be that one party will simply make their file available as the signal to the other party that it is time for the exchange—the very provision of the file from the first-disclosing party before the provision of the file by the second-disclosing party causes the exchange to not be simultaneous.

Existing systems and methods that allow users to set the time when an email will be sent to another party in the future (or otherwise allow for a file to be provided to another party at a time in the future) fall short of resolving the risks of both undesirable outcomes and inefficiencies explained above. This is because systems and methods for arranging for an email to be sent at certain time in the future does nothing to ensure that another party provides their file to you at the same time you provide your file to them.

Moreover, in some situations parties wish to exchange electronic files with one another simultaneously only when the information within their respective files share a certain relationship. This may be determined when the content of the files are considered together. For example, where a seller of an item and a potential buyer of the item wish to simultaneously exchange files containing information on the price each will sell or buy the item for, one or more of the buyer or seller may wish for the simultaneous file exchange to occur only when the prices each provides are within a certain dollar amount of one another. Prior art systems and methods fall short of providing such functionality. Prior art systems also fall short of allowing one or more of the parties to set the criteria upon which it is determined whether the simultaneous file exchange will occur (e.g., the dollar amount of the allowable spread between the prices contained in the files). As a result, with prior art systems parties do not have control over the conditions upon which their files are exchanged with one another by taking into account the values within the content of the files.

Moreover, in some situations it is advantageous that the parties simultaneously exchange files, and not simply exchange electronic information. This could be, for example, the added utility that may come with the ability to more easily manipulate files (e.g., the ability to save, copy, print, encrypt, etc. files). This could also be, for example, the added utility that comes with having access to metadata that is part of the files.

For these reasons and others, there is a need for systems and methods directed to the simultaneous exchange of electronic files or electronic information.

SUMMARY

In some embodiments systems and methods for the simultaneous exchange of electronic files are disclosed, wherein the systems and methods employ one or more storage object, and wherein one or more entities are associated with the one or more storage object. In particular, in some embodiments multiple entities make file contributions to a storage object and at a time after all such entities have provided file contributions to the storage object all such entities are provided access to the file contributions made to the storage object at the same time. In particular, in some embodiments the time at which such entities are provided access to the file contributions made to the storage object is set by one or more entity associated with the storage object, so as to occur at or after a certain time. In particular, in some embodiments the content of the files provided by the entities is determined to either have or not to have certain characteristics, where those characteristics are defined by one or more entity. In particular, in some embodiments a website, application, or app facilitates the simultaneous file exchange by providing an interface for the entities to arrange for the simultaneous file exchange and by providing access to file contributions made to the storage object.

Other aspects and advantages of the invention will become apparent from the detailed description herein, taken in conjunction with the accompanying figures, illustrating by way of example principles of the invention.

BRIEF DESCRIPTION OF THE DRAWINGS

FIG. 7 is a depiction of an interface to create a storage object presented on a screen in some embodiments of the invention.

FIG. 10 is a depiction of an interface to display storage object attributes on a screen in some embodiments of the invention.

FIG. 13 is a depiction of a notification provided to a contributor to a storage object used in some embodiments of the invention.

FIG. 23 is a diagram depicting interaction with a system facilitating the operation of a storage object wherein an entity is invited to a storage object.

FIG. 28 is a diagram depicting actions taken with a system facilitating the operation of a storage object wherein a storage object is created to facilitate a simultaneous file exchange where the file exchange is to occur once both parties make file contributions, and where the file exchange is to occur at or after a certain time.

FIG. 29 is a diagram depicting actions taken with a system facilitating the operation of a storage object wherein a storage object is created to facilitate a simultaneous file exchange where the file exchange is to occur once both parties make file contributions, and where the file exchange is to occur at or after a certain time.

FIG. 30 is a diagram depicting actions taken with a system facilitating the operation of a storage object wherein a storage object is created to facilitate a simultaneous file exchange where the file exchange is to occur once both parties make file contributions.

FIG. 31 is a diagram depicting actions taken with a system facilitating the operation of a storage object wherein a storage object is created to facilitate a simultaneous file exchange where the file exchange is to occur once both parties make file contributions.

FIG. 32 is a diagram depicting actions taken with a system facilitating the operation of a storage object wherein a storage object is created to facilitate a simultaneous file exchange where the file exchange is to occur once both parties make file contributions, where the exchange is to occur once both parties confirm they have made their file contribution, and where the file exchange is to occur at or after a certain time.

FIG. 33 is a diagram depicting actions taken with a system facilitating the operation of a storage object wherein a storage object is created to facilitate a simultaneous file exchange where the file exchange is to occur once both parties make file contributions, where the exchange is to occur once both parties confirm they have made their file contribution, and where the file exchange is to occur at or after a certain time.

FIG. 34 is a diagram depicting actions taken with a system facilitating the operation of a storage object wherein a storage object is created to facilitate a simultaneous file exchange where the file exchange is to occur once both parties make file contributions and where the exchange is to occur once both parties confirm they have made their file contribution.

FIG. 35 is a diagram depicting actions taken with a system facilitating the operation of a storage object wherein a storage object is created to facilitate a simultaneous file exchange where the file exchange is to occur once both parties make file contributions and where the exchange is to occur once both parties confirm they have made their file contribution.

FIG. 41 is a diagram depicting actions taken with a system facilitating the operation of a storage object wherein a storage object receives an acceptable spread and determines if values in received file contributions allow the storage object to change state.

FIG. 42 is a diagram depicting actions taken with a system facilitating the operation of a storage object wherein a storage object receives an acceptable spread and determines if values in received file contributions allow the storage object to change state.

FIG. 43 is a diagram depicting actions taken with a system facilitating the operation of a storage object wherein a storage object receives an acceptable spread and determines if values in received file contributions allow the storage object to change state.

FIG. 44 is a diagram depicting actions taken with a system facilitating the operation of a storage object wherein a storage object receives an acceptable spread and determines if values in received file contributions allow the storage object to change state.

DETAILED DESCRIPTION

Figure 1:
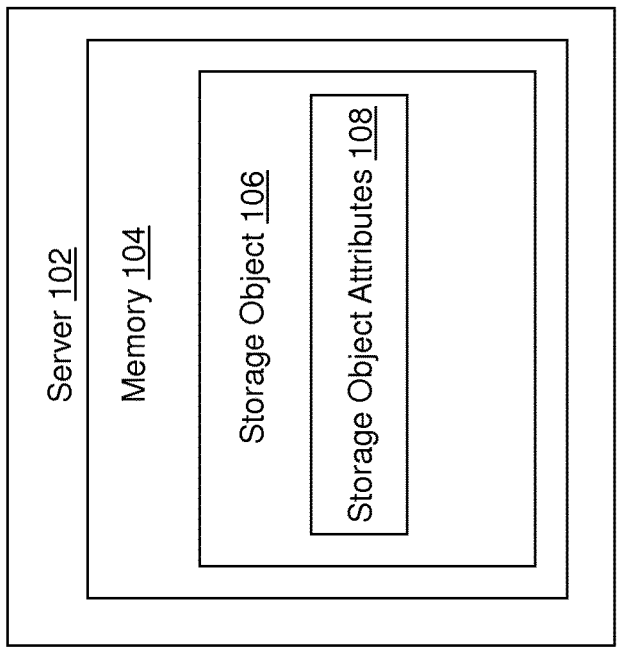
FIG. 1 is a block diagram depicting a system for use in some embodiments of the invention, wherein a storage object is held in memory on a server.

While the invention is described herein by way of example for several embodiments and illustrative figures, those skilled in the art will recognize that the invention is not limited to the embodiments or figures described. It should be understood that the figures and detailed description thereof are not intended to limit the invention to the particular form disclosed, but on the contrary, the intention is to cover all modifications, equivalents and alternatives falling within the spirit and scope of the invention. The headings used herein are for organizational purposes only and are not meant to be used to limit the scope of the invention. As used throughout this application, the word "may" is used in a permissive sense (i.e., meaning having the potential to), rather than the mandatory sense (i.e., meaning must). Similarly, the words "include", "including", and "includes" mean including, but not limited to.

Brief Introduction to Computing Terminology

In this specification numerous specific details are set forth to provide a thorough understanding of claimed subject matter. However, it will be understood by those skilled in the art that such specific details are generally provided by way of example and claimed subject matter may not require all such specific details. In other instances, methods, apparatuses or systems that would be known by one of ordinary skill have not been described in detail so as not to obscure principles of the invention.

Some descriptions in this specification are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the art to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It has proven convenient at times, principally for reasons of common usage, to refer to signals, inputs, outputs, and the like as originating from certain source entities. It should be understood that through this usage a signal, input, output or the like originating from an entity may pass through, be amplified by, be repeated by, be promulgated by, be diverted by, or otherwise be processed by one or more intermediary device or entity, yet it will still be referred to as originating from that source entity.

Brief Introduction to the Concept of Simultaneity

The term "simultaneous" and the concept of "simultaneity" are to be understood as necessarily not requiring exactitude such that precisely zero time is measured between the occurrence of two events. Said another way, both the term "simultaneous" and the concept of "simultaneity", by necessity, cannot connote absolutes. This is so, because, though simultaneity is generally understood to be the property of two events happening at the same time, Einstein's Special Theory of Relativity explains that this general understanding belies the more complicated nature of the universe. In fact, simultaneity is not an absolute property between events. Rather, Einstein's Special Theory of Relativity explains that, in reality, it is impossible to say in an absolute sense that two distinct events occur at the same time if those events are separated by any space whatsoever. With regard to this invention, an understanding of the Special Theory of Relativity is not required to comprehend the important ramification of Einstein's teaching. All that is required is that one understand it is impossible to truly say two things happen simultaneously according to the Special Theory of Relativity, unless they occurred at the exact same location in space. However, as used herein, the term "simultaneous" and the concept of "simultaneity" are to be understood as necessarily not requiring exactitude such that precisely zero time is measured between the occurrence of two events. Rather, for the purpose of this invention the terms "simultaneous" and "simultaneously" connote events that may occur at substantially the same time. In some embodiments, the invention concerns simultaneously sending or making available electronic files or electronic information to multiple entities. In such embodiments, it is to be understood that the simultaneous sending or making available is performed at substantially the same time as to each entity, so as to prevent one entity from enjoying an appreciable advantage over another entity by virtue of any differences in the time that the sending or making available is performed as to one entity as opposed to another. The terms "simultaneous" and "simultaneity" with regards to such embodiments are therefore not defined according to an upper limit on a period of time, but rather, the meaning of these terms remains to be assessed from the teaching above. That said, in some embodiments, it can be determined whether a certain periods of time satisfy the requirement that two events are (or are not) "simultaneous" or are (or are not) performed "simultaneously" for the purpose of this invention. By way of example and not limitation, events occurring within one or more of the following periods of time may be considered simultaneous in some embodiments of the invention, according to the teaching above: events occurring one day of each other, events occurring within one hour of each other, events occurring within one minute of each other, events occurring within one second of each other, events occurring within one hundred milliseconds of each other, events occurring within ten milliseconds of each other, events occurring within one millisecond of each other, events occurring within one microsecond of each other, events occurring within one nanosecond of each other, events occurring within one picosecond of each other, events occurring within one femtosecond of each other, etc. Moreover, according to the teachings above, in such embodiments, it is to be understood that the simultaneous sending or making available performed at substantially the same time as to each entity may connote that the process of sending or making available is begun at substantially the same time as to each entity or it may connote that the process of sending or making available is complete (or substantially complete) at substantially the same time as to each entity.

Benefits of Embodiments of the Invention

According to some embodiments of the invention, systems and methods are provided wherein when multiple parties attempt a simultaneous file exchange each party is assured that the file they provide will not be available to any other party before that other party provides their file, where the simultaneous file exchange is facilitated by a website, application, or app. This provides the benefit of assuring that no party's file is modified or created with knowledge gained from a file provided in the exchange by another party. This can be important when the parties are adversaries (e.g., in a litigation), the parties are negotiating against one another, or any other situation where the parties can be expected to use all information available to them to their advantage. This can also provide benefit in preventing a party from feeling aggrieved from the occurrence of another party failing to provide a file for an exchange that was supposed to be simultaneous, as can occur with the use of prior art systems and methods. This also provides benefits in removing the temptation for a party subject to the simultaneous exchange from resorting to foul play by first garnering information from another party's file before providing their own file. This also provides benefit in that there can be no late-disclosing party whatsoever in the exchange. This can also provide benefit in preventing a party from feeling aggrieved from the occurrence of another party failing to provide at an agreed upon time a file for an exchange that was supposed to be simultaneous, as can occur with the use of prior art systems and methods. This can also provide benefit in that the parties to the simultaneous exchange need not trust one another to take any action in order to not take advantage of the situation (in some prior art systems and methods parties had to trust one another to provide files at an agreed upon time). This can also provide benefit in that the parties to the simultaneous exchange need not trust one another to act rationally (or in any other manner) during the course of the simultaneous file exchange. This can also provide benefit in that a party can provide their file for the exchange to the website, application, or app at a time of their convenience before the time of the exchange, not only at the time of the exchange. This can also provide the benefit of providing an interface through the website, application, or app that the parties can use to facilitate the simultaneous electronic file exchange. This can also provide the benefit of the website, application, or app storing or directing the storage of the files provided by the parties for the simultaneous exchange instead of the file residing with any of the parties prior to the exchange.

According to some embodiments of the invention, systems and methods are provided wherein when multiple parties attempt a simultaneous file exchange the exchange is facilitated through the use of a website, application or app, where the website, application, or app provides timing information that is available to each party. This allows parties to refer to a singular source for all timing related to the simultaneous exchange, as opposed to each party relying upon their own source (e.g., their own clocks) for timing. This provides the benefit of avoiding problems with parties using different clocks when attempting a simultaneous exchange using prior art systems and methods. This also provides the benefit of avoiding problems in prior art systems and methods related to the lack of memorialization of the time for a simultaneous exchange, the reliance on human memory to remember the time for a simultaneous exchange, the reliance on humans to adjust for time zones, day light savings, and conversions between twenty-four hour notation and AM/PM notations, etc.

According to some embodiments of the invention, systems and methods are provided wherein when a party wishes to initiate a simultaneous file exchange that is facilitated through the use of a website, application or app, that party may invite another party to join the simultaneous file exchange through the use of the website, application, or app interface. This allows parties to coordinate a simultaneous file exchange through the same system that will deliver the files, adding to convenience and providing efficiencies.

According to some embodiments of the invention, systems and methods are provided wherein when a party wishes to initiate a simultaneous file exchange that is facilitated through the use of a website, application or app, that party may provide a name for a storage object used to facilitate a simultaneous exchange. This allows parties to refer to a storage object used to facilitate a simultaneous exchange conveniently, in a manner to differentiate the storage object from other storage objects. For example, a party may wish to name all storage objects pertaining to a certain client in a manner that will identify that client (e.g., naming the storage objects "Jacoby_Object_01", "Jacoby_Object_02", etc. where the storage objects are for the client Jacoby).

According to some embodiments of the invention, systems and methods are provided wherein when a party wishes to initiate a simultaneous file exchange that is facilitated through the use of a website, application or app, that party may provide a name for a storage object used to facilitate a simultaneous exchange and further organize that storage object within an organization system. This allows parties to refer to a storage object used to facilitate a simultaneous exchange conveniently, in a manner to differentiate the storage object from other storage objects and to further organize the storage object among other storage objects (e.g., through a foldering system). For example, a party may wish to create and name a folder pertaining to a certain client so as to organize all storage objects pertaining to that client within the folder (e.g., naming the folder "Jacoby Objects" and storing all storage objects pertaining to the client Jacoby within that folder).

According to some embodiments of the invention, systems and methods are provided wherein when multiple parties attempt a simultaneous file exchange, each party is assured that the file they provide will not be available to any other party before that other party provides their file, and that the simultaneous file exchange will not occur before a certain time. This provides the benefit of assuring that no party's file is modified or created with knowledge gained from a file provided in the exchange by another party. This also provides the benefit of assuring that no party will receive another party's file before a certain time, which can be important for planning purposes. This also provides the benefit of assuring that a requirement from a third party or authority that an exchange occurs at a certain time is met, as long as all parties have provided their file by that time. For example, a court may order that parties in a litigation exchange their proposals for the mediator that they will use at 5:00 pm on a certain day. This provides the benefit of allowing the parties to specify that the exchange of the parties' proposals will occur no sooner than 5:00 pm on that day, so long as both parties have provided their files containing their proposals by that time. In some embodiments if one or both of the parties fails to provide their file before 5:00 pm on that day the exchange will only occur once both parties have provided their file—but in no event does the exchange occur before the court-ordered time of 5:00 pm.

According to some embodiments of the invention, systems and methods are provided wherein when multiple parties attempt a simultaneous file exchange each party is assured that the file they provide will not be available to any other party before that other party provides their file and that the simultaneous file exchange will only occur at a certain time if all parties have provided files for the exchange at that time, otherwise no files will be exchanged. This provides the benefit of assuring that no party's file is modified or created with knowledge gained from a file provided in the exchange by another party. This also provides the benefit of assuring that no party will receive another party's file at any time other than the certain time, which can be important for planning purposes. This also provides the benefit of assuring that no party's file will be provided to any other party unless that other party also provides their file prior to the certain time. For example, in a negotiation between two parties, a potential buyer and a seller of a certain item, each party may wish to simultaneously exchange information concerning the amount the buyer will pay and the amount that the seller will accept for the item, respectively. Each of the parties may wish to convey their information only if the other party conveys their information, and only if the other party provides such information in a file for the simultaneous exchange by a certain time. Otherwise, the parties do not wish to divulge the information on how much they will pay (in the case of the buyer) or how much they will accept (in the case of the seller) for the item.

According to some embodiments of the invention, systems and methods are provided wherein when multiple parties attempt a simultaneous file exchange each party is assured that the file they provide will not be available to any other party before that other party provides their file and that the simultaneous file exchange will only occur within a defined time frame, and only if all parties have provided files for the exchange before the expiration of that time frame. This provides the benefit of assuring that no party's file is modified or created with knowledge gained from a file provided in the simultaneous exchange by another party. This also provides the benefit of assuring that no party will receive another party's at any time other than within the certain time frame, which can be important for planning purposes. This also provides the benefit of assuring that no party's file will be provided to another any other party unless that other party also provides their file prior to the expiration of the time frame. For example, in a negotiation between two parties, a potential buyer and a seller of a certain item, each party may wish to simultaneously exchange information concerning the amount the buyer will pay and the amount that the seller will accept for the item, respectively. Each of the parties may wish to convey their information only if the other party conveys their information, and only if the other party provides such information in a file for the simultaneous exchange by a certain time, where that time is at the end of a defined time frame. Otherwise, the parties do not wish to divulge the information on how much they will pay (in the case of the buyer) or how much they will accept (in the case of the seller) for the item. The parties may further wish to ensure that no exchange of information occurs before a certain time, where that time is the beginning of a time frame (e.g., so as to ensure that the simultaneous file exchange cannot occur before one of the parties is able to access a computer).

According to some embodiments of the invention, systems and methods are provided wherein when multiple parties attempt a simultaneous file exchange each party is assured that the file they provide will not be available to any other party before that other party provides their file and that the simultaneous file exchange will only occur within a first defined time frame, and only if all parties have provided files for the exchange within a second defined time frame. This provides the benefit of assuring that no party's file is modified or created with knowledge gained from a file provided in the simultaneous exchange by another party. This also provides the benefit of assuring that no party will receive another party's file at any time other than within the first time frame, which can be important for planning purposes. This also provides the benefit of assuring that no party's file will be provided to another any other party unless that other party also provides their file prior to the expiration of the second time frame. For example, in a negotiation between two parties, a potential buyer and a seller of a certain item, each party may wish to simultaneously exchange information concerning the amount the buyer will pay and the amount that the seller will accept for the item, respectively. Each of the parties may wish to convey their information only if the other party conveys their information, and only if the other party provides such information in a file for the simultaneous exchange within a certain (second) time frame (e.g., between Monday and Friday of a certain week). Otherwise, the parties do not wish to divulge the information on how much they will pay (in the case of the buyer) or how much they will accept (in the case of the seller) for the item. The parties may further wish to ensure that any exchange of information occurs only during a certain (first) time frame, (e.g., between Wednesday and Friday of that same week, so as to ensure that the simultaneous file exchange cannot occur before one of the parties returns from vacation and in no event later than the end of the work week).

According to some embodiments of the invention, systems and methods are provided wherein when multiple parties attempt a simultaneous file exchange each file provided by a party to a third party server for the purpose of effecting the simultaneous file exchange is encrypted before it is placed on a server controlled by a third party, at the time it is placed on a server controlled by a third party, or soon after the file is placed on a server controlled by a third party. This provides the benefit of ensuring that no unencrypted data is vulnerable to security attacks as it exists on a server controlled by a third party. This also provides the benefit of ensuring that no information contained within the file is accessible to a third party (i.e., the third party that controls the server that the file is provided to). This may be particularly important when the information within the file is confidential, sensitive, secret, privileged (e.g., attorney-client privileged), and/or subject to a protective order. When files are encrypted before they are provided to third party servers this can further provide the benefit of ensuring that the information within the files are encrypted while in transit.

According to some embodiments of the invention, systems and methods are provided wherein when multiple parties attempt a simultaneous file exchange, before the exchange occurs, one or more party may cancel the simultaneous file exchange. This also allows a party to avoid providing sensitive information in a file that is subject to the simultaneous exchange when the need for the simultaneous exchange no longer exists (e.g., a party that provides a file with information on the settlement of a litigation for a simultaneous exchange would want to retract the file if it comes to pass that the litigation settles before the simultaneous exchange occurs). This also allows a party to avoid providing sensitive information in a file that is subject to the simultaneous exchange when the party no longer wishes to perform a simultaneous exchange (e.g., if a party comes to believe that another party involved in the exchange will not provide information in their provision of a file to the simultaneous exchange that contains information expected of them).

According to some embodiments of the invention, systems and methods are provided wherein when multiple parties attempt a simultaneous file exchange, before the exchange occurs, a party may replace a file they have provided for the simultaneous file exchange with another file that is provided for the simultaneous file exchange. This allows a party to make changes to the information provided in the file provided for the simultaneous file exchange while avoiding the situation where they no longer have a file provided for the simultaneous file exchange once they have made such a file available.

According to some embodiments of the invention, systems and methods are provided wherein when multiple parties attempt a simultaneous file exchange, before the exchange occurs, a party may retract (e.g., remove, delete, etc.) a file they have provided for the simultaneous file exchange such that will not be exchanged. This allows a party to avoid the situation of providing a file in a simultaneous exchange to a party they come to believe is a bad actor (e.g., a party that will not provide information in their provision of a file to the simultaneous exchange that contains information expected of them). This also allows a party to avoid providing sensitive information in a file that is subject to the simultaneous exchange when the need for the simultaneous exchange no longer exists (e.g., a party that provides a file with information on the settlement of a litigation would want to retract the file if it comes to pass that the litigation settles before the simultaneous exchange occurs). This also allows a party to remove a file that does not provide the information the party intended for the file to provide (e.g., as a result of a mistake by the providing party).

According to some embodiments of the invention, systems and methods are provided wherein when multiple parties attempt a simultaneous file exchange, one or more party may specify the requirements for files that are provided to a storage object. For example, a party may specify that files that no files that are images may be provided for the simultaneous file exchange. Image files, unlike many other files do not generally contain written text and thus are not the type of files expected in certain exchanges of electronic files. As such, for example, a party may specify that no files that are videos may be provided for the simultaneous file exchange. However, in some instances an image file is a type of file expected in a simultaneous exchange (e.g., when parties are to exchange photographs of one another). Video files, unlike many other files do not generally contain written text and thus are not the type of files expected in certain exchanges of electronic files. For example, a party may specify that files that no files that are audio files may be provided for the simultaneous file exchange. However, in some instances a video file is the only type of file expected (e.g., when parties are to exchange video evidence of a certain event). Audio files, unlike many other files do not generally contain written text and thus are not the type of files expected in certain exchanges of electronic files. As such, for example, a party may specify that no files that are audio files may be provided for the simultaneous file exchange. However, in some instances an audio file is the only type of file expected (e.g., when parties are to exchange music tracks with each other). Specifying the requirements for files that are to be provided allows a party to avoid the situation of receiving a file from another party that does not contain the information the party expects (e.g., in what is supposed to be a simultaneous exchange of the parties' expert reports, this prevents a party from receiving an image, a video, or an audio file in the exchange, where it is clear that such types of files will not contain the information the party expects).

According to some embodiments of the invention, systems and methods are provided wherein when multiple parties attempt a simultaneous file exchange, the content of the files provided by the parties is checked to ensure the content conforms to certain requirements for such content. For example, in a file that contains text certain characters or text strings may be searched for within a file provided for the exchange (either to ensure such characters or text strings are present or to ensure that such characters or text strings are not present). This allows a party to avoid the situation of receiving a file from another party that does not contain the information the party expects (e.g., in what is supposed to be a simultaneous exchange of the parties' expert reports, this prevents a party from receiving a blank document from another party in the exchange). This also allows a party to avoid mistakenly providing a file that does not contain the information expected by another party.

According to some embodiments of the invention, systems and methods are provided wherein when multiple parties attempt a simultaneous file exchange, the file format of the files provided by the parties are checked to ensure the file format conforms to certain requirements. A file format is a standard way that information is encoded for storage in a file (e.g., files in PNG format store bitmapped images using lossless data compression, files in HTML format and SVG format are text files with defined syntaxes). A file format specifies how bits are used to encode information in a digital storage medium. This allows a party to avoid the situation of receiving a file from another party that is not in a file format that the party expects (e.g., in what is supposed to be a simultaneous exchange of the parties' expert reports in Portable Document Format, this prevents a party from receiving a file in Microsoft Excel file format from another party in the exchange.). This also allows a party to avoid mistakenly providing a file that does not contain the information expected by another party.

According to some embodiments of the invention, systems and methods are provided wherein when multiple parties attempt a simultaneous file exchange, the file extension of the files provided by the parties are checked to ensure the file extension conforms to certain requirements. A file extension is a suffix (generally separated from the base filename by a dot or space) to the name of a computer file. A file extension is applied to indicate the encoding (file format) of the file's contents or usage. Examples of filename extensions are .DOC, .EXE, .PDF, .XLS, and .TXT. This allows a party to avoid the situation of receiving a file from another party that does not have the file extension that the party expects (e.g., in what is supposed to be a simultaneous exchange of the parties' expert reports have .PDF file extensions, this prevents a party from receiving a file with a .XLS file extension from another party in the exchange.). This also allows a party to avoid mistakenly providing a file that does not contain the information expected by another party (e.g., by attaching the wrong file where the wrong file has an impermissible file extension). As is known by one of skill in the art, information about a file's file extension and its file formats is often obtained by looking at the file's file extension alone. In fact, often times a file's format is referred to by those of skill in the art by the file's file extension (e.g., the Portable Document Format is a particular file format used to present documents, and it is often referred to as a ".PDF file"—indicating at once both its file format and its file extension). This is because usually because a file with a certain file format will have a certain file extension, and vice versa.

According to some embodiments of the invention, systems and methods are provided wherein when multiple parties attempt a simultaneous file exchange, records are created and provided to the parties with information pertaining to the files provided by the parties to a website, application, or app facilitating the simultaneous file exchange (e.g., the filename, file size, the file type, the time the file was provided, etc.). This provides the benefit of allowing a party to document files the parties have provided for the simultaneous exchange, which may be useful in demonstrating a record of the party's actions to an authority (e.g., a judge, a government agency, etc.) or a third party.

According to some embodiments of the invention, systems and methods are provided wherein when multiple parties attempt a simultaneous file exchange, records are created and provided to the parties with information pertaining to the files accessed by the parties from a website, application, or app facilitating the simultaneous file exchange (e.g., the filename, file size, the file type, the time the file was accessed by the party, etc.). This provides the benefit of allowing a party to document files the parties have accessed from the simultaneous exchange, which may be useful in demonstrating a record of a party's actions to an authority (e.g., a judge, a government agency, etc.) or a third party.

According to some embodiments of the invention, systems and methods are provided wherein when multiple parties attempt a simultaneous file exchange, records are created with information pertaining to whether the parties involved with the exchange provided files for the simultaneous exchange. This provides the benefit of allowing a party to document files they provided for the simultaneous exchange, which may be useful in demonstrating a record of the party's actions to an authority (e.g., a judge, a government agency, etc.) or a third party. This also provides the benefit of allowing a party to document that another party did not provide a file for the simultaneous exchange (e.g., in the case where a file is to be provided by a certain time for a simultaneous exchange a record will indicate whether or not a party provided a file by that time).

According to some embodiments of the invention, systems and methods are provided wherein when multiple parties attempt a simultaneous file exchange each party accesses a website, application, or app controlled by a third party, where the website, application, or app facilitates the simultaneous exchange. This provides the benefit of ensuring that no party to the exchange is responsible for facilitating the exchange. This further provides the benefit of creating an interface through which the parties may conduct the simultaneous file exchange. This further provides the benefit of providing a system where the computers of the parties need not be computers with equal (or relatively equal) computational capabilities. Rather, the parties can use their computers to access the website, application, or app that is controlled by a third party without concern for the computational capability of the other parties' computer and without regard for whether each party has equal knowledge of algorithms implemented in the system facilitating the simultaneous file exchange.

According to some embodiments of the invention, systems and methods are provided wherein when multiple parties attempt a simultaneous file exchange each party accesses a website, application, or app controlled by a third party, where the website, application, or app facilitates the simultaneous exchange and where the files provided by the parties for the simultaneous exchange are provided to a server controlled by the third party. This provides the benefit of ensuring that no party to the exchange is responsible for facilitating the exchange. This further provides the benefit of ensuring that no party to the exchange has control of the server where the files provided for the simultaneous are provided.

According to some embodiments of the invention, systems and methods are provided wherein when multiple parties attempt a simultaneous file exchange each party accesses a website, application, or app controlled by a third party, where the website, application, or app facilitates the simultaneous exchange and where the files provided by the parties for the simultaneous exchange are provided to a server controlled by a third party, and where a party may specify the amount of time that the file exists on or is accessible from the server. This provides the benefit of ensuring that no party to the exchange is responsible for facilitating the exchange. This further provides the benefit of ensuring that no party to the exchange has control of the server where the files provided for the simultaneous are provided. This also provides the benefit of a party controlling the amount of time that a file it provides exists on or is accessible from a server controlled by a third party.

According to some embodiments of the invention, systems and methods are provided wherein when multiple parties attempt a simultaneous file exchange each party accesses a website, application, or app controlled by a first third party, where the website, application, or app facilitates the simultaneous exchange, and the files provided by the parties for the simultaneous exchange are provided to a server controlled by a second third party, where the first third party and the second third party differ. This provides the benefit of ensuring that no party to the exchange is responsible for facilitating the exchange. This further provides the benefit of ensuring that the third party responsible for facilitating the exchange does not also have control of the server where the files provided for the exchange are provided. This may be desirable where the parties do not wish to know the location of the server where the files are held, or who controls that server—which can be accomplished by keeping information about the server controlled by the second third party from the parties. This may be desirable where the parties wish to specify the location of the server where the files are held, or who controls that server—which can be accomplished by allowing the parties to specify the identity of second third party.

According to some embodiments of the invention, systems and methods are provided wherein when multiple parties attempt a simultaneous file exchange each party accesses a website, application, or app controlled by a first third party, where the website, application, or app facilitates the simultaneous exchange, and one or more party may specify the email addresses or usernames of individuals that are to gain access to the files exchanged in the simultaneous file exchange. This provides the benefit of ensuring that when multiple individuals are related to the parties, for example in the case where multiple attorneys represent a party, those multiple individuals are provided access to the files subject to the simultaneous exchange. The use of usernames to identify parties provides the benefit of allowing parties to preserve anonymity between one another (e.g., where usernames may not be associated with further identifying information available to other parties). The use of email addresses to identify parties allows the benefit of allowing parties to ensure the identity of one another (e.g., where it is known that a certain email address is associated with a certain party).

According to some embodiments of the invention, systems and methods are provided wherein when multiple parties attempt a simultaneous file exchange each party accesses a website, application, or app controlled by a first third party, where the website, application, or app facilitates the simultaneous exchange, and where before file contributions made by a party are made available to another party the party providing the file contribution must confirm that their file contribution is ready to be provided to the other party. This provides the benefit of allowing a party to check the file they are providing for the simultaneous file exchange (e.g., checking the content, checking that the correct file is provided, etc.) before it is made available to another party in a simultaneous file exchange.

According to some embodiments of the invention, systems and methods are provided wherein when multiple parties attempt a simultaneous file exchange each party is assured that the file they provide will not be available to any other party before that other party provides their file, where the simultaneous file exchange is facilitated by a website. The use of a website to facilitate a simultaneous file exchange presents advantages over some other systems in that a website does not require the installation of software on a computer. The use of a website to facilitate a simultaneous file exchange presents advantages over some other systems in that a website is accessible over a variety of devices. The use of a website to facilitate a simultaneous file exchange presents advantages over some other systems in that a website is not restricted to being accessible from only a device that is designed to download an app.

According to some embodiments of the invention, systems and methods are provided wherein when multiple parties attempt a simultaneous file exchange each party is assured that the file they provide will not be available to any other party before that other party provides their file, where the simultaneous file exchange is facilitated by an app. The use of an app to facilitate a simultaneous file exchange presents advantages over some other systems in that an app is generally restricted to being accessible from only a device that is designed to download an app (e.g., a mobile device). As such the aspect ratio of the app may be optimized for the display of information in the app. Also, as such the portability of a mobile device allows for utility in providing the ability to access the system facilitating the simultaneous file exchange while the entity accessing the system is mobile.

According to some embodiments of the invention, systems and methods are provided wherein a simultaneous file exchange occurs only when the content of files provided for the simultaneous files exchange by both parties contain values that are within or outside of a certain spread when the values are compared to one another. This provides the benefit of considering the relationship between the values within the files provided when determining whether a simultaneous exchange of the files should be allowed. For example, where the content of files provided for a simultaneous file exchange include monetary figures for the settlement of a dispute, one or more party may desire to withhold the file with information on the settlement figure if the other party's settlement figure is not within $1,000 of their settlement figure. This may be for strategic reasons, for example, where a party feels it is a worthwhile negotiating tactic to never reveal their settlement figure when it is outside of the $1000 spread.

According to some embodiments of the invention, systems and methods are provided wherein a simultaneous file exchange occurs only when the content of files provided for the simultaneous files exchange are within or outside of a certain spread when the values are compared to one another and where the spread is defined by one or more parties to the simultaneous file exchange. This provides the benefit of allowing one or more of the parties involved in the simultaneous file exchange to customize the parameters for the exchange. This customization is desirable, as the spread that is appropriate for the needs of parties in one simultaneous file exchange are not necessarily appropriate for the needs of parties in another simultaneous exchange. Take for example, the contrasting needs between parties with files exchanged that include information on the acceptable purchase prices of a home and the needs of parties with files exchanged that include information on the acceptable purchase price of a used television set. Given the large purchase price for a home, a threshold of $10,000 may be desirable in the file exchange that pertains to the home, such that the files are exchanged simultaneously only if the values in the parties' files differ by less than $10,000. However, for the file exchange that pertains to the purchase of a used television set, a threshold of $50 may be more appropriate.

According to some embodiments of the invention, systems and methods are provided wherein a simultaneous file exchange occurs only when the content of files provided for the simultaneous files exchange are within or outside of a certain spread when the values are compared to one another and where the spread is known to one or more of the parties to the simultaneous file exchange. In some embodiments this provides the benefit of allowing parties to have knowledge of the spread before that party determines the value they will include in the file provided for the simultaneous file exchange. This may aid negotiations, so as to allow parties to act with knowledge of the spread they must satisfy to receive information from each other. For example, if the spread is known it is possible that a party will attempt to increase or decrease the chances of the simultaneous file exchange occurring. For example, if the spread is known to be "less than $100" and a party (who is a potential buyer of an item) estimates that the other party (who is the seller of the item) will ask for a price of $400 in their file, the buyer may wish to make sure to offer more than $300 so as to make an offer that is within the spread from the price they estimate the other party will provide.

According to some embodiments of the invention, systems and methods are provided wherein a simultaneous file exchange occurs only when the content of files provided for the simultaneous files exchange are within or outside of a certain spread when the values are compared to one another and where the spread is not known to one or more of the parties to the simultaneous file exchange. In some embodiments this provides the benefit of preventing parties from having knowledge of the spread before determining the value that will be found in the file provided to the simultaneous file exchange. This may aid negotiations, so as to allow parties to act without the influence of information on the spread in determining the values they provide in a negotiation. For example, if the spread is known it is possible that a party will attempt to increase or decrease the chances of the simultaneous file exchange occurring. For example, if the spread is known to be $100 and a party (who is a potential buyer of an item) estimates that the other party (who is the seller of the item) will ask for a price of $400 in their file, the buyer may wish to make sure to offer more than $300 so as to make an offer that is within the spread from the price they estimate the other party will provide. This may not be desirable, and to encourage the parties to provide their values without attempting to influence whether or not the simultaneous file exchange will occur on account of the values, the spread may not be provided to or may not be accessible to one or more of the parties.

Aspects of Example Embodiments of the Invention

To achieve a simultaneous file exchange, some embodiments of the invention make use of one or more storage object. A storage object is an object that receives contributions in the form of files from entities. In some embodiments a storage object is implemented at least in part through the use of software (e.g., a storage object may be part of, may be implemented as, or may be implemented to include one or more file, program, etc.). In some embodiments a storage object is implemented at least in part through the use of hardware (e.g., a storage object may be part of, may be held on, may be implemented as, or may be implemented to include one or more computer, hard disk, disk partition, removable disk, flash memory, etc.). In some embodiments a system facilitating the operation of a storage object makes the files contributed to the storage object available to entities that are contributors to the storage object and/or to entities that are non-contributors to the storage object. In some embodiments a storage object is referred to as a "vault", or other nomenclature.

In some embodiments entities associated with the storage object (e.g., parties) are either contributors to the storage object or non-contributors to the storage object. In some embodiments, at the time a storage object is created (or thereafter) an entity or system designates certain entities as contributors to a storage object. In some embodiments, at the time a storage object is created (or thereafter) an entity or system designates certain entities as non-contributors to a storage object. In some embodiments, at the time a storage object is created (or thereafter) an entity or system designates certain entities as associated with the storage object, where the designation of those entities as either contributors or non-contributors is determined at a later time according to whether or not those entities make file contributions to the storage object. In some embodiments all entities associated with a storage object are contributors. In some embodiments no entities associated with a storage object are non-contributors. Each of these possible configurations allows for either flexibility or rigidity in the nature of the entities' association with the storage object, according to the particular needs for the simultaneous file exchange that will occur through the use of that storage object.

In some embodiments a storage object is made available on a computer that is connected through computer networking to one or more entities associated with the storage object (e.g., through the entities' use of computers). In some embodiments a storage object is accessible to entities associated with the storage object through an online interface (e.g., an app on a mobile device, a website, ftp client software, an application running on a computer, etc.). In some embodiments a storage object is made available on a computer that is not a computer controlled by an entity associated with a storage object. In some embodiments a storage object is made available on a computer that is a computer controlled by an entity associated with a storage object. Each of these possible configurations allows for access to the storage object through a variety of devices and interfaces over differing network topologies, according to convenience or the particular needs for the simultaneous file exchange that will occur through the use of that storage object.

In some embodiments a storage object is designed to cease to exist at some point in time. In some embodiments a storage object is designed to cease to exist at some point in time that is predetermined (e.g., in terms of a certain date and time, in terms of a certain duration of time from creation of the storage object, etc.). In some embodiments a storage object is designed to cease to exist at some point in time that is not predetermined (e.g., upon the occurrence or non-occurrence of an event, as a result of input from one or more entity associated with the storage object, upon the satisfaction or non-satisfaction of some criteria, etc.). In some embodiments a storage object is not designed to cease to exist at some point in time. Each of these possible configurations allows for the storage object to cease to exist (or not) according to the particular needs for the simultaneous file exchange that will occur through the use of that storage object. For example, for security reasons, a storage object may be designated to cease to exist at a predetermined time. For example, for conservancy reasons, a storage object may be designated to not cease to exist.

In some embodiments a storage object is held in computer memory. In some embodiments the computer that a storage object is held on is a server. In some embodiments a server that a storage object is held on is a cloud server. In some embodiments a server that a storage object is held on is a virtual server. In some embodiments a server that a storage object is held on is a virtual cloud server. In some embodiments a computer that a storage object is held on is a mobile device (e.g., a mobile phone, a tablet, a handheld computer, a wearable computer, etc.). In some embodiments a computer that a storage object is held on is a tablet computer. In some embodiments a computer that a storage object is held on is a wearable computer such as a computer that takes the form of a watch worn by an individual. In some embodiments a storage object is held in memory on a removable storage device (e.g., a disk, a flash drive, etc.). In some embodiments a part of a storage object is held on one computer and another part of the storage object is held on one or more other computer (e.g., a storage object may exists within a distributed computing system, a storage object may be implemented in software as two or more files where each file exists on a different computer). In some embodiments a copy of a storage object is held on more than one physical hardware device (e.g., copies of a storage object may be held on two or more different servers or two or more different flash drives). Each of these possible configurations allows for the storage object to exist on a variety of devices and computers, according to the particular needs for the simultaneous file exchange that will occur through the use of that storage object. For example, some resources may be more easily accessible, less expensive, faster, or otherwise preferable when selecting where the storage object is held.

In some embodiments a computer program or other executable code facilitates, at least in part, the operation of the storage object. The computer program or other executable code may broadly include code that has a collection of computer instructions written in a computer language (e.g., code written in JavaScript, code written in Java, code written in Scala, code written in HTML, code written in Objective-C, code written in C, code written in Python, code written in Ruby, etc.), one or more file containing instructions for a software interpreter (e.g., bytecode, etc.), or otherwise. In some embodiments a computer program or other executable code comprises, or is part of, a system facilitating the operation of the storage object. In some embodiments such computer program or other executable code exists in memory on a computer (e.g., a server). In some embodiments a computer program or other executable code exists in memory on a computer (e.g., a server) and that computer program or other executable code directs file contributions made to the storage object (which resides on the same computer as the computer program or other executable code) to reside on a computer other than the one the computer program or other executable code exists on (e.g., a different server). In some embodiments a computer program or other executable code exists in memory on a computer (e.g., a server) and that computer program or other executable code directs file contributions made to the storage object (which resides on a different computer from the computer program or other executable code) to reside on a computer other than the one the computer program or other executable code exists on (e.g., a different server, the computer that the storage object resides on, etc.). In some embodiments a computer program or other executable code exists in memory on a computer (e.g., a server) and that computer program or other executable code directs file contributions made to the storage object (which resides on the same computer as the computer program or other executable code) to reside on the same computer (e.g., the same server). Each of these possible configurations allows for the storage object, file contributions, and computer program or executable code to exist on a variety of devices and computers, for reasons of convenience or according to the particular needs for the simultaneous file exchange that will occur through the use of the storage object.

For example, in some embodiments a computer program or other executable code facilitates the transfer of files between the storage object and entities associated with the storage object. For example, in some embodiments a computer program or other executable code facilitates the transfer of files provided to a storage object between a server and entities associated with the storage object. For example, in some embodiments a computer program or other executable code implements logic to determine, at least in part, when files contributed to the storage object are to be made accessible to entities associated with the storage object. Such determinations may be made with reference to attributes of one or more of the storage object, the attributes of one or more file contribution, the attributes of the contributors, and/or the attributes of the non-contributors. For example, in some embodiments a computer program or other executable code facilitates the submission of files to the storage object from entities associated with the storage object. For example, in some embodiments a computer program or other executable code determines, at least in part, attributes of files made to a storage object and compares those attributes to attributes of the storage object. In some embodiments a computer program or other executable code takes action in response to inputs from contributors and/or non-contributors (e.g., accepts or rejects file contributions, causes emails or other notifications to be sent, notifies contributors and/or non-contributors of information concerning the storage object, etc.).

In some embodiments a storage object has one or more attributes. In some embodiments the attributes of a storage object are held in computer memory (i.e. in the same way a storage object may be implemented in computer memory). In some embodiments the attributes of a storage object include one or more of: name attribute, unique ID attribute, status attribute, contributions attribute, creation date attribute, last modified date attribute, contributors attribute, non-contributors attribute, rules attribute, and type attribute. In some embodiments values of storage object attributes are accessible and/or provided to all entities associated with a storage object. In some embodiments values of storage object attributes are accessible and/or provided to less than all entities associated with a storage object. In some embodiments the determination of whether storage object attributes (and the values thereof) are accessible and/or provided to entities associated with a storage object is determined, at least in part, by the attributes of the storage object.

For example, in some embodiments a storage object has one or more name attribute to identify the storage object. The name attribute may be edited or assigned, for example by a system facilitating the operation of the storage object, contributors, and/or non-contributors. In some embodiments the name attribute is used to identify a storage object with a name that is human readable. In some embodiments the name attribute is provided or selected by an entity associated with the storage object to provide meaning as to the purpose of the storage object and/or content of the contributions to the storage object (e.g., the name "Rodes v. Kern" could connote a storage object created for a court case entitled "Rodes v. Kern"). The name may be edited or assigned, for example, at the time a storage object is created or thereafter.

For example, in some embodiments a storage object has one or more unique ID attribute to identify the storage object. In some embodiments a unique ID attribute functions similarly to a name attribute, but the value of the unique ID attribute may be in a form that is not human readable and/or a form that does not provide any innate meaning to humans (e.g., a unique ID may be a sequence of symbols, where each storage object is assigned a sequence of symbols that is different than any sequence applied to storage objects already existing in the system facilitating the operation of the storage object). In some embodiments a unique ID attribute functions similarly to a name attribute, but the value of the unique ID attribute is not be able to be edited by an entity, whereas in such embodiments a name attribute is able to be edited by an entity. In some embodiments a unique ID attribute functions similarly to a name attribute, but the value of the unique ID attribute is assigned by the system facilitating the operation of the storage object at the time the storage object is created, whereas in such embodiments a name attribute is able to be edited by an entity associated with the storage object.

For example, in some embodiments a storage object has one or more status attribute to indicate the state of the storage object. In some embodiments a status attribute includes an indication of whether entities associated with the storage object may make file contributions to the storage object. In some embodiments a status attribute includes an indication of whether entities associated with the storage object may access file contributions to the storage object (e.g., whether a simultaneous file exchange of the files each entity provided to the storage object has occurred). In some embodiments a status attribute includes an indication of whether contributors to the storage object may remove file contributions they have made (or other contributors have made) from the storage object. In some embodiments a status attribute includes an indication of whether the contents of the storage object have been provided to entities associated with the storage object.

In some embodiments a status attribute of a storage object may take on one of two values, where the two values indicate two states, where one state (e.g., a state indicated with the value "Locked" or "Closed") means that any entity associated with the storage object may not access the file contributions made by other entities associated with the storage object and where the other state (e.g., a state indicated by the value "Unlocked" or the value "Open") means that entities associated with the storage object may access file contributions made by other entities associated with the storage object. When a storage object takes on this later state it may indicate that the simultaneous file exchange of files provided by the entities has occurred. In some embodiments a status attribute of a storage object may take on one of two values, where the two values indicate two states, where one state (e.g., a state indicated by the value "Locked" or the value "Closed") means that any given contributor to the storage object may not access the file contributions of other contributors to the storage object and where the other state (e.g., a state indicated by the value "Unlocked" or the value "Opened") means that any given contributor to the storage object may access the file contributions of other contributors to the storage object. The values "Locked"/"Unlocked" and "Closed"/"Opened" are merely examples. The values associated with the states or the values of attributes should be understood to vary across embodiments. In some embodiments the value of a status attribute of a storage object changes upon the occurrence of certain conditions (e.g., conditions specified in the rules attribute of the storage object). In some embodiments the status attribute of a storage object is assigned a value at the time the storage object is created (e.g., the value of the status attribute is "Locked") and that value persists until the occurrence of certain conditions (e.g., conditions specified in the rules attribute of the storage object that must occur for the simultaneous file exchange to take place), at which point the value of the status attribute changes (e.g., the value of the status attribute is changed to "Unlocked"). In some embodiments once the value of a status attribute changes from its initial value to another value the value cannot be changed again. In some embodiments once the value of a status attribute changes from its initial value to another value the value can be changed again (e.g., some or all of the files made available through the simultaneous file exchange are no longer made available to the parties).

For example, in some embodiments a storage object has one or more contributions attribute. In some embodiments the contributions attribute includes information about each of the file contributions made to the storage object. In some embodiments information about the file contributions made to the storage object includes some or all of the following information concerning each such file contribution: information to identify the file contribution (e.g., filename, a unique identifier, some or all of the content of the file contribution, etc.), information to identify the contributor that made the file contribution (e.g., email address, username, IP address, name, social security number, computerID, organization, title, etc.), the size of the file contribution (e.g., in terms of computer storage), the file type of the file contribution, information about the entities that may access the file contribution and/or be provided the file contribution, the date the file contribution was last modified (e.g., the date the file was last modified), the date the file contribution was created (e.g., the date the file was created), whether the file is encrypted, how the file is encrypted, the date the file contribution was made by the contributor, etc.

For example, in some embodiments a storage object has a creation date attribute. This date is the date that the storage object was created by either a system facilitating the storage object, an entity associated with the storage object, or another entity not associated with the storage object. In some embodiments information about an entity or entities that created the storage object is provided.

For example, in some embodiments a storage object has a last modified date attribute. In some embodiments the last modified date is the date that the storage object was last modified by either a system facilitating the operation of the storage object or an entity associated with the storage object. For example, in some embodiments the last modified date is the date that an attribute of the storage object was last modified or the date that a file contribution was last provided to the storage object. In some embodiments information about an entity or entities that last modified the storage object is provided.

For example, in some embodiments a storage object has one or more contributors attribute. In some embodiments a contributors attribute includes information about some or all of the contributors to the storage object. In some embodiments information about the contributors includes some or all of the following information: information to identify the contributor (e.g., email address, username, IP address, name, social security number, computerID, organization, title, etc.), the aggregate size of the file contributions made by the contributor (e.g., in terms of computer storage), the file contributions provided to the contributor and/or the file contributions accessed by the contributor, the date the contributor last made a file contribution, the date the contributor last accessed the system facilitating the operation of the storage object, whether the contributor has indicated through a confirmation that they have made all of the file contributions they intend to make, information indicating the financial status of the contributor (e.g., a balance credited to the contributor, a bank account balance of contributor, an electronic funds account balance of a contributor, etc.), a record of past actions taken by the contributor within the system facilitating the storage object, contact information for the contributor (e.g., phone number, address, email address, fax number, username or handle for social media networks, etc.), billing information about the contributor (e.g., credit card information, bank routing information, digital currency information, etc.), and information indicating the occupation and/or title of the contributor.

For example, in some embodiments a storage object has one or more non-contributor attribute. In some embodiments the non-contributor attribute includes information about some or all of the non-contributors associated with the storage object. In some embodiments information about the non-contributors includes some or all of the following information: information to identify the non-contributors (e.g., email address, IP address, username, name, social security number, computerID, organization, occupation, title, etc.), the date the non-contributor last accessed the system facilitating the operation of the storage object, information indicating the financial status of the non-contributor (e.g., a balance credited to the non-contributor), a record of past actions taken by the non-contributor within the system facilitating the operation of the storage object, contact information for the non-contributor (e.g., phone number, address, email address, fax number, username or handle for social media networks, etc.), billing information about the non-contributor (e.g., credit card information, bank routing information, digital currency information, etc.) and information indicating the occupation and/or title of the non-contributor. In some embodiments contributors and non-contributor are both considered under a single storage object attribute that concerns entities associated with the storage object.

For example, in some embodiments a storage object has one or more rules attribute. In some embodiments rules attributes provide parameters concerning the operation of the storage object. In some embodiments rules attributes are set by one or more entity associated with the storage object. In some embodiments rules attributes are set by the system facilitating the operation of a storage object. In some embodiments rules attributes are set at the time a storage object is created. In some embodiments rules attributes are set and may not later be changed. In some embodiments rules attributes are set and may later be changed (e.g., by a contributor, a non-contributor, and/or a system facilitating the operation of a storage object).

In some embodiments a rules attribute determines, at least in part, which entities may make file contributions to the storage object. In some embodiments a rules attribute specifies requirements or limits on the number of contributors, non-contributors, and/or entities associated with the storage object. In some embodiments a rules attribute specifies requirements for any entity that is to be associated with the storage object, specifies requirements for any entity that is to be a contributor to the storage object, and/or specifies requirements for any entity that is to be a non-contributor to the storage object (such requirements may be enforced by comparing attributes of such entities to requirements in the rules attributes of the storage object).

In some embodiments a rules attribute determines, at least in part, whether entities may make file contributions to a storage object at a certain time. In some embodiments a rules attribute determines, at least in part, when entities may make file contributions to a storage object. For example, the rules attribute may include the specification of a certain time window when contributors may make file contributions to the storage object.

In some embodiments a rules attribute determines, at least in part, when file contributions are made available to contributors (i.e., when the simultaneous file exchange occurs and the time window or time windows over which the files subject to the exchange are thereafter made available). In some embodiments a rules attribute determines, at least in part, when file contributions are first provided to contributors (e.g., upon a certain occurrence, after a certain time has passed since that contributor made a file contribution, after each contributor has indicated through a confirmation that they have made all of their file contributions, after each contributor has made a file contribution, when one or more specified criteria is satisfied, upon a certain time, etc.). In some embodiments a rules attribute determines, at least in part, when file contributions are first provided to non-contributors (e.g., upon a certain occurrence, after a certain time has passed since a contributor made a file contribution, after each contributor has indicated through a confirmation that they have made all of their file contributions, after each contributor has made a file contribution, when one or more specified criteria is satisfied, upon a certain time, etc.). In some embodiments file contributions are made available and/or provided to contributors and non-contributors at different times, according to rules attributes for a storage object. In some embodiments file contributions are made available and/or provided to contributors and non-contributors at the same time, according to rules attributes for a storage object. In some embodiments the value of a rule attribute that determines at least in part when file contributions are first provided or made available to entities associated with a storage object may be changed. For example, a storage object may be created where the simultaneous file exchange is to occur after both parties make file contributions and after 5:00 PM. The behavior of the storage object may later be changed such that the simultaneous file exchange is to occur after both parties make file contributions and after 10:00 PM (e.g., through input received from some or all of the entities associated with the storage object). In some embodiments the simultaneous file exchange occurs such that the totality of each file contribution is made available to each party simultaneously (as opposed to the parties being released portions of the file contributions gradually in a bit-by-bit, byte-by-byte, etc. manner).

In some embodiments a rules attribute specifies requirements for file contributions that are to be made to the storage object (e.g., by comparing attributes of each file contribution to requirements in the rules attributes of the storage object).

In some embodiments a rules attribute determines, at least in part, when notice is provided to entities that a file contribution has been made to a storage object. In some embodiments a rules attribute determines, at least in part, when notice is provided to entities that a file contribution has been accessed by an entity or that a file contribution has been provided to an entity. In some embodiments a rules attribute determines, at least in part, when notice is provided to entities that a file contribution has been made available to an entity and/or a file contribution has been provided to an entity. In some embodiments a notice is provided to an entity that a file contribution has been made available to them. In some embodiments a notice is provided to an entity that a file contribution has been made available to them, where such notice contains a hyperlink to a website that facilitates the operation of the storage object. In some embodiments a notice is provided to an entity that a file contribution has been made available to them, where such notice contains instructions on how to access the storage object that the file contribution has been made available from. In some embodiments a notice provided to an entity that a file contribution has been made available to them contains as an attachment (e.g., an attachment to an email message where the notification is provided by email) one or more files where such files are file contributions made available to the entity receiving the notice.

In some embodiments a rules attribute determines the information about the file contributions made to the storage object that is made available to and/or provided to entities. For example, in some embodiments, at least some of the time, the full information about a file contribution is available to the entity that made the file contribution but only the filename of the file contribution is made available to entities other than the entity that made the file contribution, not the full information (e.g., contents) of the file contribution. In such an example, the full contents of the file contribution may be made available to and/or provided to entities other than the entity that made the file contribution at a later time once a certain criteria is met (e.g., all contributors have made a file contribution, after a certain duration of time, upon the occurrence of a certain time, etc.), according to the rules attribute. For example, in some embodiments the full information about a file contribution is available to the entity that made the file contribution but only the information that a file contribution has been (or has not been) made by an entity is available to entities other than the entity that made the file contribution, not the full information (e.g., contents) of the file contribution. For example, when an entity makes multiple file contributions to a storage object, in some embodiments the full information about all the file contributions is available to the entity that made the file contributions but only the information on the number of file contributions that have been made by the entity is available to entities other than the entity that made the file contribution, not the full information (e.g., contents) of the file contributions.

For example, in some embodiments a storage object has one or more type attribute. In some embodiments a type attribute identifies aspects of the behavior of the storage object. For example, in some embodiments a storage object has a type attribute indicating how the operation of the storage object is carried out according to the value therein. In some embodiments a storage object may be classified as a type, according to when the file contributions are made available to entities associated with the storage object (e.g., when the simultaneous file exchange is to occur). For example, a storage object with a certain type attribute value may make file contributions available to all contributors once all contributors have made file contributions to the storage object. For example, a storage object with a certain type attribute value may make file contributions available to all contributors once all contributors have made file contributions to the storage object but only at or after a specified time. In some embodiments, before a file contribution made to a storage object is made available to an entity that did not provide the file contribution, some or all contributors to the storage object must indicate through a confirmation that they have completed making file contributions to the storage object. In some embodiments the type attribute and rules attribute of a storage object are combined. That is to say, in some embodiments information described above as being found in the type attribute may instead exist in the rules attribute.

In some embodiments a rules attribute specifies when a storage object will cease to exist. In some embodiments a rules attribute specifies the conditions that must be met before a storage object will cease to exist. In some embodiments, when a storage object ceases to exist it (as well as the file contributions made to it) is no longer accessible to any entity.

In some embodiments a rules attribute specifies whether, when a simultaneous file exchange occurs, a storage object will provide all entities associated with the storage object that receive file contributions with all file contributions that were made to the storage object, or whether the storage object will provide all entities associated with the storage object that receive file contributions with only those files that were made to the storage object by other entities. It may be preferable, for the sake of ease of access to information and/or for the sake of completeness, to provide all entities associated with the storage object that receive file contributions with all file contributions that were made to the storage object regardless of which party provided the file contribution. On the other hand, it may be preferable, for the sake of efficiency and/or for the sake of simplicity to provide all entities associated with the storage object that receive file contributions with only those files that were made to the storage object by other entities.

In some embodiments a rules attribute specifies whether, when a simultaneous file exchange occurs, a storage object will provide all entities associated with the storage object all file contributions that were made to the storage object, or whether the storage object will provide all entities associated with the storage object with only file contributions that meet certain requirements (e.g., only file contributions meeting requirements pertaining to the following characteristics of a file: file size, file type, file extension, creation date, last modified date, author, content of the file, encryption of the file, presence or absence of metadata in the file, etc.).

In some embodiments a rules attribute specifies the costs associated with the use of the storage object by one or more entities. In some embodiments such costs are indicated in the rules attribute for the storage object. In some embodiments entities access a storage object through an interface associated with a system facilitating the operation of a storage object. In some embodiments this interface is provided through a website, an application, an app, etc. In some embodiments a cost is associated with creating a storage object. In some embodiments a cost is associated with accessing file contributions from a storage object (e.g., files provided by the parties in a simultaneous file exchange). In some embodiments a cost is associated with making file contributions to a storage object. In some embodiments a cost is associated with removing a file contribution from a storage object. In some embodiments a cost is associated with an entity being associated with a storage object. In some embodiments a cost is associated with the invitation of an entity to be associated with a storage object. In some embodiments a cost is associated with changing and/or setting the rules for the operation of a storage object (e.g., as set by the rules attributes for the storage object). In some embodiments a cost is associated with an entity that is associated with a storage object no longer being associated with the storage object. In some embodiments a cost is associated with an entity making file contributions to a storage object in excess of a certain aggregate size of computer memory (e.g., a cost associated with file contributions that bring the aggregate size of a contributor's file contribution above a 50 MB level, a cost associated with each KB in excess of a 1 GB level for a given contributor's file contributions). In some embodiments a cost is associated with making a file contribution to a storage object according to the attributes of the file (e.g., there are costs associated with making file contributions that have or do not have a certain file size, file type, last modified date, creation date, author, etc.). In some embodiments a cost is associated with making a file contribution to a storage object according to the timing that the file contribution is made (e.g., no costs are associated with making a file contribution before a certain time and a non-zero cost is associated with making a file contribution at or after a certain time). In some embodiments costs associated with the use of the storage object are borne by entities associated with a storage object. The presence of costs for certain actions associated with a storage object provides utility, as it is well known that there is often a correlation between the costs associated with a system and the impression of the brand of the product (e.g., products that are provided for no cost can provide the impression that they are low quality, products that are priced relatively cheaply can provide the impression that they are of little value, products that are priced relatively expensively can provide the impression that they are of high value, etc.).

In some embodiments the system facilitating the operation of a storage object is accessible through an interface (e.g., as provided through a website, application, app, etc.) that requires a login. In some embodiments as part of obtaining a valid login an entity must remit payment, provide an authorization code, or provide a credit. For example, an authorization code may be provided via email to an entity that has been invited to be associated with a storage object, where the provision of that authorization code as part of the login demonstrates that the entity is the one intended to be associated with the storage object.

In some embodiments as part of an entity performing certain actions while accessing the interface associated with the system facilitating the operation of the storage object (e.g., creating a storage object, accessing file contributions from a storage object, making file contributions to a storage object, removing a file contribution from a storage object, associating an entity with a storage object, inviting an entity to be associated with a storage object, changing and/or setting the rules for the operation of a storage object, making an entity that is associated with a storage object be no longer being associated with the storage object, making file contributions to a storage object in excess of a certain aggregate size of computer memory, making a file contribution to a storage object according to the timing that the file contribution is made, etc.) the entity must remit payment, provide an authorization code, or provide a credit. For example, an authorization code may be provided via email to an entity that has been invited to be associated with a storage object, where the provision of that authorization code within the interface associates the entity with the storage object they were invited to be associated with.

In some embodiments subscriptions are available to allow access to an interface to the system facilitating the operation of a storage object (e.g., a website, application, app etc.) that requires a login, where the subscription allows access over a set period of time. In some embodiments subscriptions are available to allow access to an interface to the system facilitating the operation of a storage object (e.g., a website, application, app, etc.) that requires a login, where the subscription allows access for a certain amount of uses (e.g., a certain amount of logins, a certain amount of storage objects created, a certain amount of file contributions accessed, etc.). In some embodiments the handling of costs associated with the system facilitating the operation of a storage object is accomplished through well-known methods involving electronic forms of payment including online credit card transactions, Pay Pal transfers, transfers of cryptocurrencies (e.g., bitcoin, litecoin, dogecoin, darkcoin, peercoin, etc.), electronic drafting from bank accounts (e.g., through the use of bank routing information) and many other forms of electronic funds or credit transfer.

In some embodiments costs associated with a storage object are borne by one entity associated with the storage object. In some embodiments costs associated with a storage object are borne by entities associated with the storage object equally. In some embodiments costs associated with a storage object are borne by entities associated with the storage object according to the actions taken by each entity. In some embodiments costs associated with a storage object are not borne by entities associated with the storage object equally. In some embodiments costs associated with a storage object are not borne by entities associated with the storage object according to the actions taken by each entity. In some embodiments an entity that invites another entity to become associated with a storage object, an entity that makes a file contribution, an entity that accesses a file contribution, an entity that creates a storage object, or an entity that performs another action with regard to a storage object receives a credit that can be used to offset costs associated with storage objects in the future. Each of these possible arrangements allows for treatment of costs according to the convenience/desires of the entities or according to the particular needs for the simultaneous file exchange that will occur. For example, for ease of use it may be preferable to have a single entity handle the creation of the storage object, the invitation of another entity to become associated with the storage object, and the payment of costs associated with the storage object. The prevents the situation of an entity being invited to become associated with a storage object while at the same time being presented with costs associated with becoming associated with the storage object.

In some embodiments one or more of the foregoing attributes are not present in a storage object. In some embodiments the functionality and/or purpose of two or more of the foregoing attributes are combined and implemented as a single attribute. In some embodiments additional attributes are present in a storage object.

In some embodiments the number of contributors in a storage object is limited (e.g., the number has an upper bound, the number has a lower bound, etc.). For example, it may be preferable for the sake of simplicity to limit the number of contributors in a storage object to two (e.g., in a negotiation to purchase of a good there are generally two parties—they buyer and the seller). For example, it may be preferable for the sake of simplicity to limit the number of contributors in a storage object to three (e.g., where there are two buyers bidding on a house there are generally three parties—two buyers and one seller). In some embodiments the number of contributors in a storage object is not limited. For example, it may be preferable for the sake of flexibility to not limit the number of contributors, but instead allow any number of contributors to be associated with the storage object (e.g. to allow for an unlimited number of bidders in an auction). In some embodiments the number of non-contributors associated with a storage object is limited (e.g., the number has an upper bound, the number has a lower bound, etc.). In some embodiments the number of non-contributors associated with a storage object is not limited (e.g., to allow for any number of attorneys representing one of the contributors to become non-contributors to the storage object). In some embodiments the number of entities associated with a storage object (e.g., contributors and non-contributors) is limited (e.g., the number has an upper bound, the number has a lower bound, etc.). This may be preferable, for example, for the sake of simplicity or for the sake of certainty that no additional entities will become associated with the storage object. In some embodiments the number of entities associated with a storage object is not limited. This may be preferable to allow for flexibility, as discussed above.

In some embodiments one or more entities are contributors to a storage object. In some embodiments a contributor to a storage object is an entity that makes a file contribution to the storage object. In some embodiments a contributor to a storage object is an entity that is permitted to make a file contribution to the storage object (e.g., permitted to make a file contribution according to an attribute of the storage object and/or according to an attribute of the entity). In some embodiments a file contribution to a storage object is made through the use of computer networking between a computer wherein the storage object is located and the computer of the contributor. In some embodiments a file contribution to a storage object is implemented through the transfer of one or more file (e.g., through an interface provided by the system facilitating the operation of the storage object). In some embodiments the transfer of a file contribution to a storage object is implemented through the use of hardware and/or software. Each of these possible configurations allows for flexibility in the nature of the contributors to the storage object, for example according to the needs of the storage object to achieve the simultaneous file exchange.

In some embodiments contributors to a storage object are able to make file contributions to the storage object. In some embodiments all of the contributors in a storage object may make file contributions to the storage object. In some embodiments less than all of the contributors to a storage object may make file contributions to the storage object (e.g., of three entities designated as contributors to a storage object only the first two to make file contributions will be able to make file contributions). In some embodiments some or all of the contributors in a storage object may make file contributions to the storage object only when the storage object has one or more attribute value (e.g., an attribute value indicating the storage object is or is not accepting file contributions, an attribute value indicating the file contributions to the storage object have or have not been made available to certain entities, etc.). In some embodiments some or all of the contributors to a storage object may make file contributions to the storage object only when the contributor has one or more attribute value (e.g., an attribute value identifying the contributor as one permitted to make file contributions to the storage object according to the attributes of the storage object, an attribute value indicating the number of file contributions the contributor has made to the storage object, an attribute value indicating the aggregate file size of file contributions made by the contributor to the storage object, etc.).

In some embodiments entities have attributes. For example, in some embodiments an entity has one or more of the following attributes: name, age, username, gender, social security number, address, phone number, email address, IP address, computer ID, network ID, mobile ID number, computer electronic serial number, login, password, title, occupation. Further examples of attributes an entity has in some embodiments concern whether the entity is a contributor to a certain storage object, whether the entity is a contributor to any storage object, whether the entity has made any file contribution to a storage object, whether the entity has made any file contribution of a certain file type or not of a certain file type to a storage object, whether the entity has made any file contribution to a storage object having or not having certain content, and whether the entity was the entity that created a storage object. In some embodiments an entity has an attribute that concerns billing information for that entity (e.g., credit card information, bank routing information, credits for use with the system facilitating the operation of a storage object, electronic currency information, etc.) In some embodiments such attributes are held in computer memory.

In some embodiments entities have access to computers. As such, throughout this specification it is to be understood that when information is made available to an entity, is provided to an entity, or is received from an entity, a computer may be used to accomplish such actions.

In some embodiments an entity is one or more human. In some embodiments an entity is a non-human controlled at least in part by computer programming (e.g., a computer program). Entities access one or more computers, through which they access the system facilitating the operation of a storage object, among other things. In some embodiments it may be preferable to ensure that each entity associated with a storage object is a human (e.g., through the use of a CAPTCHA implemented on a website or app, or other test to determine input provided to an electronic system is being provided by a human) as there exists a preference from some humans only to perform a simultaneous file exchange with another human in some situations.

In some embodiments the number of file contributions that each contributor may contribute to a storage object is limited (e.g., a set number, an upper bound, a lower bound, etc.). For example, for the sake of simplicity each contributor may be limited to making a single file contribution to a storage object. For example, where each entity expects to receive only one file from the other party in a simultaneous file exchange each contributor may be limited to making a single file contribution to a storage object. In some embodiments the limitation on the number of file contributions that each contributor may contribute to the storage object is the same for each contributor (e.g., for the sake of fairness in treatment of the contributors). In some embodiments the limitation on the number of file contributions that each contributor may contribute to a storage object is not the same for each contributor (e.g., for the sake of flexibility). In some embodiments the number of file contributions that any given entity may access and/or receive from a storage object is limited (e.g., a set number, an upper bound, a lower bound, etc.). In some embodiments the limitation on the number of file contributions that each entity may access and/or receive from a storage object is the same for each contributor. In some embodiments the limitation on the number of file contributions that each contributor may access and/or receive from a storage object is not the same for each contributor. In some embodiments, when a contributor attempts to make a file contribution that would violate a limit on the requirements for file contributions (e.g., where such limit is specified in an attribute of the storage object), that file contribution is not made. In some embodiments, when a contributor attempts to make a file contribution that would violate a limit on the requirements for file contributions (e.g., where such limit is specified in an attribute of the storage object), notification is sent to one or more entities associated with the storage object.

All contributions made to a storage object are file contributions. For ease of reference, throughout this specification at times a file contribution is referred to simply as a "contribution". In some embodiments file contributions made to a storage object are in the form of one or more files. For example, a file contribution made by an entity to a storage object may consist of a single file, "File1.DOC". For example, a file contribution made to a storage object by an entity may consist of two files: "File1.DOC" and "File2.DOC". In some embodiments the form of the file contributions from all contributors in a storage object must be the same (e.g., all file contributions must have the same file type, all file contributions must have the same file extension, etc.). For example where images are to be exchanged the files may be limited to files with the file type of Portable Networks Graphics (PNG) file format. For example, where written reports are to be exchanged all files may be limited to files with the file extension .PDF. In some embodiments the form of the file contributions from all contributors in a storage object need not be the same. For example, where written reports are to be exchanged there may be a variety of file types that the written report may be provided in by each contributor (e.g., files ending with the file extension .DOC, files ending with the file extension .PDF, etc.). In some embodiments, when an entity attempts to make a file contribution that does not conform to limitations on the form of the file contribution (e.g., where such limitations are specified in an attribute of the storage object), the file contribution is not made. In some embodiments, when a contributor attempts to make a file contribution that would violate a limit on the form of the file contribution (e.g., where such limit is specified in an attribute of the storage object), notification is sent to one or more entities associated with the storage object.

In some embodiments limitations on file contributions are implemented according to a comparison of the attributes of the file contribution itself and the attributes of the storage object. For example, in some embodiments file contributions to a storage object must be or must not be in a certain form (e.g., in the form of a file with a certain file extension, in the form of a compressed file, in the form of a collection of files, etc.). For example, in some embodiments file contributions must have or must not have a creation date within a certain range or with a certain value. For example, in some embodiments file contributions must have or must not have a last modified date within a certain range or with a certain value. For example, in some embodiments file contributions must have or must not have a last accessed date within a certain range or with a certain value. For example, in some embodiments file contributions must have or must not have a certain author. For example, in some embodiments file contributions must have or must not have a filename with certain attributes (e.g., a filename containing the word "Proposal", a filename containing the file extension .ZIP, a filename having only letters, a filename greater than two characters long, a filename having no spaces, etc.). For example, in some embodiments file contributions must have or must not have certain metadata values. For example, in some embodiments file contributions must have or must not have metadata. For example, in some embodiments file contributions must have an indication that they do not have a computer virus. For example, in some embodiments file contributions must have an indication that they do not have a certain computer virus. For example, in some embodiments file contributions must have an indication that they are not corrupt. For example, in some embodiments file contributions must be written or must not be written in a certain programming language. For example, in some embodiments file contributions must be or must not be encrypted (e.g. to ensure security, to ensure ease of access). For example, in some embodiments file contributions must be or must not be encrypted in a certain manner (e.g., using a certain encryption technology, methodology, scheme, or key). For example, in some embodiments file contributions must have or must not have a bit rate within a certain range or with a certain value (e.g., to ensure fidelity of the information in the file). For example, in some embodiments file contributions must have or must not have a file size within a certain range or with a certain value (e.g., to ensure ease of transfer across computer networks). For example, in some embodiments file contributions must not be compressed (e.g., to ensure ease of access). For example, in some embodiments file contributions must have or not have digital rights management technology. For example, in some embodiments file contributions must have or not have digital signature. For example, in some embodiments file contributions must have or not have handwritten signature, as detected by algorithms well known in the art (e.g., when the file contribution is a scan of a paper document). For example, in some embodiments file contributions must have or not have (or must be provided in concert with) a digital certificate. For example, in some embodiments file contributions must have or not have (or must be provided in concert with) a digital watermark. For example, in some embodiments file contributions must have or not have certain licenses. For example, in some embodiments file contributions must not have the same attributes (e.g., filename, file size, etc.) as other file contributions made to the storage object). In some embodiments, when an entity attempts to make a file contribution that does not conform to limitations set on the attributes of file contributions, the file contribution is not allowed by the system facilitating the operation of the storage object. For example, in some embodiments file contributions must or must not share attributes with another file (e.g., filename, metadata, creation date, author, file type, file format, content, file size, encryption methodology, etc.). In such an example the other file may be provided by an entity associated with the storage object (e.g., as a file contribution or otherwise). In some embodiments file contributions must or must not meet a certain threshold for similarity of content with another file. Algorithms and heuristics for achieving file comparison to determine the similarity of two files are well known in the art. In such an example the other file may be provided by an entity associated with the storage object (e.g., as a file contribution or otherwise). In such an example the level of thresholding (e.g., 80% similarity, 15% difference) may be provided by an entity associated with the storage object (e.g., as an input to a prompt). In such an example the manner of file comparison (e.g., bit-wise file comparison, byte-wise file comparison, text-based file comparison) may be provided by an entity associated with the storage object (e.g., as an input to a prompt).

In some embodiments the file contribution provided to the storage object must be able to be saved by another entity when provided to another entity. Whereas some existing systems and methods for information sharing and file sharing prevent the capture of the information that is transferred from one entity to another, it is an object of some embodiments of the invention to ensure that the file provided in the simultaneous exchange through the use of a storage object is able to be downloaded by another entity. In some embodiments the file contributions made to the storage object must be able to be saved to the computer of another entity such that the file is later accessible to that entity through the normal function of the operating system of that entity's computer (e.g., the entity may choose where to save the file within their directory structure, the entity may access the information in the file by accessing the file later from within the location where the file is saved on their computer, etc.). Moreover, in some embodiments the files made available through the simultaneous file exchange performed by the system facilitating the operation of the storage object must be able to be downloaded and edited by the parties receiving them. In some embodiments the file contributions made to the storage object must be able to be selected from the files already accessible to the computer of the entity providing the file contribution (e.g., the entity providing the file contribution may choose from where on their computer or from a network location to select the file contribution). These and other requirements allow the entities accessing the file contributions to have assurances that hey can manipulate the files they receive in ways that are consistent with the normal operation of many computer systems.

In some embodiments the content of file contributions is limited. In some embodiments the content of a file contribution must have or must not have certain text (e.g., the file must contain the word "offer" within its contents). In some embodiments the content of a file contribution must have or must not have a certain value (e.g., where a file contribution is to include a monetary figure the figure must be equal to $100.00). In some embodiments the content of a file contribution must have or must not have a value within a certain range (e.g., where a file contribution is to include a monetary figure the figure must be greater than or equal to $500.00). For example, in some embodiments the content of a file contribution must have only text or must have no text. For example, in some embodiments the content of a file contribution must contain only numbers or must have no numbers. For example, in some embodiments the content of a file contribution must have words in a certain language or must not have words in a certain language. In some embodiments two or more of the previously described limitations are implemented in concert. These capabilities allow, for example, for flexibility to meet the needs and/or expectations of the entities in receiving what they expect from the other entity that is part of the simultaneous file exchange.

In some embodiments, when an entity attempts to make a file contribution to a storage object that fails to meet requirements for the content of file contributions, a notification is presented to entities associated with the storage object. For example, where a storage object requires that all file contributions must be files that do not contain the word "Draft" within their contents a contributor makes a file contribution that is a file that does contain the word "Draft" a notification (e.g., an email, text message, etc.) is presented to entities associated with the storage object. For example, where a storage object requires that all file contributions must be files with the file extension .DOC or files with the file extension .DOCX and a contributor makes a file contribution that is a file that does not have the file extension .DOC and does not have the file extension of .DOCX a notification (e.g., an email, text message, etc.) is presented to entities associated with the storage object.

Figure 11:
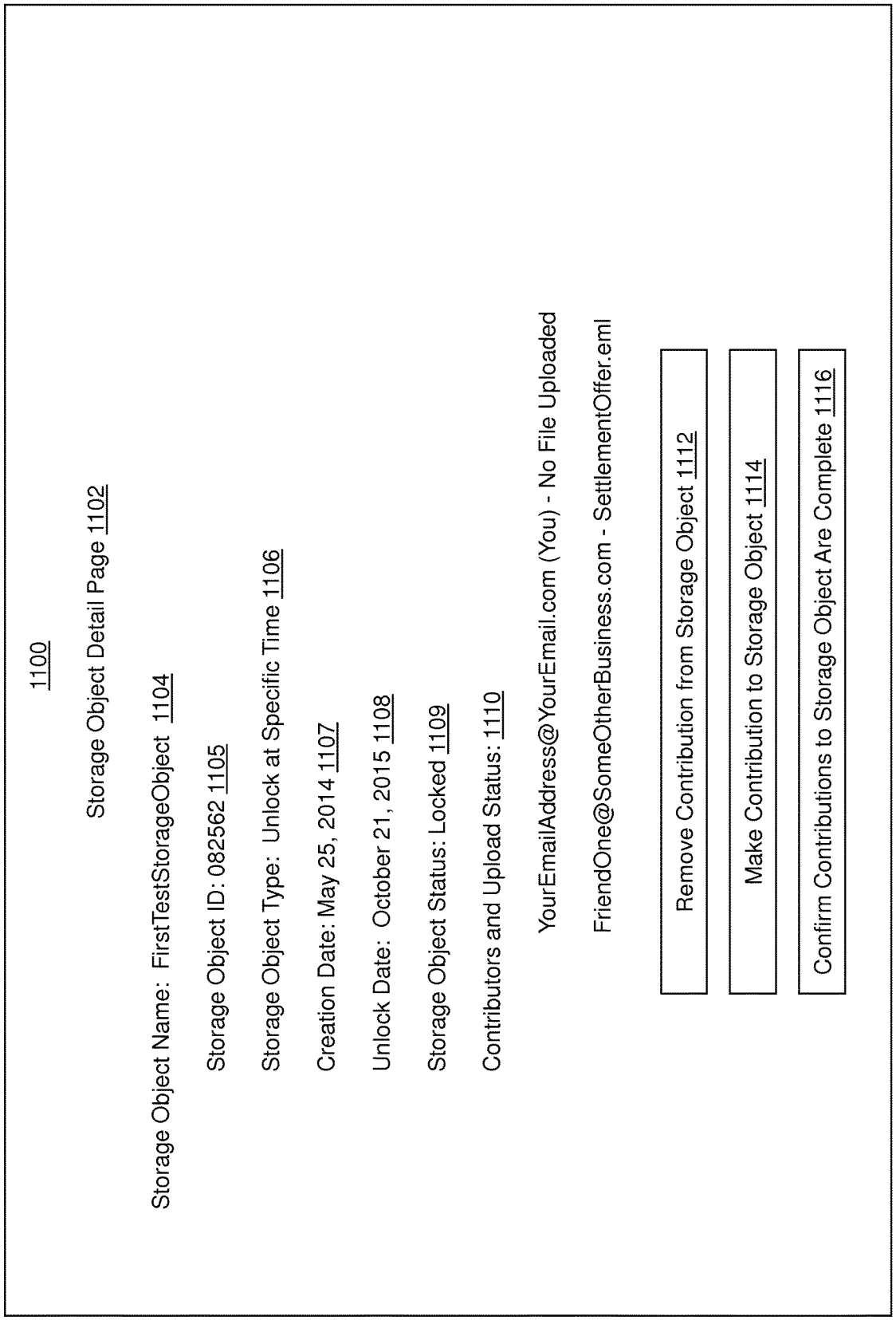
FIG. 11 is a depiction of an interface to display values of attributes of a storage object presented on a screen in some embodiments of the invention.
Figure 12:
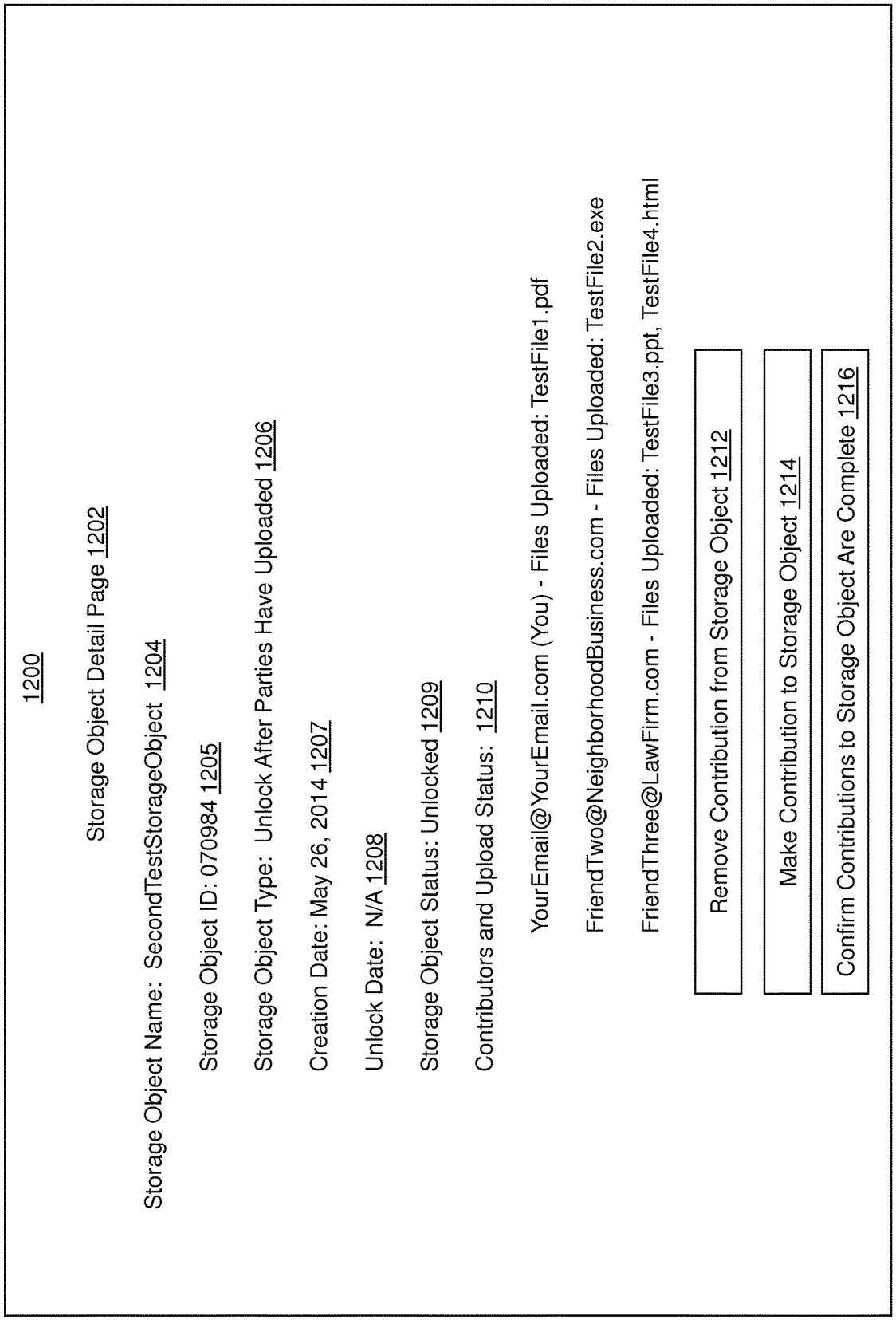
FIG. 12 is a depiction of an interface to display values of attributes of a storage object presented on a screen in some embodiments of the invention.

In some embodiments, when a file contribution to a storage object fails to meet requirements for the content of file contributions, information concerning the file contribution (e.g., how the file contribution fails to meet requirements for the content of file contributions, the content of the file contribution, the time the file contribution was made, etc.) is made available to one or more entities associated with the storage object (e.g., on a screen such as screen 1100 as depicted and discussed in connection with FIG. 11, on a screen such as screen 1200 as depicted and discussed in connection with FIG. 12, etc.). For example, where a storage object requires that all file contributions must be files that contain numbers within their contents, and a contributor makes a file contribution that is a file that does not contain numbers, information concerning the file contribution is made available to entities associated with the storage object. For example, where a storage object requires that all file contributions must be encrypted and a contributor makes a contribution that is a file that is not encrypted, information concerning the file contribution is made available to entities associated with the storage object.

In some embodiments file contributions made to a storage object are encrypted. In some embodiments file contributions made to a storage object are not encrypted. In some embodiments file contributions to a storage object are encrypted by contributors before the file contributions are made to the storage object. In some embodiments file contributions to a storage object are encrypted using so-called client-side encryption methods (e.g., encryption performed with one or more keys that are not known to the server where the storage object is located), as are known in the art. In some embodiments file contributions made to a storage object are encrypted by the system facilitating the operation of the storage object or a third party (e.g., through a service offered from a third party server) after the file contributions are received by the storage object. In some embodiments some or all of a given file contribution may be encrypted. In some embodiments each file contribution made to a storage object either is or is not encrypted. In some embodiments a given portion of a file contribution either is or is not encrypted (e.g., the metadata associated with the file contribution may not be encrypted but other data within the file contribution may be encrypted). In some embodiments the key that can perform decryption of an encrypted file contribution is made available to the storage object. In some embodiments the key that can perform decryption of an encrypted file contribution is not made available to the storage object (in such embodiments the key to perform decryption of a file contribution may be provided to the intended recipient of the file contribution from the entity making the file contribution in a manner other than through a file contribution to a storage object, such as email). By directly providing the key to other entities and not providing the key to the system facilitating the operation of the storage object, the contents of encrypted file contributions are not able to be accessed by systems or entities that have access to the contents of the file contributions in the storage object.

In some embodiments the system facilitating the operation of the storage object is implemented on a website that implements cryptographic protocols. For example, in some embodiments TLS (Transport Layer Security) or SSL (Secure Sockets Layer) is implemented such that file contributions made from an entities' computers are provided securely to one or more server through the operation of the website. Likewise, cryptographic protocols may be implemented to ensure that files provided from the website (e.g., files made available from the storage object through the simultaneous file exchange) are provided securely.

In some embodiments file contributions are made in unencrypted form, but the contents of the file contributions are encrypted by the system facilitating the operation of the storage object once the file contribution is made, such that only entities with the appropriate decryption key may access the contents of the file contribution. In such embodiments, the decryption key to access the contents of the file contribution may be provided to one or more entities according to the rules attribute of the storage object.

In some embodiments cryptographic protocols are implemented to ensure the security of files contributions provided to a storage object. Such cryptographic protocols may include Transport Layer Security (TLS) and Secure Sockets Layer (SSL), for example.

In some embodiments the storage object is created with a file contribution that is not provided by a contributor, but instead is present from the beginning when the storage object is created. For example, in some embodiments a storage object is created with a file contribution that is a file that presents information on the operation of the storage object, where this file is accessible to some or all of the entities associated with the storage object (e.g., as determined by the rules attribute for the storage object).

In some embodiments a contributor may remove file contributions they have made to the storage object. In some embodiments a contributor may not remove file contributions that they have made to the storage object. In some embodiments a contributor may or may not remove file contributions from a storage object according to one or more attributes of the storage object. In some embodiments a contributor may or may not remove file contributions from a storage object according to one or more attributes of the contributor (e.g., as determined by the rules attribute for the storage object). In some embodiments a non-contributor may or may not remove file contributions from a storage object according to one or more attributes of the non-contributor (e.g., as determined by the rules attribute for the storage object). In some embodiments a non-contributor may or may not remove file contributions from a storage object according to one or more attributes of the storage object. Each of these possible configurations allows for the variation of the irrevocability of the file contributions made to the storage object, so as to address the desire of the entities and/or to address the particular needs for the simultaneous file exchange that will occur through the use of the storage object.

In some embodiments the contents of one or more file contributions are made accessible and/or are provided to contributors to the storage object. This may be preferable when the entities are parties exchanging information directly. In some embodiments the contents of one or more file contributions are made accessible and/or are provided to entities that are not contributors in the storage object. This may be preferable where the contributors are attorneys representing parties to a litigation and the non-contributors are the parties they represent where both the contributors and the non-contributors need to receive the files from the simultaneous file exchange. In some embodiments the contents of one or more file contributions are made accessible and/or are provided to non-contributors to the storage object but not contributors to the store object. This may be preferable where the contributors are attorneys representing parties to a litigation and the non-contributors are the parties they represent where the non-contributors need to receive the files from the simultaneous file exchange but not the contributors. Each of these possible configurations allows for the variation on the accessibility of file contributions made to the storage object, so as to address the desires of the entities and/or to address the particular needs for the simultaneous file exchange that will occur through the use of the storage object.

In some embodiments the contents of one or more file contributions are provided to entities through the use of email, instant messaging, text messaging, or otherwise. In some embodiments only a portion of a given file contribution is made available to an entity. In some embodiments a preview of a file contribution (e.g., a truncated version of the contents of the file contribution, a version of the file contribution with redactions, a collection of selections of the contents of the file contribution, a summary of the file contribution, etc.) is made available and/or provided to entities associated with the storage object. In some embodiments only the filename of a given file contribution is made available to an entity. In some embodiments the contents of one or more file contributions are provided to entities through the use of a website, application, app, etc. In some embodiments information about the entities that have accessed or have been provided the contents of file contributions is made available or provided to other entities (e.g., through an email, instant message, on a website, application, app, etc.). In some embodiments information about the entities that have accessed or have been provided the contents of file contributions is made available or provided only to the entity that made the file contribution (e.g., through an email, instant message, on a website, application, app, etc.). Each of these possible configurations may be present in accordance with the status of the storage object (e.g., where the status is "Locked" and the simultaneous file exchange has not occurred, it may be that only the filename of a file contribution or only the date the file contribution was made is information available to entities associated with the storage object that did not provide the file contribution). Each of these possible configurations allows for the variation on the provision of file contributions made to the storage object, so as to address the desires of the entities and/or to address the particular needs for the simultaneous file exchange that will occur through the use of the storage object.

In some embodiments the number of contributors in a storage object is limited to a certain range or a certain value (e.g., two, less than four, greater than or equal to three, etc.). In some embodiments the number of contributors in a storage object changes over time (for example through contributors being added by other contributors or non-contributors, by contributors opting to no longer be contributors, by contributors being removed by other contributors or non-contributors, etc.). In some embodiments the number of contributors in a storage object is set by an entity at the time the storage object is created. In some embodiments the number of contributors in a storage object is set by an entity other than the entity that created the storage object. In some embodiments the number of contributors in a storage object is determined randomly (e.g., through the use of a random or pseudorandom process, etc.). In some embodiments the number of contributors in a storage object (or limits thereupon) is set by a system facilitating the operation of the storage object. In some embodiments the number of contributors to a storage object and/or the number of entities associated with the storage object may be limited to exactly two. In some embodiments the number of contributors to a storage object and/or the number of entities associated with the storage object may be limited to a certain whole number greater than two (e.g., 4, 10, 1000). In some embodiments the number of contributors to a storage object and/or the number of entities associated with the storage object may be set to be no greater than two. In some embodiments the number of contributors to a storage object and/or the number of entities associated with the storage object may be set to no greater than a certain whole number greater than two (e.g., 3, 5, 999).

In some embodiments the number of contributors in a storage object is set by an entity before any files have been contributed to the storage object. In some embodiments the number of contributors in a storage object is set at the time the first file contribution is made to a storage object. In some embodiments the number of contributors in a storage object is set at the time that all already named contributors have made at least one file contribution to the storage object. In some embodiments the number of contributors in a storage object is always able to be changed.

In some embodiments the number of file contributions each contributor may make to the storage object is unlimited. In some embodiments the number of file contributions each contributor may make to the storage object is limited. In some embodiments the maximum or minimum size of each of the file contributions a contributor may make to the storage object is limited to a certain range or value (e.g., a size in terms of megabytes, gigabytes, etc.). This can provide an upper limit on the load on the server, for example. This can also reflect expectations of the entities as to the information that is to be subject to the simultaneous file exchange. In some embodiments the aggregate size of the file contributions each contributor may make to the storage object is limited to a certain range or value (e.g., a size in terms of megabytes, gigabytes, etc.). This can provide an upper limit on the load on the server, for example. In some embodiments file contributions made by a contributor must be of a certain file type or must not be of a certain file type. In some embodiments a file contribution made by a contributor must have or must not have a certain file extension. For example in some embodiments a file contribution made by a contributor must have or must not have one or more of the following file extensions: .PDF, .DOC, .DOCX, .TXT, .EML, .XLS, .AAC, .AIF, .MP3, .MP4, .MP5, .MP6, .MP7, .WAV, .PPT, .HTML, .HTM, .XML, .ZIP, .Z, .RAR, .TAR, .GZ, .TAR.GZ, .EXE, .PNG, .JAR, .BMP, .JPG, .JPEG, .GIF, .TIF, .TIFF, .PIC, PICT, .WMV, .AVI, .MOV, .MPG, .PSD, .AI, .EPS, .DWG, .ISO, .DLL, .TEX, .TORRENT, .GDOC, .GDC, .ASC, etc.) Such limitations may be set by attributes of a storage object, for example.

In some embodiments the limitations on storage objects described above are determined by one or more entities associated with the storage object (e.g., through consensus, voting, a hierarchy between the parties, etc.). In some embodiments the limitations described above are determined through the use of computer algorithms, through the use of random or pseudorandom sequences, or otherwise. In some embodiments the limitations described above are determined by the entity that creates the storage object. In some embodiments the limitations described above are determined by an entity other than an entity that creates the storage object. In some embodiments the limitations described above are determined at least in part using information about the capabilities (e.g., storage capacity, processor speed, internet connectivity, etc.) of one or more computers (e.g., a computer used by a contributor, a computer used by a non-contributor, a computer used in implementing the storage object on a server). In some embodiments limitations on storage objects are manifested in attributes held in computer memory. Each of these possible configurations allows for the variation in the operation of the storage object, so as to address the desires of the entities and/or to address the particular needs for the simultaneous file exchange that will occur through the use of the storage object.

In some embodiments an entity creates a storage object. In some embodiments an entity that creates a storage object then invites one or more other entities to be associated with the storage object. In some embodiments the entity that created the storage object creates the limitations on the storage object (e.g., sets the rules attributes for the storage object). In some embodiments an entity other than the entity that created the storage object creates the limitations on the storage object (e.g., sets the rules attributes for the storage object). In some embodiments once an entity invites another entity to be associated with the storage object some or all of the limitations on the storage object (e.g., the limitations set by the rules attributes for the storage object) are editable by the entity that was invited. In some embodiments once an entity invites another entity to be associated with the storage object some or all of the limitations on the storage object (e.g., the limitations set by the rules attributes for the storage object) are editable by the entity that was invited as well as the entity that was the entity that was the inviter. In some embodiments once an entity invites another entity to be associated with the storage object some or all of the limitations on the storage object (e.g., the limitations set by the rules attributes for the storage object) may be accepted or rejected by the entity that is invited. In some embodiments once an entity invites another entity to be associated with the storage object some or all of the limitations on the storage object (e.g., the limitations set by the rules attributes for the storage object) may be modified by the entity that is invited.

In some embodiments a system facilitating the operation of a storage object uses a single time zone to indicate time to entities associated with a given storage object (e.g., as indicated as an offset from Greenwich Mean Time, as indicated as an offset from Coordinated Universal Time, as indicated in conformance with ISO 8601 or other standards, as indicated using terms such as Eastern Standard Time, Eastern Daylight Time, Central Standard Time, Central Daylight time, Mountain Standard Time, Mountain Daylight Time, Pacific Standard Time, Pacific Daylight Time, (and abbreviations and variants thereof) etc.). For example, the system facilitating the operation of the storage object can indicate the current time in a single time zone and also indicate the time that events related to a storage object have occurred or will occur in this single time zone (e.g., the time a storage object was created, the amount of time until a storage object changes state, the time a file contribution to a storage object was made available to an entity, the date a file contribution was last modified, etc.). This can prove useful, for example, when entities associated with a storage object are physically located in different time zones and each entity wishes to use a common time zone to reference times related to the storage object In some embodiments the system facilitating the operation of a storage object, for each entity associated with the storage object, uses a time zone selectable by the entity (e.g., as determined by information provided by the entity to the system facilitating the operation of the storage object). In some embodiments the system facilitating the operation of a storage object, for each entity associated with the storage object uses a time zone that corresponds to the time zone that the entity is currently in (e.g., as determined by information from the entities' computer, as determined by information provided by the entity to the system facilitating the operation of the storage object). This can prove useful, for example, when entities associated with a storage object are physically located in different time zones and each entity wishes to use their own time zone to reference times related to the storage object.

In some embodiments once a contributor makes a file contribution that file contribution cannot be removed from the storage object. In some embodiments once a contributor makes a file contribution that file contribution can be removed from the storage object. In some embodiments information about an entity removing a file contribution from a storage object is made known to some or all of the entities associated with the storage object. In some embodiments the date that a file contribution is made by a contributor to a storage object is information available to other entities associated with the storage object. This information may be made available through a record accessible through the system facilitating the operation of the storage object (e.g., a website, application or app associated with the storage object). This information may be made available through a record provided to an entity associated with a storage object (e.g., through email). This can be useful, for example, in showing that a file contribution was made before the entity that contributed the file contribution received a file contribution from another entity.

In some embodiments the time that file contributions are provided to entities associated with storage objects differs according to when (and if) each entity provided a file contribution to the storage object. For example, in some embodiments an entity making a file contribution to a storage object will have access to a file contribution made by another entity associated with the storage object no earlier than a set amount of time after the entities' own file contribution was made. This may be implemented using a timing mechanism that only allows for the entity to access file contributions made by other parties after the expiration of the timer.

In some embodiments, when a contributor makes a file contribution of multiple files to a storage object the system facilitating the operation of the storage object converts the multiple file contributions into a single file (e.g., a compressed file, a PDF file that represents multiple files merged into the single PDF file, etc.). In some embodiments the system facilitating the operation of the storage object converts a file contribution into a different file (e.g., so as to change the format of the contributed file to a different file type).

In some embodiments one or more of the attributes of a storage object is indicated visually in addition to or instead of through text (e.g., through the use of icons). In some embodiments one or more of the attributes of an entity is indicated visually in addition to or instead of through text (e.g., through the use of icons). In some embodiments one or more of the attributes of a file contribution is indicated visually in addition to or instead of through text (e.g., through the use of icons).

[1] In some embodiments an acceptable spread is used to determine if the information (e.g., values) in the files provided by contributors meet certain requirements as it concerns their degree of similarity or difference. The values could be, for example, monetary figures (e.g., $200) or other figures where the figures represent a bargaining position (e.g., an offer or an ask). The values provided in the file contributions from different parties are compared (e.g., subtracted from one another, evaluated to determine if they are identical, evaluated for their degree of similarity or degree of difference, etc.) and then the result of that comparison is measured against the acceptable spread to determine if the requirements for the simultaneous file exchange are met. The values provided in the files may be numerical figures, or the values may be arbitrarily complex. For example, a contributor may submit in a single file payment information that takes the form of a payment schedule that specifies an amount of a lump sum payment, the amount of any continuing payments, and the time and amount of each such payment. Together the entirety of the payment information may comprise the information (e.g., the value) to be compared. As such, the logic to determine if the information in multiple files satisfy a spread may be arbitrarily complex. This allows values combining multiple inputs (e.g., lump sum payments, continuing payments, the timing payments, etc.) to be compared.

[2] By way of example, using the framework above, the spread provided to the system facilitating the operation of a storage object may be that the total sum of all payments must differ by "less than $2,000" in order for a simultaneous file exchange to be allowed. Consider that a first contributor provides a file with a payment schedule that specifies a $10,000 lump sum payment on Jan. 1, 2019 and continuing payments of $5,000 on January 1 of each of the following four years. Consider that a second contributor provides a file with a payment schedule that specifies a $20,000 lump sum payment on Jun. 1, 2019 and continuing payments of $1,000 on the first of the month for each of the following five months. The total sum of all payments in the file the first contributor provided is $30,000 ($10,000 lump sum payment and four continuing payments of $5,000 each). The total sum of all payments in the file the second contributor provided is $25,000 ($20,000 lump sum payment and five continuing payments of $1,000 each). The difference between the two values (where the value is the total sum of all payments) is $5,000 ($30,000-$25,000). This figure does not satisfy the spread, which required that the total sum of all payments must differ by "less than $2,000" in order for the simultaneous file exchange to occur. As such, in this example the simultaneous file exchange would not occur (e.g., the storage object would not be allowed to change state from "Locked" to "Unlocked").

DETAILED DESCRIPTION OF THE FIGURES

FIG. 1 is a block diagram depicting a system for use in some embodiments of the invention, wherein a storage object is held in memory on a server. Server 102 is a computer with computer memory. Server 102 includes Memory 104. Memory 104 can be any type of computer memory. Storage Object 106 is within Memory 104. Storage Object 106 has Storage Object Attributes 108. In some embodiments Storage Object Attributes 108 are in the form of Storage Object Attributes 200 as depicted and discussed in connection with FIG. 2.

Figure 2:
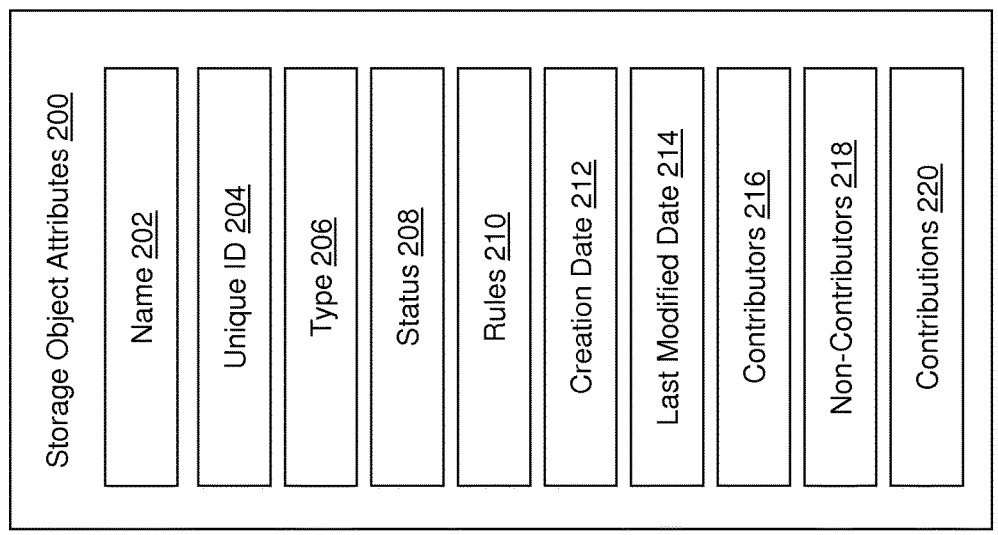
FIG. 2 is a block diagram depicting a system for use in some embodiments of the invention, wherein a storage object has attributes.

FIG. 2 is a block diagram depicting a system for use in some embodiments of the invention, wherein a storage object has attributes. In some embodiments Storage Object Attributes 200 are suitable for use as Storage Object Attributes 108 as depicted and discussed in connection with FIG. 1. In some embodiments Storage Object Attributes 200 include Name 202, Unique ID 204, Type 206, Status 208, Rules 210, Creation Date 212, Last Modified Date 214, Contributors 216, Non-Contributors 218, and Contributions 220. Name 202 is an attribute used to identify the storage object. For example, Name 202 may take on the value "Rodes v. Kern". Unique ID 204 is also an attribute to identify the storage object. For example, Unique ID 204 may take on the value "JB103182" for the storage object that has a name value of "Rodes v. Kern". Type 206 is an attribute to identify the behavior of the storage object. For example, Type 206 may take on the value "Unlock at Specific Time" when the storage object is to make available the file contributions in the storage object to entities at a certain time. Status 208 indicates the state of the storage object. For example, Status 208 may take on the value "Unlocked" indicating that entities associated with the storage object may access the file contributions made to the storage object (e.g., indicating that the simultaneous file exchange has occurred). Rules 210 is an attribute that provides parameters concerning the operation of the storage object. For example, Rules 210 may include instructions indicating that the storage object is to allow contributors to make file contributions until a certain time. Rules 210 may include a variety of rules or parameters, for example logical rules (e.g., those having an if-then structure, wherein, for possible inputs and/or states of a storage object there are specified outputs given those inputs and/or states). Creation Date 212 is the date that the storage object was created. For example, Creation Date 212 may take on the value "Sep. 28, 2013". Last Modified Date 214 is the date that the storage object was last modified. For example, Last Modified Date 214 may take on the value "May 22, 2014". Contributors 216 is an attribute that has information about contributors to the storage object. For example, Contributors 216 may be a list of contributors to the storage object, where each entry in the list has information about the various contributors such as "J L Scott (email: "JLScott@JLScottExample.com"; age: "33"; location: "Kilgore, Tex."; file contributions: "TrainImage1.jpg", "TrainImage2.gif", "TrainImage3.bmp"; aggregate file contribution size: 500 KB)"; "F Pendleton (email: "FPendleton@FPendletonExample.com"; age: "32"; location: "Longview, Tex."; file contributions "InsuranceData.xls", "FavoriteMusic.mp3", "LetterFromMom.doc", "Spaghetti Recipe.zip"; aggregate file contribution size: 4 MB)". In the example above Contributors 216 is a list of two contributors, "J L Scott" and "F Pendleton", where the contributor "J L Scott" has the email address "JLScott@JLScottExample.com", is 33 years old, is located in Kilgore, Tex., has made a file contribution in the form of three files "TrainImage1.jpg", "TrainImage2.gif", "TrainImage3.bmp" that have an aggregate size of 500 KB, and where the contributor "F Pendleton" has the email address "FPendleton@FPendletonExample.com", is 32 years old, is located in Longview, Tex., has made file contributions in the form of four files "InsuranceData.xls", "FavoriteMusic.mp3", "LetterFromMom.doc" and "Spaghetti Recipe.zip" that have an aggregate file contribution size of 4 MB). Non-Contributors 218 is an attribute that has information about non-contributors to the storage object. For example, Non-Contributors 218 may be a list of entities that are associated with the storage object that are non-contributors to the storage object, where each entry in the list has information about the various non-contributors such as "Z Rosenoff" (email: "ZRosenoff@ZRosenoffExample.com"; age: "32"; location: "Dallas, Tex."; last accessed storage object: Oct. 14, 2013; company: "AcmeCo"; title: "Human Resources Director"). In the example above Non-Contributors 218 is a list of one non-contributor, "Z Rosenoff" where the non-contributor "Z Rosenoff" has the email address "ZRosenoff@ZRosenoffExample.com", is 32 years old, is located in Dallas, Tex., last accessed the storage object on Oct. 14, 2013, is associated with AcmeCo and has the title "Human Resources Director". Contributions 220 is an attribute that has information about the file contributions to the storage object. For example, Contributions 220 may be a list of file contributions that have been made to the storage object, where each entry in the list has information about the file contributions such as "TrainImage1.jpg" (provided: "May 1, 2014"; size: 150 KB; provided by: "J L Scott"), "TrainImage2.gif" (provided: "May 2, 2014"; size: 100 KB; provided by: "J L Scott"), "TrainImage3.bmp" (provided: "May 3, 2014"; size: 250 KB; provided by: "J L Scott"), "InsuranceData.xls" (provided: May 2, 2014; size: 0.2 MB; provided by: "F Pendleton"), "FavoriteMusic.mp3" (provided: "May 12, 2014", size: 2.5 MB, provided by "F Pendleton"), "LetterFromMom.doc" (provided: "May 20, 2014", size 0.8 MB, provided by: "F Pendleton"), "Spaghetti Recipe.zip" (provided: "May 5, 2014", size 0.5 MB, provided by: "F Pendleton"). In the example given, information about each file contribution made to the storage object is found within the Contributions 220 attribute. It should be understood that in some embodiments Storage Object Attributes 200 include more or less attributes and more or less information therein than in the example embodiment depicted and discussed in connection with FIG. 2.

Figure 3:
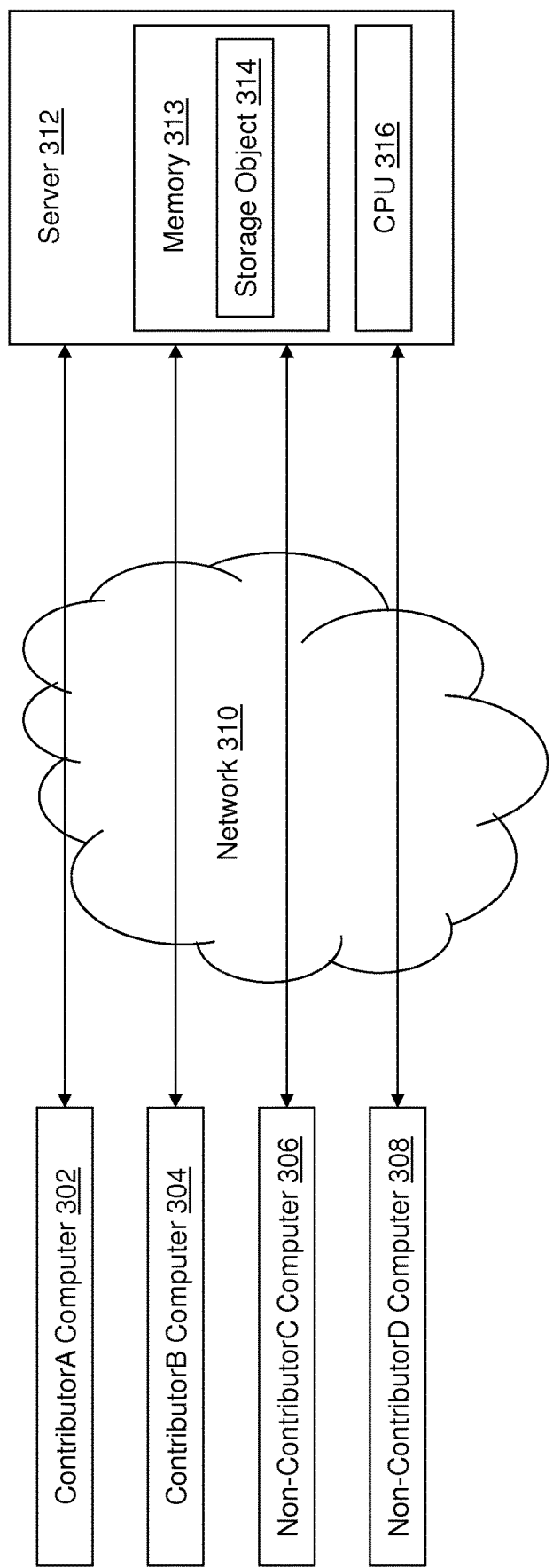
FIG. 3 is a block diagram depicting a system for use in some embodiments of the invention wherein a storage object is held on memory on a server.

FIG. 3 is a block diagram depicting a system for use in some embodiments of the invention wherein a storage object is held on memory on a server. In a network environment ContributorA Computer 302, ContributorB Computer 304, Non-ContributorC Computer 306, and Non-ContributorD Computer 308 each connect to Server 312 through Network 310. ContributorA Computer 302 is used by an entity known as ContributorA that is a contributor to Storage Object 314. ContributorB Computer 304 is used by an entity known as ContributorB that is a contributor to Storage Object 314. Non-ContributorC Computer 306 is used by an entity known as Non-ContributorC that is a non-contributor to Storage Object 314. Non-ContributorD Computer 308 is used by an entity known as Non-ContributorD that is a non-contributor to Storage Object 314. It should be appreciated that, though the figure illustrates two contributor computers and two non-contributor computers, in some embodiments there will be a different number of contributor computers and/or non-contributor computers. Network 310 may be the Internet or some other network. ContributorA Computer 302, ContributorB Computer 304, Non-ContributorC Computer 306, and Non-ContributorD Computer 308 each can communicate bi-directionally with Server 312. ContributorA, ContributorB, Non-ContributorC, and Non-ContributorD each are entities associated with Storage Object 314. Server 312 includes Memory 313 and CPU 316. Memory 313 includes Storage Object 314. CPU (central processing unit) 316 accesses Memory 313 and executes instructions therein to facilitate the operation of Storage Object 314. Memory 313 may be a non-transitory computer readable medium. Though depicted as one entity in the figure, in some embodiments Server 312 comprises one or more separate servers, located in one or more physical locations. Though depicted as existing entirely within Memory 313, in some embodiments Storage Object 314 exists in part in Memory 313 and in part in other memory (e.g., other memory within a computer other than Server 312, other memory within Server 312 not depicted in the figure, etc.). In some embodiments Memory 313 contains software that provides the state of Storage Object 314 to other computers (e.g., through Network 310), as well as the functionality to process inputs to and provide outputs from Storage Object 314. In some embodiments such instructions are provided by the system that facilitates the operation of Storage Object 314, where such instructions exist at least in part in Memory 313. For example, in some embodiments Memory 313 includes software for making information held in Storage Object 314 available to other entities through their computers (e.g., ContributorA Computer 302, ContributorB Computer 304, Non-ContributorC Computer 306, Non-ContributorD Computer 308, etc.) through a website, application, app, etc. Storage Object 314 receives one or more file contribution from ContributorA Computer 302. Storage Object 314 receives one or more file contribution from ContributorB Computer 304. According to rules concerning the operation of Storage Object 314 (e.g., rules attributes for Storage Object 314) one or more of the file contributions from ContributorA Computer 302 and the file contributions from ContributorB Computer 304 may be made available to entities within the network environment. For example, upon the satisfaction of certain requirements (e.g., as indicated in rules attributes for Storage Object 314) file contributions made to Storage Object 314 are made available and/or provided to one or more of: ContributorA Computer 302, ContributorB Computer 304, Non-ContributorC Computer 306, and Non-ContributorD Computer 308.

Figure 4:
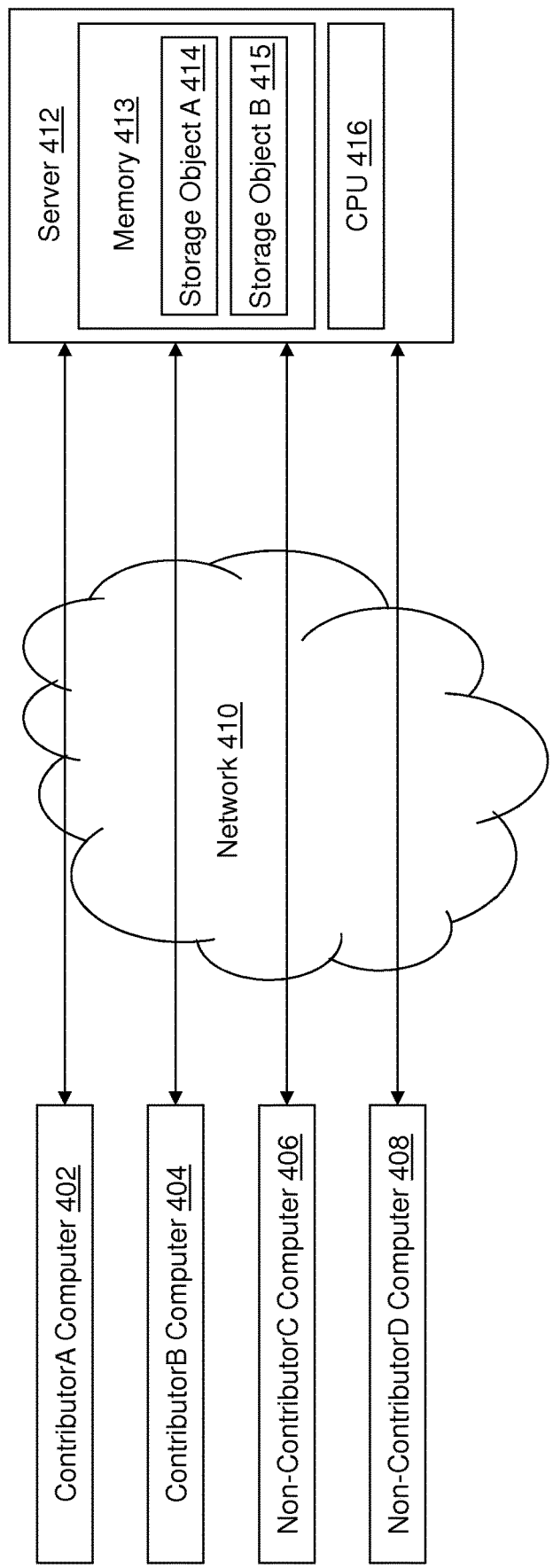
FIG. 4 is a block diagram depicting a system for use in some embodiments of the invention wherein multiple storage objects are held in memory on a server.

FIG. 4 is a block diagram depicting a system for use in some embodiments of the invention wherein multiple storage objects are held in memory on a server. In a network environment ContributorA Computer 402, ContributorB Computer 404, Non-ContributorC Computer 406, and Non-ContributorD Computer 408 each connect to Server 412 through Network 410. ContributorA Computer 402 is used by an entity known as ContributorA that is a contributor to Storage Object A 414 and is a contributor to Storage Object B 415. ContributorB Computer 404 is used by an entity known as ContributorB that is a contributor to Storage Object A 414 and a contributor to Storage Object B 415. Non-ContributorC Computer 406 is used by an entity known as Non-ContributorC that is a non-contributor to Storage Object A 414 and is a non-contributor to Storage Object B 415. Non-ContributorD Computer 408 is used by an entity known as Non-ContributorD that is a non-contributor to Storage Object A 414 and is a non-contributor to Storage Object B 415. It should be appreciated that, though the figure illustrates two contributor computers and two non-contributor computers, in some embodiments there will be a different number of contributor computers and/or non-contributor computers. It should be appreciated that, though the figure illustrates two storage objects in Memory 413 (Storage Object A 414 and Storage Object B 415), in some embodiments there will be a different number of storage objects within Memory 413 (e.g., three or more). Network 410 may be the Internet or some other network. ContributorA Computer 402, ContributorB Computer 404, Non-ContributorC Computer 406, and Non-ContributorD Computer 408 each can communicate bi-directionally with Server 412. ContributorA, ContributorB, Non-ContributorC, and Non-ContributorD each are entities associated with Storage Object A 414 and Storage Object B 415. Server 412 includes Memory 413 and CPU 416. Memory 413 includes Storage Object A 414 and Storage Object B 415. CPU (central processing unit) 416 accesses Memory 413 and executes instructions therein to facilitate the operation of Storage Object A 414 and Storage Object B 415. In some embodiments such instructions are provided by the system that facilitates the operation of Storage Object A 414 and the operation of Storage Object B 415, where such instructions exist at least in part in Memory 513. Though depicted as one entity in the figure, in some embodiments Server 412 comprises one or more separate servers, located in one or more physical locations. Though depicted as existing entirely within Memory 413, in some embodiments Storage Object A 414 and/or Storage Object B 415 exist in part in Memory 413 and in part in other memory (e.g., other memory within a computer other than Server 412, other memory within Server 412 not depicted in the figure, etc.). In some embodiments Memory 413 contains software that provides the state of Storage Object A 414 and Storage Object B 415 to other computers (e.g., through Network 410), as well as the functionality to process inputs to and provide outputs from Storage Object A 414 and Storage Object B 415. For example, in some embodiments Memory 413 includes software for making information held in Storage Object A 414 and Storage Object B 415 available to other entities through their computers (e.g., ContributorA Computer 402, ContributorB Computer 404, Non-ContributorC Computer 406, Non-ContributorD Computer 408, etc.) through a website, application, app, etc. Storage Object A 414 and Storage Object B 415 each receive one or more file contribution from ContributorA Computer 402. Storage Object A 414 and Storage Object B 415 each receive one or more file contribution from ContributorB Computer 404. According to rules concerning the operation of Storage Object A 414 (e.g., rules attributes for Storage Object A 414) one or more of the file contributions from ContributorA Computer 402 and one or more of the file contributions from ContributorB Computer 404 will be made available to associated with Storage Object A 414. For example, upon the satisfaction of certain requirements (e.g., as indicated in rules attributes for Storage Object A 414) file contributions made to Storage Object A 414 are made available and/or provided to one or more of: ContributorA Computer 402, ContributorB Computer 404, Non-ContributorC Computer 406, and Non-ContributorD Computer 408. According to rules concerning the operation of Storage Object B 415 (e.g., rules attributes for Storage Object B 415) one or more of the file contributions from ContributorA Computer 402 and one or more of the file contributions from ContributorB Computer 404 will be made available to entities associated with Storage Object B 415. For example, upon the satisfaction of certain requirements (e.g., as indicated in rules attributes for Storage Object B 415) file contributions made to Storage Object B 415 are made available and/or provided to one or more of: ContributorA Computer 402, ContributorB Computer 404, Non-ContributorC Computer 406, and Non-ContributorD Computer 408.

Figure 5:
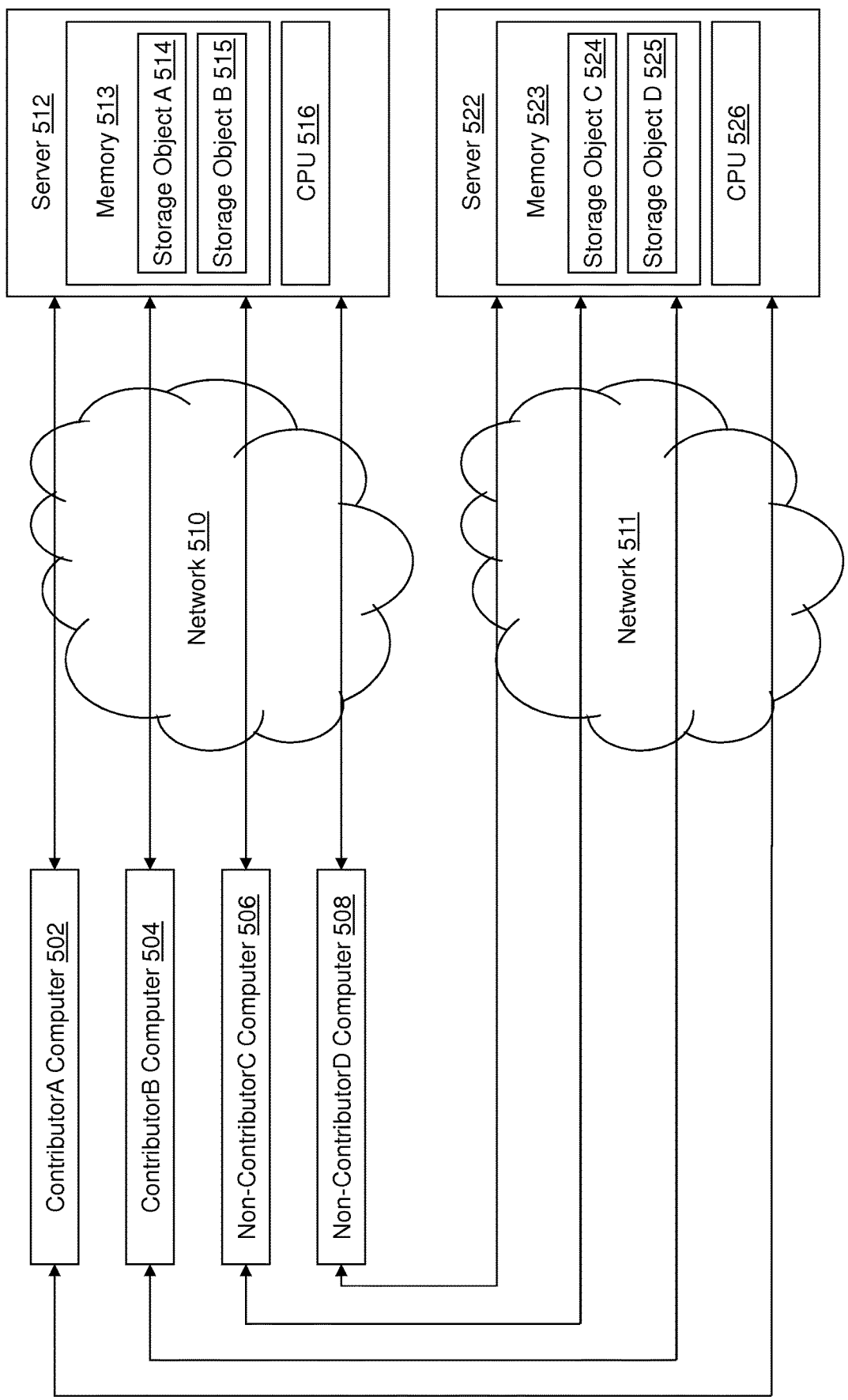
FIG. 5 is a block diagram depicting a system for use in some embodiments of the invention wherein multiple storage objects are held in memory on multiple servers.

FIG. 5 is a block diagram depicting a system for use in some embodiments of the invention wherein multiple storage objects are held in memory on multiple servers. In a network environment ContributorA Computer 502, ContributorB Computer 504, Non-ContributorC Computer 506, and Non-ContributorD Computer 508 each connect to Server 512 through Network 510 and each connect to Server 522 through Network 511. ContributorA Computer 502 is used by an entity known as ContributorA that is a contributor to Storage Object A 514, is a contributor to Storage Object B 515, is a contributor to Storage Object C 524, and is a contributor to Storage Object D 525. ContributorB Computer 504 is used by an entity known as ContributorB that is a contributor to Storage Object A 514, is a contributor to Storage Object B 515, is a contributor to Storage Object C 524, and is a contributor to Storage Object D 525. Non-ContributorC Computer 506 is used by an entity known as Non-ContributorC that is a non-contributor to Storage Object A 514, is a non-contributor to Storage Object B 515, is a non-contributor to Storage Object C 524, and is a non-contributor to Storage Object D 525. Non-ContributorD Computer 508 is used by an entity known as Non-ContributorD that is a non-contributor to Storage Object A 514, is a non-contributor to Storage Object B 515, is a non-contributor to Storage Object C 524, and is a non-contributor to Storage Object D 525. It should be appreciated that, though in the embodiment described presently ContributorA and ContributorB are contributors to each of Storage Object A 514, Storage Object B 515, Storage Object C 524, and Storage Object D 525, there are embodiments wherein entities that are contributors to certain storage objects are non-contributors to other storage objects. Likewise, it should be appreciated that, though in the embodiment described presently Non-ContributorC and Non-ContributorD are non-contributors to each of Storage Object A 514, Storage Object B 515, Storage Object C 524, and Storage Object D 525 there are embodiments wherein entities that are non-contributors to certain storage objects are contributors to other storage objects. Likewise, it should be appreciated that, though in the embodiment described presently ContributorA, ContributorB, Non-ContributorC, and Non-Contributor D are each associated with Storage Object A 514, associated with Storage Object B 515, associated with Storage Object C 524, and associated with Storage Object D 525, there are embodiments wherein entities that are associated with one storage object are not associated with another storage object.

It should be appreciated that, though the figure illustrates two contributor computers and two non-contributor computers, in some embodiments there will be a different number of contributor computers and/or a different number of non-contributor computers. It should be appreciated that, though the figure illustrates two storage objects in each of Memory 513 (Storage Object A 514 and Storage Object B 515) and Memory 523 (Storage Object C 524 and Storage Object D 525), in some embodiments there will be a different number of storage objects within Memory 513 and/or a different number of storage objects in Memory 523 (e.g., three or more). Network 510 may be the Internet or some other network. Network 511 may be the Internet or some other network. In some embodiments Network 511 and Network 510 are the same network. ContributorA Computer 502, ContributorB Computer 504, Non-ContributorC Computer 506, and Non-ContributorD Computer 508 each can communicate bi-directionally with Server 512. ContributorA Computer 502, ContributorB Computer 504, Non-ContributorC Computer 506, and Non-ContributorD Computer 508 each can communicate bi-directionally with Server 522. ContributorA, ContributorB, Non-ContributorC, and Non-ContributorD each are entities associated with Storage Object A 514, Storage Object B 515, Storage Object C 524, and Storage Object D 525.

Server 512 includes Memory 513 and CPU 516. Memory 513 includes Storage Object A 514 and Storage Object B 515. CPU (central processing unit) 516 accesses Memory 513 and executes instructions therein to facilitate the operation of Storage Object A 514 and Storage Object B 515. In some embodiments such instructions are provided by the system that facilitates the operation of Storage Object A 514 and the operation of Storage Object B 515, where such instructions exist at least in part in Memory 513. Though depicted as one entity in the figure, in some embodiments Server 512 comprises one or more separate servers, located in one or more physical locations. Though depicted as existing entirely within Memory 513, in some embodiments Storage Object A 514 and/or Storage Object B 515 exist in part in Memory 513 and in part in other memory (e.g., other memory within a computer other than Server 512, other memory within Server 512 not depicted in the figure, etc.). In some embodiments Memory 513 contains software that provides the state of Storage Object A 514 and Storage Object B 515 to other computers (e.g., through Network 510), as well as the functionality to process inputs to and provide outputs from Storage Object A 514 and Storage Object B 515. For example, in some embodiments Memory 513 includes software for making information held in Storage Object A 514 and Storage Object B 515 available to other entities through their computers (e.g., ContributorA Computer 502, ContributorB Computer 504, Non-ContributorC Computer 506, Non-ContributorD Computer 508, etc.) through a website, application, app, etc. Storage Object A 514 and Storage Object B 515 each receive one or more file contribution from ContributorA Computer 502. Storage Object A 514 and Storage Object B 515 each receive one or more file contribution from ContributorB Computer 504. According to rules concerning the operation of Storage Object A 514 (e.g., rules attributes for Storage Object A 514) one or more of the file contributions from ContributorA Computer 502 and the file contributions from ContributorB Computer 504 will be made available to entities within the network environment that are associated with Storage Object A 514. For example, upon the satisfaction of certain requirements (e.g., as indicated in rules attributes for Storage Object A 514) file contributions made to Storage Object A 514 are made available to and/or provided to one or more of: ContributorA Computer 502, ContributorB Computer 504, Non-ContributorC Computer 506, and Non-ContributorD Computer 508. According to rules concerning the operation of Storage Object B 515 (e.g., rules attributes for Storage Object B 515) one or more of the file contributions from ContributorA Computer 502 and one or more of the file contributions from ContributorB Computer 504 will be made available to entities associated with Storage Object B 515. For example, upon the satisfaction of certain requirements (e.g., as indicated in rules attributes for Storage Object B 515) file contributions made to Storage Object B 515 are made available and/or provided to one or more of: ContributorA Computer 502, ContributorB Computer 504, Non-ContributorC Computer 506, and Non-ContributorD Computer 508.

Server 522 includes Memory 523 and CPU 526. Memory 523 includes Storage Object C 524 and Storage Object D 525. CPU (central processing unit) 526 accesses Memory 523 and executes instructions therein to facilitate the operation of Storage Object C 524 and Storage Object D 525. In some embodiments such instructions are provided by the system that facilitates the operation of Storage Object C 524 and the operation of Storage Object D 525, where such instructions exist at least in part in Memory 513. Though depicted as one entity in the figure, in some embodiments Server 522 comprises one or more separate servers, located in one or more physical locations. Though depicted as existing entirely within Memory 523, in some embodiments Storage Object C 524 and/or Storage Object D 525 exist in part in Memory 523 and in part in other memory (e.g., other memory within a computer other than Server 522, other memory within Server 522 not depicted in the figure, etc.). In some embodiments Memory 523 contains software that provides the state of Storage Object C 524 and Storage Object D 525 to other computers (e.g., through Network 511), as well as the functionality to process inputs to and provide outputs from Storage Object C 524 and Storage Object D 525. For example, in some embodiments Memory 523 includes software for making information held in Storage Object C 524 and Storage Object D 525 available to other entities through their computers (e.g., ContributorA Computer 502, ContributorB Computer 504, Non-ContributorC Computer 506, Non-ContributorD Computer 508, etc.) through a website, application, app, etc. Storage Object C 524 and Storage Object D 525 each receive one or more file contribution from ContributorA Computer 502. Storage Object C 524 and Storage Object D 525 each receive one or more file contribution from ContributorB Computer 504. According to rules concerning the operation of Storage Object C 524 (e.g., rules attributes for Storage Object C 524) one or more of the file contributions from ContributorA Computer 502 and one or more of the file contributions from ContributorB Computer 504 will be made available to entities associated with Storage Object C 524. For example, upon the satisfaction of certain requirements (e.g., as indicated in rules attributes for Storage Object C 524) file contributions made to Storage Object C 524 are made available to and/or provided to one or more of: ContributorA Computer 502, ContributorB Computer 504, Non-ContributorC Computer 506, and Non-ContributorD Computer 508. According to rules concerning the operation of Storage Object D 525 (e.g., rules attributes for Storage Object D 525) one or more of the file contributions from ContributorA Computer 502 and one or more of the file contributions from ContributorB Computer 504 will be made available to entities associated with Storage Object D 525. For example, upon the satisfaction of certain requirements (e.g., as indicated in rules attributes for Storage Object D 525) file contributions made to Storage Object D 525 are made available and/or provided to one or more of: ContributorA Computer 502, ContributorB Computer 504, Non-ContributorC Computer 506, and Non-ContributorD Computer 508.

Figure 6:
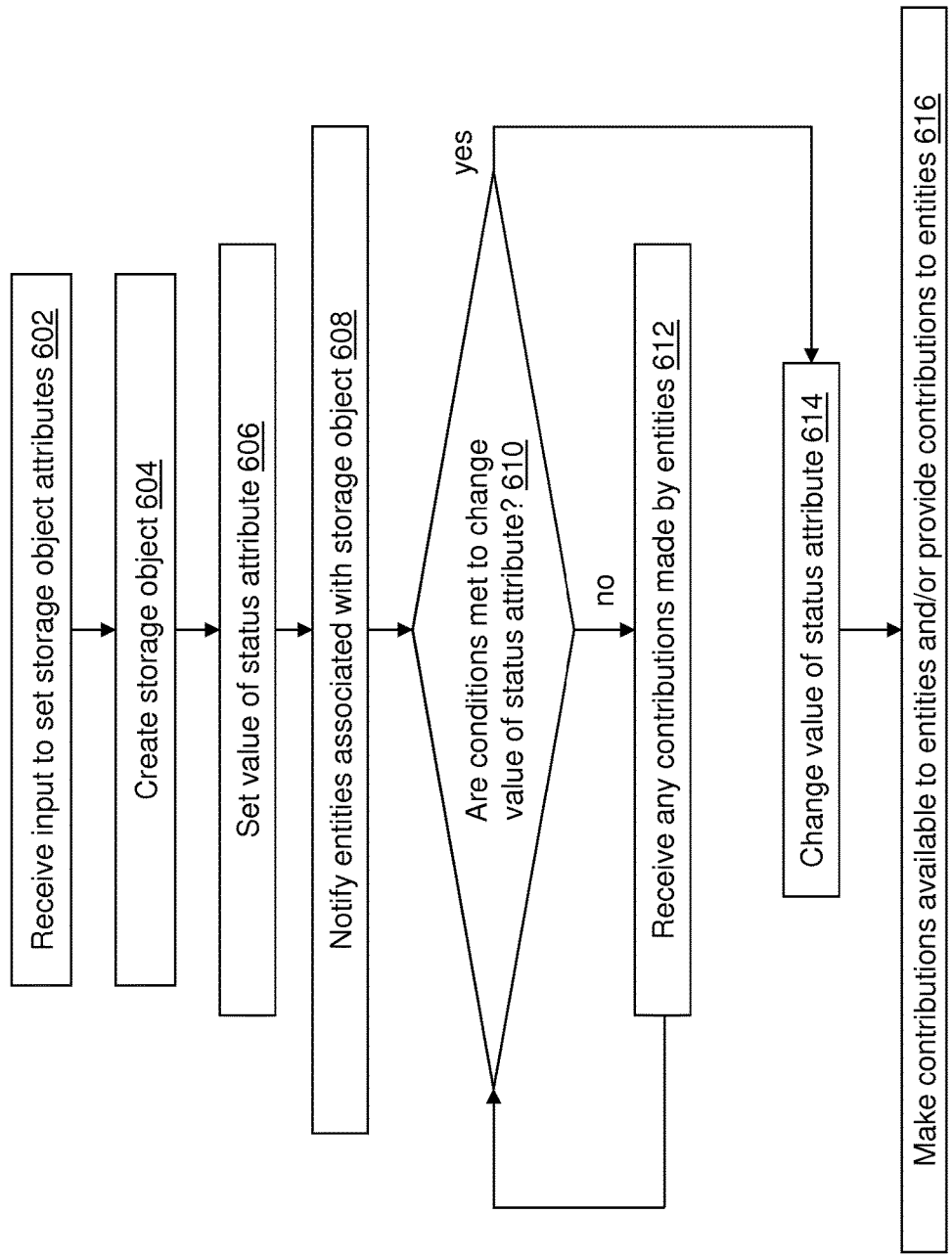
FIG. 6 is a flowchart of a method used in the operation of a storage object in some embodiments.

FIG. 6 is a flowchart of a method used in the operation of a storage object in some embodiments. A system that facilitates the operation of a storage object receives an input to set storage object attributes (block 602). The system may make use of, for example, computers with memory. The inputs may be received, for example, through the use of network connections between computers. Inputs may be received, for example, through the use of a website, application, or app associated with the system facilitating the operation of the storage object. The system then creates the storage object (block 604). A storage object exists in computer memory as a file or a collection of files, for example. The system then sets the value of the status attribute of the storage object (block 606). The status attribute of the storage object indicates the state of the storage object. In the illustrated embodiment, the status attribute may take on either the value "Locked" or the value "Unlocked"—where when the status attribute changes from "Locked" to "Unlocked" the simultaneous file exchange of files provided to the storage object occurs. The system then notifies entities associated with the storage object (block 608). This notification presents information pertaining to the creation of the storage object to entities associated with the storage object. In some embodiments this notification is accomplished through the use of an email, instant message, text message, or otherwise. Throughout this specification "text message" refers broadly to an electronic message between two or more mobile phones, or fixed or portable devices over a phone network. Text messages include messages sent using short messaging service (SMS), TMS, Multimedia Messaging Service (MMS), etc. In some embodiments this notification is accomplished through the use of a message available on a website, application, or app. In some embodiments the notification takes on the form of an invitation for an entity to contribute to a storage object or for an entity to become associated with the storage object (e.g., when the notification is provided to an entity other than the entity that initiated the creation of the storage object). Thereafter the system checks if conditions are met to change the value of the status attribute (block 610) so as to perform the simultaneous exchange of files provided to the storage object. In some embodiments the conditions to make this determination are found within the rules attributes of the storage object. For example, the conditions to be met before the status attribute is changed (e.g., a status attribute value is changed from "Locked" to "Unlocked") may be that it is a specific time, that it is no earlier than a specific time, that a certain amount of time has passed since an event (e.g., since the creation of the storage object, since the last file contribution made by an entity), that each entity named as a contributor has made a file contribution to the storage object, that each entity named as a contributor has indicated through a confirmation that they have made all of their file contributions to the storage object, that each entity named as a contributor has made a file contribution to the storage object and it is a specific time, that each entity named as a contributor has made a file contribution to the storage object and it is no earlier than a specific time, that each entity named as a contributor has indicated through a confirmation that they have made all of their file contributions to the storage object and it is a specific time, that some condition dependent at least in part upon a random or pseudorandom process has occurred, etc.

If conditions are not met to change the value of the status attribute the system moves to a state where it receives any contributions made by entities (block 612). In some embodiments the system, at this state, also receives confirmations from entities indicating that those entities have made all of the file contributions that they intend to make to the storage object. The flowchart depicted in this figure demonstrates that while the conditions to change the value of the status attribute are not met any file contributions that are made by entities will be accepted by the system. For example, in some embodiments when the value of the status attribute has not yet changed the system will be "Unlocked" such that file contributions from entities are received, but once the value of the status attribute changes to "Locked" such file contributions will no longer be received. The system will again check if the conditions are met to change the value of the status attribute (block 610). In some embodiments the system will move back to the inquiry of whether the conditions are met to change the value of the status attribute at a regular or irregular time interval (e.g., through the use of a timer). In some embodiments the system will move back to the inquiry of whether the conditions are met to change the value of the status attribute after a certain occurrence (e.g., after receiving a file contribution from an entity, after receiving confirmation from an entity, etc.). In some embodiments the system will move back to the inquiry of whether the conditions are met to change the value of the status attribute after a combination of the foregoing, or otherwise. For example, in some embodiments the system checks whether the conditions are met to change the value of the status attribute every 1000 milliseconds. For example, in some embodiments the system checks whether the conditions are met to change the value of the status attribute after receiving a file contribution from an entity. Once the systems checks whether the conditions are met to change the value of the status attribute and the conditions are met to change the value of the status attribute the value of the status attribute is changed (block 614). For example, in some embodiments the value of the status attribute is changed from "Unlocked" to "Locked". Thereafter contributions are made available to entities and/or provided to entities (block 616). For example, in some embodiments file contributions are made available to entities through the use of a web site, application, app, etc., where entities are able to access file contributions by accessing the website, application, app, etc. For example, in some embodiments file contributions are provided to entities through the use of email, text messages, multimedia messages, instant messaging, or otherwise. In such embodiments the system may send an email, text message, multimedia message, or instant message to an entity. In some embodiments the determination of when, and to which entities, file contributions are made available is determined, at least in part, by the rules attribute for a storage object. In some embodiments file contributions are made available to entities simultaneously or at approximately the same time (e.g., within 1 millisecond of one another, within 1 second of one another, within 1 minute of one another, etc.). In some embodiments file contributions are provided to entities simultaneously or at approximately the same time (e.g., within 1 millisecond of one another, within 1 second of one another, within 1 minute of one another, etc.). For example, in some embodiments emails notifying two entities that the file contributions made to a storage object are available are sent to the two entities associated with the storage object, where the two emails are sent within 1 second of one another. For example, in some embodiments two emails containing file contributions made to a storage object are sent to two entities associated with the storage object where the two emails are sent within 1 millisecond of one another. For example, a single notification may be sent as a notification to multiple entities (e.g., by addressing a notification that is an email to multiple entities, where the notification contains file contributions made to a storage object), where the single notification is necessarily sent at the same time to each entity. For example, a single notification may be sent as a notification to multiple entities (e.g., by addressing a notification that is an email to multiple entities, where the notification contains a link to a website where the file contributions are available), where the single notification is necessarily sent at the same time to each entity. In some embodiments the system facilitating the operation of the storage object may measure or estimate the delay between when a notification (e.g., in the form of an email, text message, etc.) is sent to an entity associated with the storage object and when the notification is received (e.g., propagation delay). Such methods are well known in the art. In some embodiments, the system facilitating the operation of the storage object can send notifications to entities associated with the storage object such that each message is received by the various entities at or around the same time, taking into account the delay.

FIG. 7 is a depiction of an interface to create a storage object presented on a screen in some embodiments of the invention. In some embodiments screen 700 comprises or is part of a webpage displayed on a browser. In some embodiments screen 700 is displayed as part of an app or application. For example, in some embodiments an entity must log in as a user of a website or app associated with the system that facilitates the operation of a storage object, and screen 700 is a screen within such a website or app. Screen 700 has a title 702. Title 702 has the value "Create a Storage Object Screen" in the illustrated embodiment. Title 702 serves to orient the user as to the screen that is displayed. Screen 700 allows users to provide input to a system, so as to set the value of attributes of a storage object that is being created (e.g., as part of step 602 and/or step 604 as depicted and discussed in connection with FIG. 6). Multiple prompts, in the form of buttons, radio buttons, links, text fields, check boxes, dropdowns, sliders, dials, calendar selectors, time selectors, etc. may appear on screen 700 to allow users to provide input in various embodiments. FIG. 7 depicts prompts through the use of brackets with dashed underlines, where such prompts may appear to a user differently during actual implementation than as they are depicted in FIG. 7. Select Storage Object Name 704 is a prompt that allows a user to enter the name of the storage object to be created. In some embodiments input provided from Name 704 determines the value of the name attribute of the storage object to be created (e.g., the value of the Name 202 entry depicted and discussed in connection with FIG. 2). Select Storage Object Type 706 is a radio button prompt that allows a user to select between the options "Unlock at Specific Time", "Unlock After Parties Have Uploaded", "Unlock At or After Specific Time Once Parties Have Uploaded", and "Unlock At Specific Time if Parties Have Uploaded". In some embodiments input provided from Select Storage Object Type 706 determines the value of the type attribute of the storage object to be created (e.g., the value of the Type 206 entry depicted and discussed in connection with FIG. 2). Require Confirmation Before Unlock 707 is a radio button prompt that allows a user to select between the options "Yes" and "No". In some embodiments input provided through Require Confirmation Before Unlock 707 determines information about the operation of the storage object to be created (e.g., information held in the Rules 210 entry as depicted and discussed in connection with FIG. 2). For example, if "Yes" is selected the simultaneous file exchange will not occur through the storage object until both parties (e.g., entities) have uploaded their file contributions to the storage object and have indicated through a confirmation that they have made all of their file contributions to the storage object. Select Unlock Date 708 is a prompt that allows a user to select a date used to determine when (or if) a storage object will change state (e.g., change state from "Locked" to "Unlocked") such that the simultaneous file exchange occurs through the storage object. In some embodiments the Select Unlock Date 708 prompt is presented graphically (e.g., a graphical calendar interface that allows the entity accessing screen 700 to select the date and/or time). In some embodiments input provided through Select Unlock Date 708 determines information about the operation of the storage object to be created (e.g., information held in the Rules 210 entry as depicted and discussed in connection with FIG. 2). For example, in some embodiments the user may enter in a date and/or time that a storage object will change state (e.g., change state from "Locked" to "Unlocked"). For example, the date and/or time could be entered as Apr. 19, 2019 or Apr. 19, 2019 at 10:00 am. For example, in some embodiments the user may enter in an amount of time until a storage object will change state (e.g., change state from "Locked" to "Unlocked") such that the simultaneous file exchange occurs through the storage object. For example, the amount of time could be set to any arbitrary amount of time (e.g., 12 hours) from the time the storage object is created. In some embodiments the Select Unlock Date 708 prompt appears only after a user has selected "Unlock at Specific Time", "Unlock At or After Specific Time Once Parties Have Upload", or "Unlock At Specific Time if Parties Have Uploaded" from the Select Storage Object Type 706 prompt. In some embodiments the Select Unlock Date 708 prompt does not appear after a user has selected "Unlock After Parties Have Uploaded" from the Select Storage Object Type 706 prompt. This is because, depending on the operation of the storage object, there may or may not be a need for a date to be provided to govern the operation of the storage object. The Invite Contributors 710 prompt is a prompt that allows a user to enter in information to identify entities to be invited to contribute to the storage object. In some embodiments input provided through the Invite Contributors 710 prompt determines information about the entities associated with the storage object (e.g., information held in the Contributors 216 entry as depicted and discussed in connection with FIG. 2). In some embodiments the entities are identified in the prompt by their email addresses. In some embodiments the entities are identified in the prompt by their first and/or last names. In some embodiments the entities are identified in the prompt by their usernames (e.g., usernames within the system facilitating the operation of the storage object, usernames for social networks, etc.). In some embodiments the entities are identified in the prompt with some other identifying information (e.g., a photo of the entity, a password or other text input specific to the entity, etc.).

The Invite Non-Contributors 711 prompt is a prompt that allows a user to enter in information to identify entities to be invited to be associated with the storage object as non-contributors. In some embodiments input provided through the Invite Non-Contributors 711 prompt determines information about the entities associated with the storage object (e.g., information held in the Non-Contributors 218 entry as depicted and discussed in connection with FIG. 2). In some embodiments the entities are identified in the prompt by their email addresses. In some embodiments the entities are identified in the prompt by their first and/or last names. In some embodiments the entities are identified in the prompt by their usernames (e.g., usernames within the system facilitating the operation of the storage object, usernames for social networks, etc.). In some embodiments the entities are identified in the prompt with some other identifying information (e.g., a photo of the entity, a password or other text input specific to the entity, etc.). In some embodiments non-contributors may not make file contributions to a storage object, but they may access file contributions made to a storage object.

Create Storage Object 712 is a button that a user can select to submit the information entered in prompts 704, 706, 707, 708, 710, and 711 to the system facilitating the operation of the storage object. It should be understood that in some situations in some embodiments more or less information and/or more or less prompts will be displayed on screen 700 than in the example illustrated in FIG. 7. It should be understood that in some embodiments the value of title 702 and the other text on screen 700 will differ from the text presented in the example depicted in FIG. 7.

Though not depicted in FIG. 7, in some embodiments the entity accessing screen 700 (i.e., the entity that creates the storage object) is further presented with a prompt to determine whether they wish to be a contributor or a non-contributor to the storage object. This allows flexibility in the use of the storage object. In some embodiments the entity accessing screen 700 (i.e., the entity that creates the storage object) must be a contributor to the storage object. Though not depicted in FIG. 7, in some embodiments the entity accessing screen 700 (i.e., the entity that creates the storage object) may choose whether or not to be associated with the storage object. If the entity chooses to not be associated with the storage object they will be neither a contributor nor a non-contributor to the storage object.

Though not depicted in FIG. 7, in some embodiments screen 700 further includes a prompt that allows an entity accessing screen 700 to specify the duration of time that the file contributions made to the storage object remain accessible and/or stored in memory. Alternatively, the prompt may allow an entity accessing screen 700 to specify the conditions upon which the file contribution to a storage object is no longer accessible and/or stored in memory (e.g., after certain conditions are met, at a certain time, etc.). The information entered in such a prompt may be stored in memory (e.g., as an attribute of the storage object).

Figure 8:
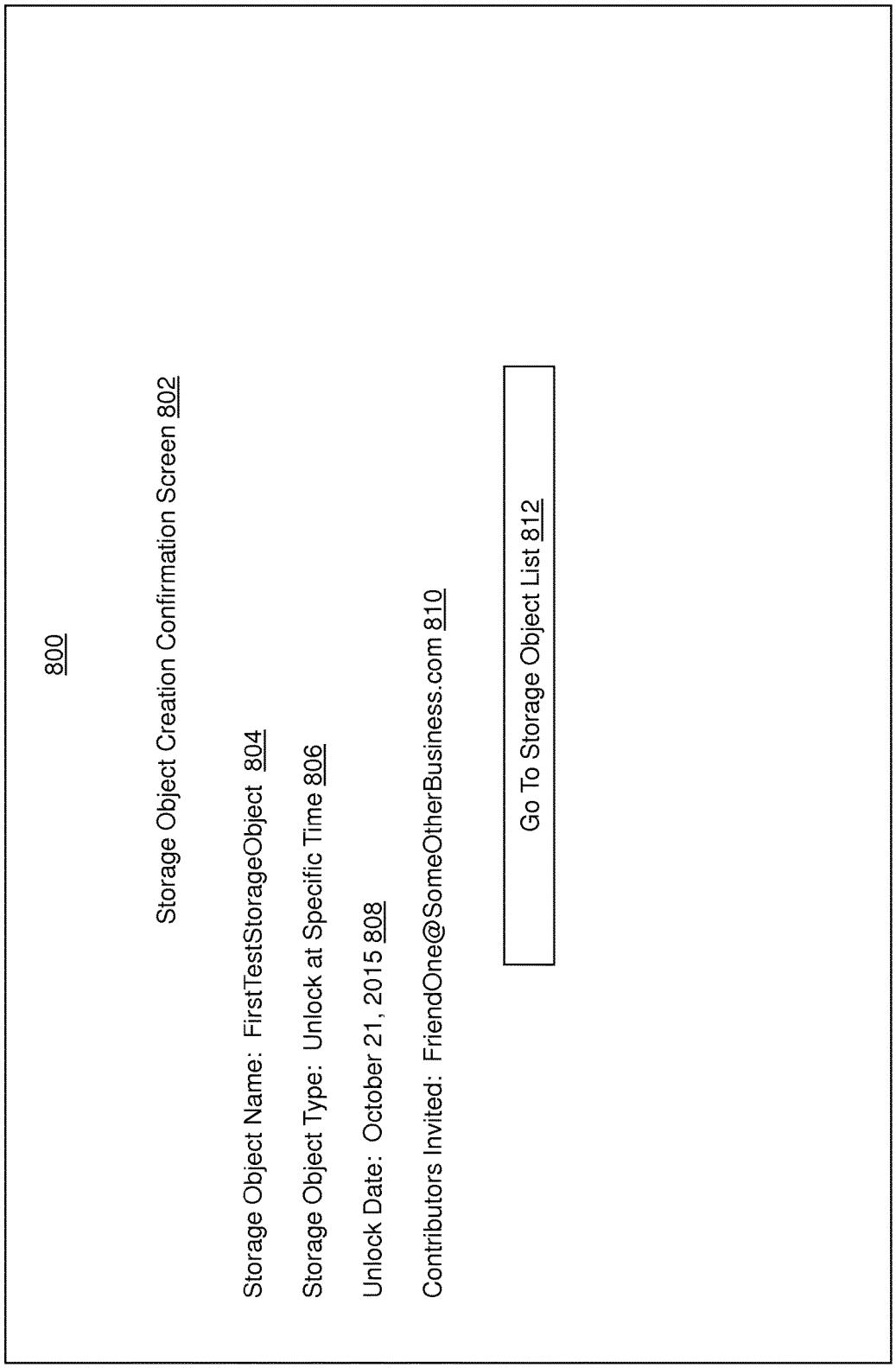
FIG. 8 is a depiction of an interface to confirm the creation of a storage object presented on a screen in some embodiments of the invention.

FIG. 8 is a depiction of an interface to confirm the creation of a storage object presented on a screen in some embodiments of the invention. In some embodiments screen 800 comprises or is part of a webpage displayed on a browser. In some embodiments screen 800 is displayed as part of an app or application. For example, in some embodiments an entity must log in as a user of a website or app associated with the system that facilitates the operation of a storage object, and screen 800 is a screen within such a website or app. Screen 800 has a title 802. Title 802 has the value "Storage Object Creation Confirmation Screen" in the illustrated embodiment. Title 802 serves to orient the user as to the screen that is displayed. For example, in some embodiments once a user selects the Create Storage Object 712 button depicted and discussed in connection with FIG. 7 screen 800 is displayed. Screen 800 provides confirmation of the value of attributes set for a storage object (e.g., as a result of attribute values set in screen 700 of FIG. 7). Storage Object Name 804 displays the value of the storage object name (e.g., as inputted to the Select Storage Object Name 704 prompt of FIG. 7). In the example illustrated in FIG. 8 the value of Storage Object Name 804 is "FirstTestStorageObject". Storage Object Type 806 displays the storage object type (e.g., as inputted to the Select Storage Object Type 706 prompt of FIG. 7). In the example illustrated in FIG. 8 the value of Storage Object Type 806 is "Unlock at Specific Time". Unlock Date 808 displays the unlock date for a storage object (e.g., as inputted to the Select Unlock Date 708 prompt of FIG. 7). In the example illustrated in FIG. 8 the value of Unlock Date 808 is "Oct. 21, 2015". Contributors Invited 810 displays the entities invited to contribute to the storage object (e.g., as inputted to the Invite Contributors 710 prompt of FIG. 7). In the example illustrated in FIG. 8 the value of Contributors Invited 810 is "FriendOne@SomeOtherBusiness.com" representing an entity invited to contribute to the storage object. Go To Storage Object List 812 is a button that a user can select to go to another screen. It should be understood that in some situations in some embodiments more or less information will be displayed on screen 800 than in the example illustrated in FIG. 8. It should be understood that in some embodiments the value of title 802 and the other text on screen 800 will differ from the text presented in the example depicted in FIG. 8.

Figure 9:
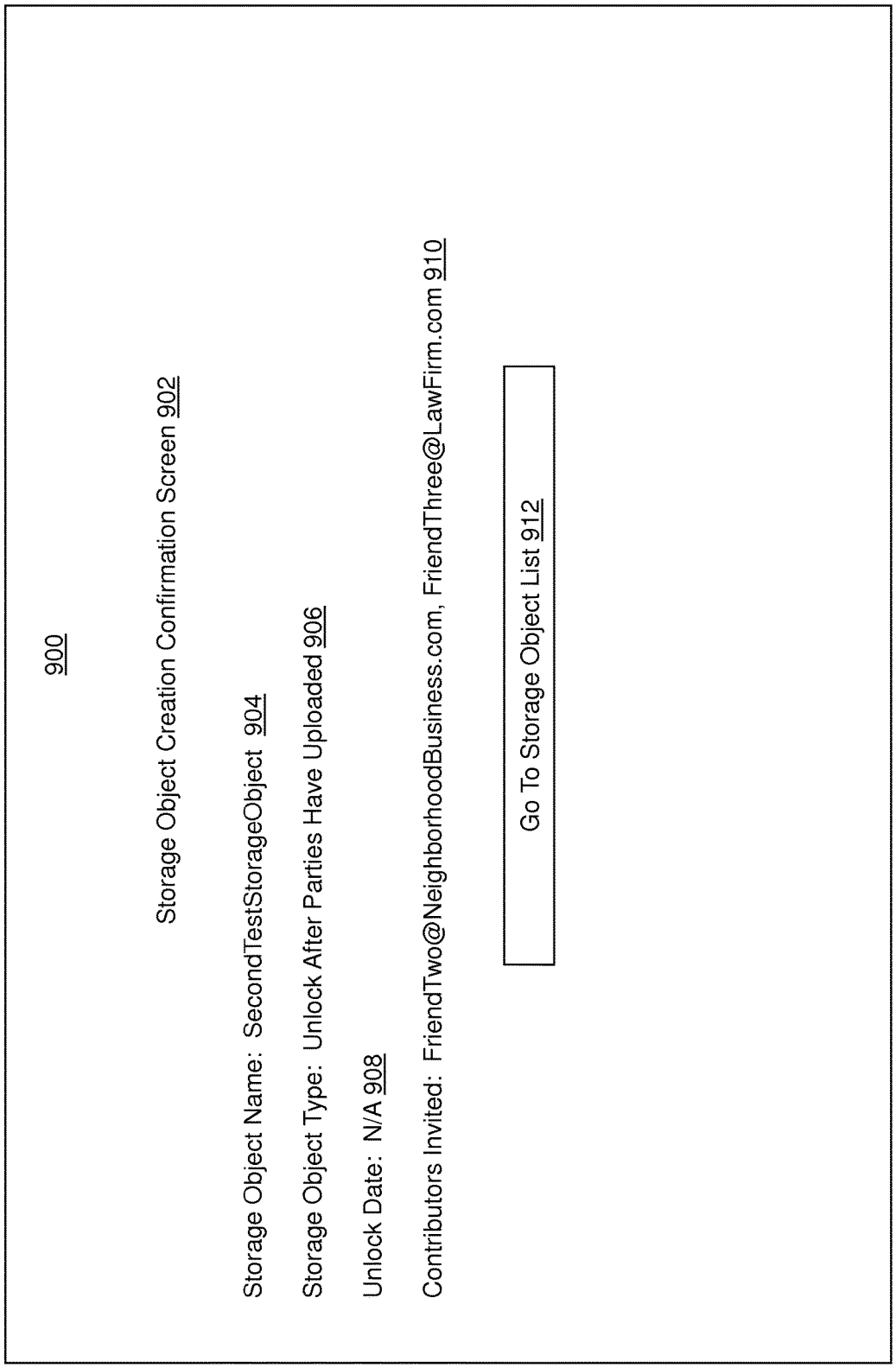
FIG. 9 is a depiction of an interface to confirm the creation of a storage object presented on a screen in some embodiments of the invention.

FIG. 9 is a depiction of an interface to confirm the creation of a storage object presented on a screen in some embodiments of the invention. In some embodiments screen 900 comprises or is part of a webpage displayed on a browser. In some embodiments screen 900 is displayed as part of an app or application. For example, in some embodiments an entity must log in as a user of a website or app associated with the system that facilitates the operation of a storage object, and screen 900 is a screen within such a website or app. Screen 900 has a title 902. Title 902 has the value "Storage Object Creation Confirmation Screen" in the illustrated embodiment. Title 902 serves to orient the user as to the screen that is displayed. For example, in some embodiments once a user selects the Create Storage Object 712 button depicted and discussed in connection with FIG. 7 the user is taken to screen 900. Screen 900 provides confirmation of the value of attributes set for a storage object (e.g., as a result of attribute values set in screen 700 of FIG. 7). Screen 800 of FIG. 8 and screen 900 display different values, representing situations where different values were inputted by a user in screen 700 of FIG. 7. Storage Object Name 904 displays the value of the storage object name (e.g., as inputted to the Select Storage Object Name 704 prompt of FIG. 7). In the example illustrated in FIG. 9 the value of Storage Object Name 904 is "SecondTestStorageObject". Storage Object Type 906 displays the storage object type (e.g., as inputted to the Select Storage Object Type 706 prompt of FIG. 7). In the example illustrated in FIG. 9 the value of Storage Object Type 906 is "Unlock After Parties Have Uploaded". Unlock Date 808 displays the unlock date for a storage object (e.g., as inputted to the Select Unlock Date 908 prompt of FIG. 7). In the example illustrated in FIG. 9 the unlock date for the storage object is set as "N/A". In some embodiments the value of "N/A" for Unlock Date 908 appears when the storage object type attribute takes on certain values (e.g., when the selection of the storage object type is of a type where it would not make sense or would be superfluous to specify an unlock date, where "N/A" indicates "not applicable"). Contributors Invited 910 displays the entities invited to contribute to a storage object (e.g., as inputted to the Invite Contributors 710 prompt of FIG. 7). In the example illustrated in FIG. 9 the values of Contributors Invited 910 are "FriendTwo@NeighborhoodBusiness.com" and "FriendThree@LawFirm.com" representing two entities invited to contribute to the storage object. Go To Storage Object List 912 is a button that can be selected to go to another screen. It should be understood that in some situations in some embodiments more or less information will be displayed on screen 900 than in the example illustrated in FIG. 9. It should be understood that in some embodiments the value of title 902 and the other text on screen 900 will differ from the text presented in the example depicted in FIG. 9.

FIG. 10 is a depiction of an interface to display storage object attributes on a screen in some embodiments of the invention. In some embodiments screen 1000 comprises or is part of a webpage displayed on a browser. In some embodiments screen 1000 is displayed as part of an app or application. For example, in some embodiments an entity must log in as a user of a website or app associated with the system that facilitates the operation of a storage object, and screen 1000 is a screen within such a website or app. Screen 1000 has a title 1002. Title 1002 has the value "Storage Object List" in the illustrated embodiment. Title 1002 serves to orient the user as to the screen that is displayed. For example, in some embodiments once a user selects the Go To Storage Object List 812 button depicted in FIG. 8 or selects the Go To Storage Object List 912 button depicted in FIG. 9, screen 1000 is displayed. In some embodiments screen 1000 provides information on storage objects that the user accessing screen 1000 is associated with. In some embodiments screen 1000 provides information on storage objects that the entity accessing screen 1000 is a contributor to. In the example illustrated in FIG. 10, two storage objects are displayed on screen 1000. Displayed with each storage object are one or more of attributes of that storage object.

In the example illustrated in FIG. 10 the first of the two storage object displayed is a storage object with Storage Object Name 1004 displayed as "FirstTestStorageObject". In the example illustrated in FIG. 10, associated with the storage object "FirstTestStorageObject" is a Storage Object ID 1005 with the value "082562", indicating the value of an attribute of the storage object. In some embodiments the value of Storage Object ID 1005 is a value automatically generated by the system facilitating the operation of the storage object. For example, in some embodiments each storage object created on the system has a unique storage object ID value. In some embodiments the unique storage object ID value is created such that a storage object created has a storage object ID value that is incremented over the storage object ID value for the previously created storage object. In some embodiments the storage object ID value is randomly generated. In the example illustrated in FIG. 10, associated with the storage object "FirstTestStorageObject" is a Storage Object Type 1006 with the value "Unlock at Specific Time", indicating the value of an attribute of the storage object. In the example illustrated in FIG. 10, associated with the storage object "FirstTestStorageObject" is a Creation Date 1007 with the value "May 25, 2014", indicating the value of an attribute of the storage object. In the example illustrated in FIG. 10, associated with the storage object "FirstTestStorageObject" is an Unlock Date 1008 with the value "Oct. 21, 2015", indicating the value of an attribute of the storage object. In the example illustrated in FIG. 10, associated with the storage object "FirstTestStorageObject" is a Storage Object Status 1009 with the value "Locked", indicating the value of an attribute of the storage object. In the example illustrated in FIG. 10, associated with the storage object "FirstTestStorageObject" is Contributors Invited 1010 with the value "FriendOne@SomeOtherBusiness.com", indicating the value of an attribute of the storage object. The button Go To Storage Object Detail Page 1003 allows a user accessing screen 1000 to access a screen with detail for the storage object "FirstTestStorageObject" by selecting the button. In some embodiments screen 1000 has such a button or other selectable object for each storage object displayed thereon.

In the example illustrated in FIG. 10 the second of the two storage objects displayed is a storage object with Storage Object Name 1014 displayed as "SecondTestStorageObject". In the example illustrated in FIG. 10, associated with the storage object "SecondTestStorageObject" is a Storage Object ID 1015 with the value "070984", indicating the value of an attribute of the storage object. In the example illustrated in FIG. 10, associated with the storage object "SecondTestStorageObject" is a Storage Object Type 1016 with the value "Unlock After Parties Have Uploaded", indicating the value of an attribute of the storage object. In the example illustrated in FIG. 10, associated with the storage object "SecondTestStorageObject" is a Creation Date 1017 with the value "May 26, 2014", indicating the value of an attribute of the storage object. In the example illustrated in FIG. 10, associated with the storage object "SecondTestStorageObject" is an Unlock Date 1018 with the value "N/A", indicating the value of an attribute of the storage object. In the example illustrated in FIG. 10, associated with the storage object "SecondTestStorageObject" is a Storage Object Status 1019 with the value "Unlocked", indicating the value of an attribute of the storage object. In the example illustrated in FIG. 10, associated with the storage object "SecondTestStorageObject" is Contributors Invited 1020 with the value "FriendTwo@NeighborhoodBusiness.com, FriendThree@LawFirm.com", indicating the value (or values, depending on the implementation in the specific embodiment) of an attribute (or attributes, depending on the implementation in the specific embodiment) of the storage object. The button Go To Storage Object Detail Page 1013 allows a user accessing screen 1000 to access a screen with detail for the storage object "SecondTestStorageObject" by selecting the button. In some embodiments screen 1000 has such a button or other selectable object for each storage object displayed thereon.

In the example illustrated in FIG. 10 there is information about two storage objects displayed. It should be understood that in some embodiments information about more or less storage objects may be displayed. It should be understood that in some situations in some embodiments information about no storage objects will be displayed on screen 1000 (e.g., when the entity accessing screen 1000 is not associated with any storage objects, etc.). It should be understood that in some situations in some embodiments more or less information will be displayed on screen 1000 than in the example illustrated in FIG. 10. It should be understood that in some embodiments the value of title 1002 and the other text presented throughout screen 1000 differs from the text presented in the example depicted in FIG. 10.

FIG. 11 is a depiction of an interface to display values of attributes of a storage object presented on a screen in some embodiments of the invention. In some embodiments screen 1100 comprises or is part of a webpage displayed on a browser. In some embodiments screen 1100 is displayed as part of an app or application. For example, in some embodiments an entity must log in as a user of a website or app associated with the system that facilitates the operation of a storage object, and screen 1100 is a screen within such a website or app. Screen 1100 has a title 1102. Title 1102 has the value "Storage Object Detail Page" in the illustrated embodiment. Title 1102 serves to orient the user as to the screen that is displayed. For example, in some embodiments once a user selects the Go To Storage Object Detail Page 1003 button depicted in FIG. 10 the user is taken to screen 1100. In some embodiments screen 1100 provides information on a storage object that the user accessing screen 1100 is associated with. In some embodiments screen 1100 provides information on a storage object that the entity accessing screen 1100 (i.e. the user accessing screen 1100) is associated with. In the example illustrated in FIG. 11 screen 1100 further has buttons selectable to make file contributions to a storage object and to remove file contributions from a storage object.

In the example illustrated in FIG. 11 the object displayed is a storage object with Storage Object Name 1104 displayed as "FirstTestStorageObject". In the example illustrated in FIG. 11, associated with the storage object "FirstTestStorageObject" is a Storage Object ID 1105 with the value "082562", indicating the value of an attribute of the storage object. In the example illustrated in FIG. 11, associated with the storage object "FirstTestStorageObject" is a Storage Object Type 1106 with the value "Unlock at Specific Time", indicating the value of an attribute of the storage object. In the example illustrated in FIG. 11, associated with the storage object "FirstTestStorageObject" is a Creation Date 1107 with the value "May 25, 2014", indicating the value of an attribute of the storage object. In the example illustrated in FIG. 11, associated with the storage object "FirstTestStorageObject" is an Unlock Date 1108 with the value "Oct. 21, 2015", indicating the value of an attribute of the storage object. In the example illustrated in FIG. 11, associated with the storage object "FirstTestStorageObject" is a Storage Object Status 1109 with the value "Locked", indicating the value of an attribute of the storage object. In the example illustrated in FIG. 11, associated with the storage object "FirstTestStorageObject" is Contributors and Upload Status 1110 with the information "YourEmailAddress@YourEmail.com (You)—No File Uploaded" and "FriendOne@SomeOtherBusiness.com—SettlementOffer.eml", indicating the value (or values, depending on the implementation) of an attribute (or attributes, depending on the implementation) of the storage object. Particularly, the value of Contributors and Upload Status 1110 displays all contributors to the storage object along with information on whether or not each contributor has made a file contribution. In Contributors and Upload Status 1110, where a contributor has made a file contribution the file contribution is indicated. In the example illustrated in FIG. 11, this is seen where the contributor indicated as "FriendOne@SomeOtherBusiness.com" has listed thereafter "SettlementOffer.eml", indicating that this contributor has made a file contribution identified as "SettlementOffer.eml". In some embodiments the indication of a file contribution made by a contributor is selectable to access the file contribution (e.g., in the illustrated example the text "SettlementOffer.eml" is selectable). In some embodiments, such selection opens or downloads the file contribution. This allows a contributor, for example, to see the form that a file contribution they have made takes when it is accessed by or provided to other entities, if indeed the file contribution is accessed by or provided to other entities. In some embodiments the file contribution made by an entity other than the entity accessing screen 1100 is selectable to be opened (or downloaded, etc.) only if the status of the storage object has or does not have a certain value (e.g., only when the Storage Object Status 1109 has the value "Unlocked", only when the Storage Object Status 1109 does not have the value "Locked"). For example, this indication of the status can be an indication that the simultaneous file exchange has occurred. In some embodiments the indication of a file contribution made by a contributor within Contributors and Upload Status 1110 other than the user is selectable to indicate information (e.g., attributes) about the file contribution. In some embodiments the indication of an entity within Contributors and Upload Status 1110 is selectable to indicate information (e.g., attributes) about the entity (e.g., in the illustrated example the text "FriendOne@SomeOtherBusiness.com" is selectable to access information about that entity).

In some embodiments, where a contributor has not made a file contribution this is indicated in Contributors and Upload Status 1110. In the example illustrated in FIG. 11, this is seen where the contributor indicated as "YourEmailAddress@YourEmail.com (You)" has listed thereafter "No file Uploaded", indicating that this contributor has not made a file contribution. The text "(You)" or similar text, as part of the identification of a contributor, can be used to indicate to an entity accessing screen 1100 how they are identified in the system facilitating the operation of the storage object.

Remove Contribution from Storage Object 1112 is a button that can be selected to remove a file contribution from the storage object displayed in screen 1100. In some embodiments only file contributions made to the storage object displayed in screen 1100 by the entity accessing screen 1100 may be removed using such functionality. In some embodiments only file contributions made to the storage object displayed in screen 1100 by the entity other than the entity accessing screen 1100 may be removed using such functionality. In some embodiments file contributions made by any contributor to the storage object displayed in screen 1100 may be removed using such functionality. In some embodiments the ability to remove file contributions from a storage object may not be available. In some embodiments the ability to remove file contributions from a storage object may or may not be available according to attributes of the file contribution to be removed and/or the attributes of the entity that seeks to remove the file contribution and/or the attributes of the entity that made the file contribution (e.g., through the rules of the storage object). In some embodiments the selection of the Remote Contribution from Storage Object 1112 button allows an entity to select from a list of file contributions those that they wish to remove. In some embodiments the ability to remove file contributions from a storage object may not be available, as determined at least in part on the value of the storage object status (e.g., the functionality to remove a file contribution from a storage object may only be available for file contributions made by the entity accessing screen 1100 and may only be available while the status of the storage object is "Locked").

Make Contribution to Storage Object 1114 is a button that can be selected to make a file contribution to the storage object displayed in screen 1100. In some embodiments the ability to make file contributions to a storage object through the use of the Make Contribution to Storage Object 1114 button is always available to an entity. In some embodiments the ability to make file contributions to a storage object through the use of the Make Contribution to Storage Object 1114 button is not always available to an entity. For example, in some embodiments the ability to make file contributions to a storage object may or may not be available according to attributes of the file contribution to be made and/or the attributes of the entity that seeks to make the file contribution, and/or the attributes of the storage object. For example, in some embodiments file contributions may be made only by entities that are identified as a contributor to the storage object (e.g., in the attributes of that entity, in the attributes of the storage object, etc.). For example, in some embodiments file contributions may be made by an entity only if the entity has or does not have certain attributes (e.g., the entity has not already made three or more file contributions, the entity has sufficient credits or an adequate balance with the system facilitating the operation of the storage object, the entity has not made file contributions with an aggregate size exceeding 10 megabytes). For example, in some embodiments file contributions may be made only when a storage object has or does not have certain attributes (e.g., only when the status of the storage object status is "Unlocked", only when the status of a storage object is not "Locked", etc.). In some embodiments the selection of the Make Contribution to Storage Object 1114 button allows a contributor to select a file that exists on a computer, exists on a network drive, exists on a disk, exists on the internet (e.g., through the provision of a hyperlink), etc. to upload as a file contribution to the storage object displayed on screen 1100. In some embodiments the selection of the Make Contribution to Storage Object 1114 button allows a contributor to create (e.g., through the use of a text prompt, a text editor, an external program that is launched, a different screen, etc.) and upload a file contribution to the storage object displayed on screen 1100 (e.g., where the file contribution is a dollar amount or is expressed as text a prompt is provided to create the file contribution). In some embodiments at least a portion of screen 1100 serves as an area where a user can "drag-and-drop" files from a depiction of a file system on their computer (e.g., a desktop, a directory structure, etc.) that are to be uploaded as file contributions made to the storage object (e.g., the button Make Contribution to Storage Object 1214 could be such a portion of screen 1100). Drag-and-drop functionality is well known in the art.

Confirm Contributions to Storage Object Are Complete 1116 is a button that can be selected so that the entity accessing screen 1100 can indicate through a confirmation to the system facilitating the operation of the storage object that the entity has made all of the file contributions that they intend to make to the storage object. In the example depicted in FIG. 11, the entity accessing screen 1100 can access the Confirm Contributions to Storage Object Are Complete 1116 button to indicate through a confirmation that the entity does not intend to make a file contribution (since the entity has not uploaded any file, as indicated in Contributors and Upload Status 1110). In some embodiments once a contributor confirms that its file contributions to a storage object are complete this action cannot be undone. In some embodiments once a contributor confirms that its file contributions to the storage object are complete this action can be undone. In some embodiments once an entity confirms that its file contributions to the storage object are complete the entity is no longer able to perform certain functions (e.g., after an entity confirms that its file contributions are complete they are not able to remove file contributions from the storage object, after an entity confirms that its file contributions are complete they are not able to make additional file contributions to the storage object, etc.). In some embodiments when an entity confirms that their file contributions to a storage object are complete and that entity has not made a file contribution that entity is thereafter considered a non-contributor. In some embodiments whether or not one or more entity has confirmed its file contributions are complete is information used to determine whether one or more file contribution can be made available or provided to entities associated with the storage object.

In the example illustrated in FIG. 11 the contributor "FriendOne@SomeOtherBusiness.com" has made only one file contribution. It should be understood that in some embodiments more than one file contribution may be made by a contributor. It should be understood that in some situations in some embodiments more or less information will be displayed on screen 1100 in the example illustrated in FIG. 11 (e.g. the time that a file contribution was made by a contributor may appear under Contributors and Upload Status 1110, etc.). It should be understood that in some embodiments the value of title 1102 and the other text presented throughout screen 1100 differs from the text presented in the example depicted in FIG. 11.

FIG. 12 is a depiction of an interface to display values of attributes of a storage object presented on a screen in some embodiments of the invention. In some embodiments screen 1200 comprises or is part of a webpage displayed on a browser. In some embodiments screen 1200 is displayed as part of an app or application. For example, in some embodiments an entity must log in as a user of a website or app associated with the system that facilitates the operation of a storage object, and screen 1200 is a screen within such a website or app. Screen 1200 has a title 1202. Title 1202 has the value "Storage Object Detail Page" in the illustrated embodiment. Title 1202 serves to orient the user as to the screen that is displayed. For example, in some embodiments once a user selects the Go To Storage Object Detail Page 1013 button depicted in FIG. 10 the user is taken to screen 1200. In some embodiments screen 1200 provides information on a storage object that the user accessing screen 1200 is associated with. In some embodiments screen 1200 provides information on a storage object that the entity accessing screen 1200 (i.e., the user accessing screen 1200) is associated with. In the example illustrated in FIG. 12 screen 1200 further has buttons selectable to make file contributions to a storage object and to remove file contributions from a storage object.

In the example illustrated in FIG. 12 the object displayed is a storage object with Storage Object Name 1204 displayed as "SecondTestStorageObject". In the example illustrated in FIG. 12, associated with the storage object "SecondTestStorageObject" is a Storage Object ID 1205 with the value "070984", indicating the value of an attribute of the storage object. In the example illustrated in FIG. 12, associated with the storage object "SecondTestStorageObject" is a Storage Object Type 1206 with the value "Unlock After Parties Have Uploaded", indicating the value of an attribute of the storage object. In the example illustrated in FIG. 12, associated with the storage object "SecondTestStorageObject" is a Creation Date 1207 with the value "May 26, 2014", indicating the value of an attribute of the storage object. In the example illustrated in FIG. 12, associated with the storage object "SecondTestStorageObject" is an Unlock Date 1208 with the value "N/A", indicating the value of an attribute of the storage object. In the example illustrated in FIG. 12, associated with the storage object "SecondTestStorageObject" is a Storage Object Status 1209 with the value "Unlocked", indicating the value of an attribute of the storage object. In the example illustrated in FIG. 12, associated with the storage object "SecondTestStorageObject" is Contributors and Upload Status 1210 with the information "YourEmail@YourEmail.com (You)—Files Uploaded: TestFile1.pdf", "FriendTwo@NeighborhoodBusiness.com—Files Uploaded: TestFile2.exe" and "FriendThree@LawFirm.com—Files Uploaded: TestFile3.ppt, TestFile4.html", indicating the value (or values, depending on the implementation) of an attribute (or attributes, depending on the implementation) of the storage object. Particularly, the value of Contributors and Upload Status 1210 displays all contributors to the storage object along with information on whether or not each contributor has made a file contribution. In Contributors and Upload Status 1210, where a contributor has made a file contribution the file contribution is indicated. In the example illustrated in FIG. 12, this is seen where the contributor indicated as "YourEmail@YourEmail.com (You)" has listed thereafter "Files Uploaded: TestFile1.pdf", indicating that this contributor has made a file contribution identified as "TestFile1.pdf". This is also seen where the contributor indicated as "FriendTwo@NeighborhoodBusiness.com" has listed thereafter "Files Uploaded: TestFile2.exe" indicating that this contributor has made a file contribution identified as "TestFile2.exe". This is also seen where the contributor indicated as "FriendThree@LawFirm.com" has listed thereafter "Files Uploaded: TestFile3.ppt, TestFile4.html" indicating that this contributor has made a file contribution identified as "TestFile3.ppt" and that this contributor has made a file contribution identified as "TestFile4.html".

In some embodiments, in Contributors and Upload Status 1210, where a contributor has not made a file contribution this is indicated. In the example illustrated in FIG. 12, each of the three contributors has made at least one file contribution.

Remove Contribution from Storage Object 1212 is a button that can be selected to remove a file contribution from the storage object displayed in screen 1200. In some embodiments only file contributions made to the storage object displayed in screen 1200 by the entity accessing screen 1200 may be removed using such functionality. In some embodiments only file contributions made to the storage object displayed in screen 1200 by the entity other than the entity accessing screen 1200 may be removed using such functionality. In some embodiments file contributions made by any contributor to the storage object displayed in screen 1200 may be removed using such functionality. In some embodiments the ability to remove file contributions from a storage object may not be available. In some embodiments the ability to remove file contributions from a storage object may or may not be available according to attributes of the file contribution to be removed and/or the attributes of the entity that seeks to remove the file contribution and/or the attributes of the entity that made the file contribution (e.g., through the rules of the storage object). In some embodiments the selection of the Remove Contribution from Storage Object 1212 button allows an entity to select from a list of file contributions those that they wish to remove. In some embodiments the ability to remove file contributions from a storage object may not be available, as determined at least in part on the value of the storage object status (e.g., the functionality to remove a file contribution from a storage object may only be available for file contributions made by the entity accessing screen 1200 and may only be available while the status of the storage object is "Locked").

Make Contribution to Storage Object 1214 is a button that can be selected to make a file contribution to the storage object displayed in screen 1200. In some embodiments the ability to make file contributions to a storage object through the use of the Make Contribution to Storage Object 1214 button is always available to an entity. In some embodiments the ability to make file contributions to a storage object through the use of the Make Contribution to Storage Object 1214 button is not always available to an entity. For example, in some embodiments the ability to make file contributions to a storage object may or may not be available according to attributes of the file contribution to be made and/or the attributes of the entity that seeks to make the file contribution, and/or the attributes of the storage object. For example, in some embodiments file contributions may be made only by entities that are identified as a contributor to the storage object (e.g., in the attributes of that entity). For example, in some embodiments file contributions may be made by an entity only if the entity has or does not have certain attributes (e.g., the entity has not already made five or more file contributions, the entity has an adequate subscription to a website associated with the system facilitating the operation of the storage object, the file contribution to be made is not a file of a certain file type). For example, in some embodiments file contributions may be made only when a storage object has or does not have certain attributes (e.g., only when the status of the storage object status is "Unlocked", only when the status of a storage object is not "Locked", etc.). In some embodiments the selection of the Make Contribution to Storage Object 1214 button allows a contributor to select a file that exists on a computer, exists on a network drive, exists on a disk, exists on the internet, etc. to upload as a file contribution to the storage object displayed on screen 1200. In some embodiments the selection of Make Contribution to Storage Object 1214 allows a contributor to create (e.g., through the use of a text prompt, a text editor, an external program that is launched, a different screen, etc.) and upload a file contribution to the storage object displayed on screen 1200. In some embodiments at least a portion of screen 1200 serves as an area where a user can "drag-and-drop" files from a depiction of a file system on their computer (e.g., a desktop, a directory structure, etc.) that are to be uploaded as file contributions made to the storage object (e.g., the button Make Contribution to Storage Object 1214 could be such a portion of screen 1200). Drag-and-drop functionality is well known in the art.

Confirm Contributions to Storage Object Are Complete 1216 is a button that can be selected so that the entity accessing screen 1200 can indicate through a confirmation to the system facilitating the operation of the storage object that the entity has made all of the file contributions that they intend to make to the storage object. In the example depicted in FIG. 12, the entity accessing screen 1200 can access the Confirm Contributions to Storage Object Are Complete 1216 button to indicate through a confirmation that the file contribution "TestFile1.pdf" is the only file contribution that contributor intends to make. In some embodiments once a contributor confirms that its file contributions to a storage object are complete this action cannot be undone. In some embodiments once a contributor confirms that its file contributions to the storage object are complete this action can be undone. In some embodiments once an entity confirms that its file contributions to the storage object are complete the entity is no longer able to perform certain functions (e.g., after an entity confirms that its file contributions are complete they are not able to remove file contributions from the storage object, after an entity confirms that its file contributions are complete they are not able to make additional file contributions to the storage object, etc.). In some embodiments when an entity confirms that their file contributions to a storage object are complete and that entity has not made a file contribution that entity is thereafter considered a non-contributor. In some embodiments whether or not one or more entity has confirmed its file contributions are complete is information used to determine whether one or more file contribution can be made available or provided to entities associated with the storage object.

In the example illustrated in FIG. 12 the contributors displayed in Contributors and Upload Status 1210 have each made at least one file contribution. It should be understood that in some situations in some embodiments each contributor may make zero or more file contributions. In the example illustrated in FIG. 12 there are three contributors displayed in Contributors and Upload Status 1210. It should be understood that in some embodiments there may be more or less than three contributors to a storage object. It should be understood that in some situations in some embodiments more or less information will be displayed on screen 1200 that is displayed in the example illustrated in FIG. 12 (e.g. whether and/or how a file contribution is encrypted may appear under Contributors and Upload Status 1210, etc.). It should be understood that in some embodiments the value of title 1202 and the other text presented throughout screen 1200 differs from the text presented in the example depicted in FIG. 12.

FIG. 13 is a depiction of a notification provided to a contributor to a storage object used in some embodiments of the invention. Notification 1300 may take many forms. For example, in some embodiments notification 1300 is an email. For example, in some embodiments notification 1300 is an instant message. For example, in some embodiments notification 1300 is a text message. For example, in some embodiments notification 1300 comprises or is part of a website. Notification 1300 has recipient 1304. In the example illustrated in FIG. 13 recipient 1304 of notification 1300 is "FriendOne@SomeOtherBusiness.com". In some embodiments recipient 1304 is determined according to input received by the system facilitating the operation of a storage object to which recipient 1304 is invited to contribute to (e.g., through the use of the Invite Contributors 710 prompt depicted and discussed in connection with FIG. 7).

Notification 1300 has sender 1306. In the illustrated example the sender 1306 of notification 1300 is "StorageObjectAnnoucements@StorageObjectWebsite.com". In some embodiments sender 1306 is an email address associated with the system facilitating the operation of the storage object. In some embodiments sender 1306 is an email address associated with an entity that invited recipient 1304 to participate in a storage object. In some embodiments sender 1306 is a phone number associated with the system facilitating the operation of the storage object. In some embodiments the system facilitating the operation of the storage object causes notification 1300 to be sent after the Create Storage Object 712 button (as depicted and discussed in connection with FIG. 7) is selected.

Notification 1300 has subject 1308. In the illustrated example subject 1308 is "You are invited to participate in a Storage Object". In some embodiments subject 1308 presents information to orient recipient 1304 and/or sender 1306. In some embodiments subject 1308 is generated by the system facilitating the operation of a storage object. In some embodiments subject 1308 is generated, at least in part, using input from an entity creating a storage object (e.g., an entity that selects the Create Storage Object 712 button (as depicted and discussed in connection with FIG. 7).

Notification 1300 has message 1310. In the illustrated example message 1310 is "Dear FriendOne@SomeOtherBusiness.com, YourEmailAddress@YourEmail.com has invited you to participate in the storage object FirstTestStorageObject. To access the storage object click here. Thank you, Storage Object Website Administration". In some embodiments message 1310 is generated by the system facilitating the operation of a storage object. In some embodiments message 1310 is generated, at least in part, using input from a user creating a storage object (e.g., an entity that selects the Create Storage Object 712 button (as depicted and discussed in connection with FIG. 7). In some embodiments message 1310 contains a link to a webpage or app associated with the system facilitating the operation of the storage object that recipient 1304 is invited to contribute to (e.g., screen 1000 as depicted and discussed in connection with FIG. 10, screen 1100 as depicted and discussed in connection with FIG. 11, screen 1200 as depicted and discussed in connection with FIG. 12, etc.). In the example illustrated in FIG. 13 the text "click here" is underlined to indicate that that text presents a hyperlink to a webpage.

Figure 14:
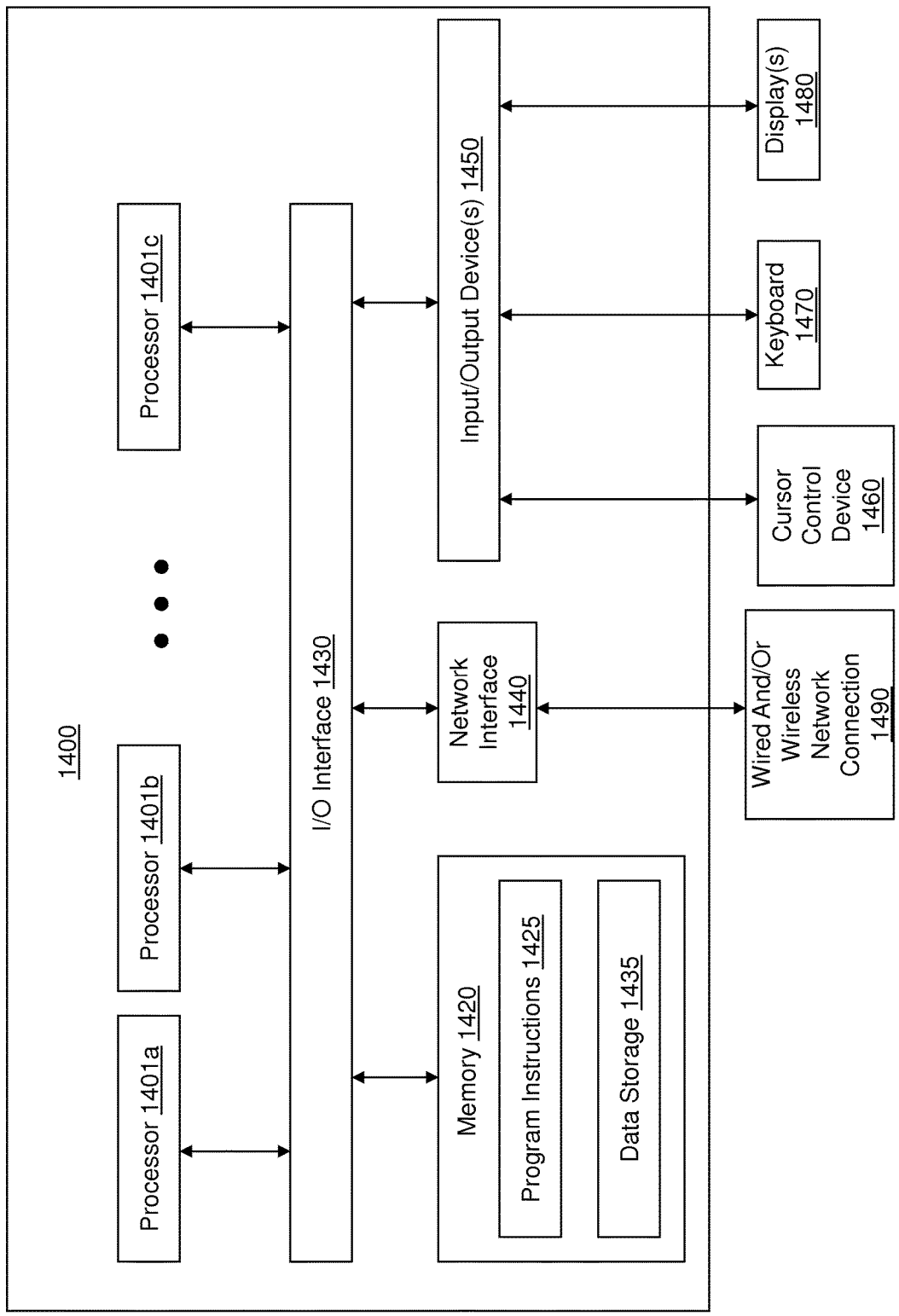
FIG. 14 is a depiction of an example computer system for use with some embodiments of the invention.

FIG. 14 is discussed in the section "Example Computer System", below.

Figure 15:
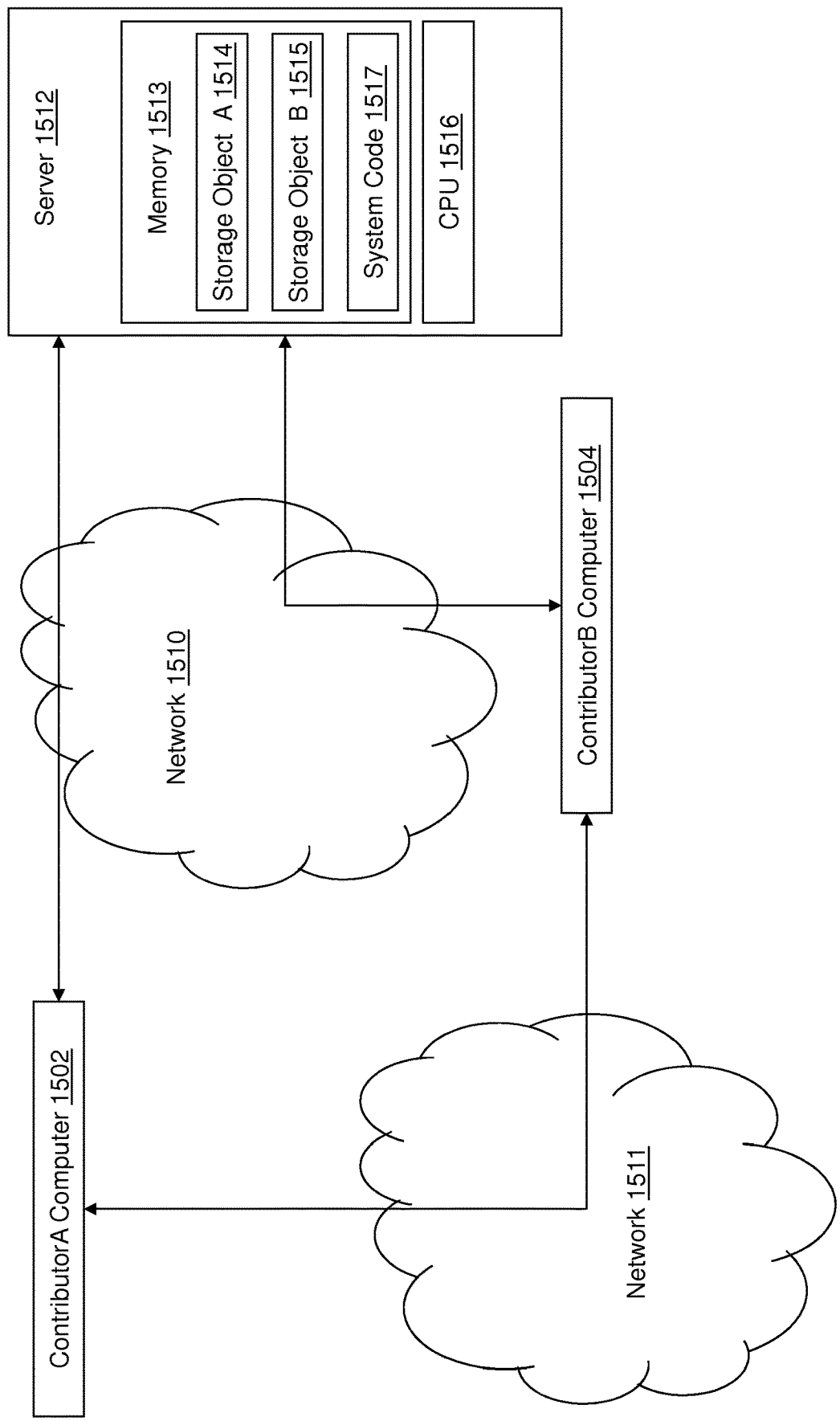
FIG. 15 is a block diagram depicting a system for use in some embodiments of the invention wherein system code for facilitating the operation of storage objects is held in memory on a server.

FIG. 15 is a block diagram depicting a system for use in some embodiments of the invention wherein system code for facilitating the operation of storage objects is held in memory on a server. In a network environment ContributorA Computer 1502 and ContributorB Computer 1504 each connect to Server 1512. ContributorA Computer 1502 connects to Server 1512 through Network 1510. ContributorB Computer 1504 connects to Server 1512 through Network 1510. ContributorA Computer 1502 and Contributor B Computer 1504 connect to one another through Network 1511. ContributorA Computer 1502 is used by an entity known as ContributorA that is a contributor to Storage Object A 1514 and is a contributor to Storage Object B 1515. ContributorB Computer 1504 is used by an entity known as ContributorB that is a contributor to Storage Object A 1514 and is a contributor to Storage Object B 1515. ContributorA and ContributorB each are entities associated with both Storage Object A 1514 and Storage Object B 1515.

It should be appreciated that, though the figure illustrates two storage objects in Memory 1513 (Storage Object A 1514 and Storage Object B 1515), in some embodiments there will be a different number of storage objects within Memory 1513 (e.g., three or more). Network 1510 may be the Internet or some other network. Network 1511 may be the Internet or some other network. In some embodiments Network 1510 and Network 1511 are the same network. ContributorA Computer 1502, ContributorB Computer 1504, and Server 1512 can each communicate bi-directionally with one another. Server 1512 includes Memory 1513 and CPU 1516. Memory 1513 includes Storage Object A 1514, Storage Object B 1515, and System Code 1517. CPU (central processing unit) 1516 accesses Memory 1513 and executes System Code 1517 therein to facilitate the operation of Storage Object A 1514 and Storage Object B 1515. System Code 1517 includes instructions to facilitate the operation of Storage Object A 1514 and the operation of Storage Object B 1515. In some embodiments System Code 1517 exists as the system to facilitate the operation of Storage Object A 1514 and Storage Object B 1515. In some embodiments System Code 1517 exists in part within Memory 1513 and in part in other memory (e.g., other memory within a computer other than Server 1512, other memory within Server 1512 not depicted in the figure, etc.). In some embodiments System Code 1517 contains some or all of the instructions to provide a website, app, or application that allows ContributorA (e.g., through the use of ContributorA Computer 1502) and ContributorB (e.g., through the use of ContributorB Computer 1504) to access Storage Object A 1514 and Storage Object B 1515 (e.g., a website, application, or app associated with Storage Object A 1514 and Storage Object B 1515). In some embodiments System Code 1517 contains instructions to provide notifications (e.g., email, text messages, instant messages, etc.) to ContributorA (e.g., through the use of ContributorA Computer 1502) and ContributorB (e.g., through the use of ContributorB Computer 1504) related to Storage Object A 1514 and/or Storage Object B 1517. In some embodiments System Code 1517 contains instructions to handle at least part of the billing related to entities' access to Storage Object A 1514 and/or Storage Object B 1515. In some embodiments System Code 1517 contains instructions to handle at least part of the billing related to entities' access to the interface to access Storage Object A 1514 and/or Storage Object B 1515 (e.g., a website, application, app, etc.). In some embodiments System Code 1517 comprises or is part of an online social network. In some embodiments System Code 1517 is implemented as part of a file sharing system that does not always require the use of storage objects (e.g., a system that allows users of the system to share or exchange files with one another without the use of storage objects, a system that allows users of the system to store files on network servers without the use of storage objects, etc.). In some embodiments System Code 1517 is software installed on Server 1512. In some embodiments System Code 1517 is provided to Server 1512 by ContributorA Computer 1502 or ContributorB Computer 1504.

Though depicted as one entity in the figure, in some embodiments Server 1512 comprises one or more separate servers, located in one or more physical locations. Though depicted as existing entirely within Memory 1513, in some embodiments Storage Object A 1514, and/or Storage Object B 1515 exist in part in Memory 1513 and in part in other memory (e.g., other memory within a computer other than Server 1512, other memory within Server 1512 not depicted in the figure, etc.).

In some embodiments System Code 1517 provides the state of Storage Object A 1514 and the state of Storage Object B 1515 to other computers (e.g., to ContributorA Computer 1502 through Network 1510, to ContributorB Computer 1504 through Network 1510). In some embodiments System Code 1517 provides the functionality to process inputs to Storage Object A 1514 and to process inputs to Storage Object B 1515. In some embodiments System Code 1517 provides instructions to process outputs from Storage Object A 1514 and to process outputs from Storage Object B 1515. For example, in some embodiments System Code 1517 includes instructions for making information held in Storage Object A 1514 and Storage Object B 1515 available to other entities through their computers (e.g., ContributorA Computer 1502, ContributorB Computer 1504, etc.) through a website, application, app, etc.

Storage Object A 1514 and Storage Object B 1515 each receive one or more file contribution from ContributorA Computer 1502. Storage Object A 1514 and Storage Object B 1515 each receive one or more file contribution from ContributorB Computer 1504. According to rules concerning the operation of Storage Object A 1514 (e.g., according to rules attributes for Storage Object A 1514) one or more of the file contributions from ContributorA Computer 1502 and one or more of the file contributions from ContributorB Computer 1504 will be made available to entities associated with Storage Object A 1514. For example, upon the satisfaction of certain requirements (e.g., as indicated in rules attributes for Storage Object A 1514) file contributions made to Storage Object A 1514 are made available and/or provided to one or more of ContributorA (through the use of ContributorA Computer 1502) and ContributorB (through the use of ContributorB Computer 1504). According to rules concerning the operation of Storage Object B 1515 (e.g., according to rules attributes for Storage Object B 1515) one or more of the file contributions from ContributorA Computer 1502 and one or more of the file contributions from ContributorB Computer 1504 will be made available to entities associated with Storage Object B 1515. For example, upon the satisfaction of certain requirements (e.g., as indicated in rules attributes for Storage Object B 1515) file contributions made to Storage Object B 1515 are made available and/or provided to one or more of ContributorA (through the use of ContributorA Computer 1502) and ContributorB (through the use of ContributorB Computer 1504).

In the example illustrated in FIG. 15 each of the file contributions made by ContributorA (e.g., through the use of ContributorA Computer 1502) and ContributorB (e.g., through the use of ContributorB Computer 1504) are encrypted files that require a key to decrypt them. The files may be encrypted using so-called client-side encryption schemes. The files may be encrypted using any number of well known encryption schemes. In some embodiments the channel that the file is sent through provides encryption (e.g., through the use of SSL, TLS, etc. protocols).

When ContributorA makes a file contribution to Storage Object A 1514 the file contribution is made by transferring the encrypted file from ContributorA Computer 1502 to Server 1512 through Network 1510. The key necessary to decrypt the file contribution that ContributorA made is not transferred to Server 1512. Instead, the key to decrypt the file contribution that ContributorA made is transferred to ContributorB Computer 1504 through Network 1511 (e.g., through the use of email, etc.). In this way the contents of the file contribution made by ContributorA are not accessible to Server 1512 (or to anyone else, for that matter, except for ContributorB who received the key). At such a time as ContributorB receives or accesses the file contribution made by ContributorA, ContributorB will have the key to access the contents of the file contribution made by ContributorA.

Likewise, when ContributorB makes a file contribution to Storage Object A 1514 the file contribution is made by transferring the encrypted file from ContributorB Computer 1504 to Server 1512 through Network 1510. The key necessary to decrypt the file contribution that ContributorB made is not transferred to Server 1512. Instead, the key to decrypt the file contribution that ContributorB made is transferred to ContributorA Computer 1502 through Network 1511 (e.g., through the use of email, etc.). In this way the contents of the file contribution made by ContributorB are not accessible to Server 1512 (or to anyone else, for that matter, except for ContributorA who received the key). At such a time as ContributorA receives or accesses the file contribution made by ContributorB, ContributorA will have the key to access the contents of the file contribution made by ContributorB.

In some embodiments the key to decrypt a file contribution becomes non-functioning after a certain time or once a certain set of conditions are met (e.g., a key to decrypt a file contribution from ContributorA becomes non-functioning if ContributorB does not make a file contribution by a certain time, etc.). In some embodiments a key to decrypt a file contribution becomes functioning (as opposed to non-functioning) after a given time or once a certain set of conditions are met (e.g., a key to decrypt a file contribution from ContributorB becomes functioning only once ContributorA makes a file contribution). Such determinations may be made by the system facilitating the operation of the storage object.

In some embodiments a key to decrypt an encrypted file that is a file contribution made to a storage object is provided with that file contribution to the storage object.

Figure 16:
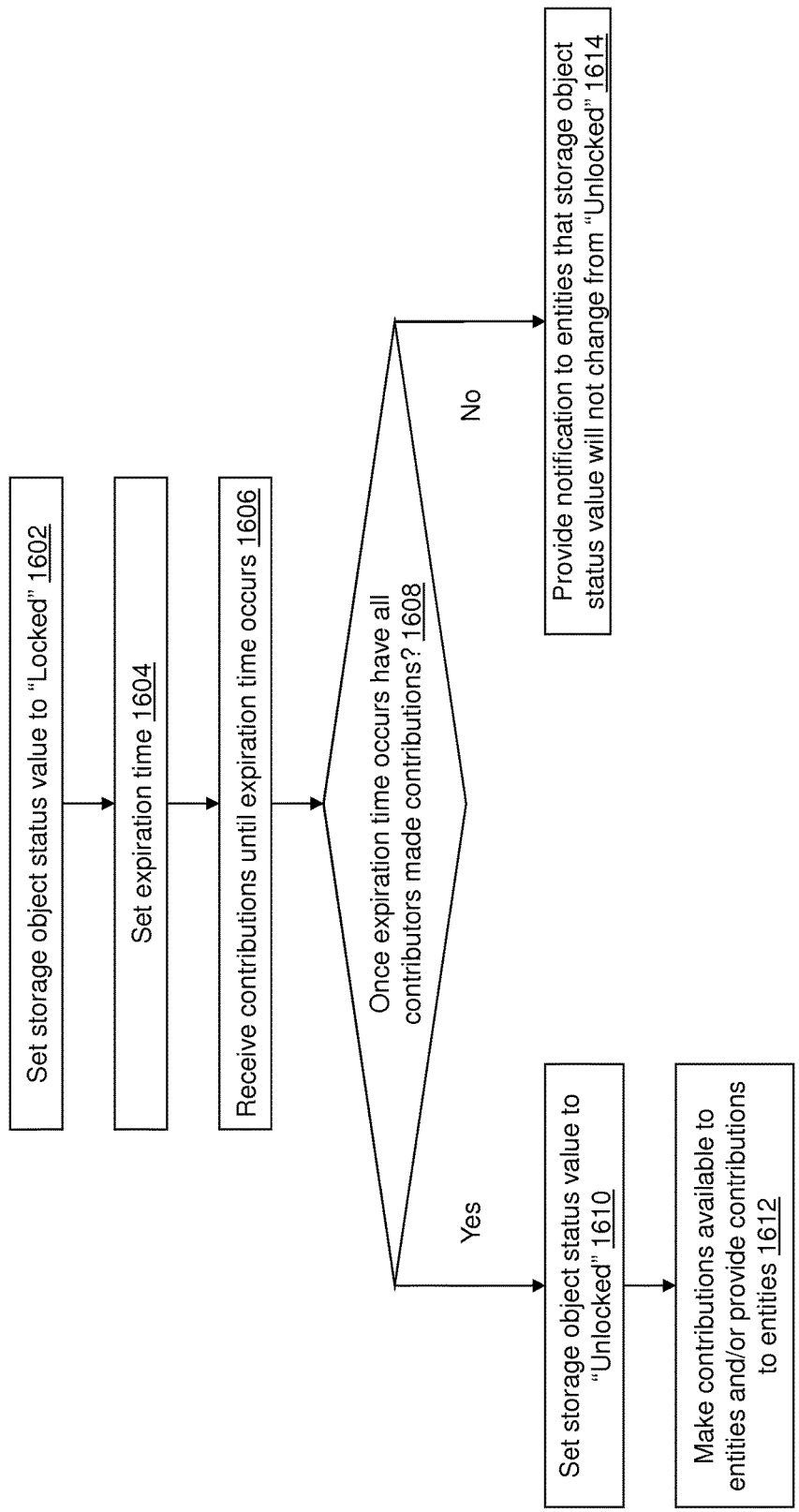
FIG. 16 is a flowchart of a method used in the operation of a storage object in some embodiments of the invention.

FIG. 16 is a flowchart of a method used in the operation of a storage object in some embodiments of the invention. Particularly, the flowchart of FIG. 16 concerns a storage object that has a type attribute value of "Unlock at Specific Time if Parties Have Uploaded". In some embodiments the storage object has a type attribute value of "Unlock at Specific Time if Parties Have Uploaded" as a result of receiving input from an entity associated with the storage object (e.g., a selection by the entity of "Unlock at Specific Time if Parties Have Uploaded" from the Select Storage Object Type 706 prompt on screen 700 as depicted and discussed in connection with FIG. 7). The system sets the storage object status value to "Locked" (block 1602). In some embodiments this storage object status value is set according to the system facilitating the operation of the storage object (e.g., the system implements a rule that all created storage objects begin with a "Locked" status value). The expiration time is set (block 1604). In some embodiments this is a result of receiving input from an entity associated with the storage object (e.g., input provided by the entity in the Select Unlock Date 708 prompt on screen 700 as depicted and discussed in connection with FIG. 7 functions as the expiration time). In some embodiments this expiration time is set according to the system facilitating the operation of the storage object (e.g., a fixed amount of time from the creation of a storage object is used to set the expiration time). Thereafter the system receives contributions until the expiration time occurs (block 1606), subject to any limits on the operation of the storage object (e.g., as determined by the rules attribute for the storage object). The file contributions are received from entities associated with the storage object that are contributors to the storage object. Once expiration time occurs, the system determines whether all contributors made contributions (block 1608). In some embodiments the system knows that expiration time has occurred through the use of clocks, timers, and similar mechanisms. In some embodiments the system determines whether all contributors have made file contributions by accessing information about each of the file contributions made to the storage object (e.g., through the entry Contributions 220 within Storage Object Attributes 200 for the storage object, as depicted and discussed in connection with FIG. 2) and checking that information against information about all contributors to the storage object. In some embodiments the system determines whether all contributors have made file contributions by accessing information about each of the contributors to the storage object (e.g., through the entry Contributors 216 within Storage Object Attributes 200 for the storage object, as depicted and discussed in connection with FIG. 2), where such information identifies the file contributions that made each contributor has made. If, at expiration time, all contributors have not made file contributions to the storage object the system will provide notification to entities associated with the storage object that the storage object status will not change from "Unlocked" (block 1614). This means that a simultaneous file exchange will not occur, as the storage object was set up to only perform the simultaneous file exchange if all contributors made file contributions by the expiration time. In some embodiments this notification is sent using email, text message, instant messaging, etc. In some embodiments this notification explains that the storage object will never allow the file contributions of one entity to be made available to other entities associated with the storage object or provide the file contributions of one entity to other entities associated with the storage object (i.e. that no simultaneous file exchange will occur). In some embodiments when a storage object will not change from "Unlocked" (i.e. a simultaneous file exchange will not occur) a credit or refund is provided to one or more entities associated with the storage object, such credit or refund being either full or partial in relation to the costs associated with that entities' expenditures related to the storage object. If, at expiration time, all contributors have made file contributions to the storage object the system will set the storage object status attribute value to "Unlocked" (block 1610), providing the simultaneous file exchange. The system makes contributions available to entities associated with the storage object and/or provides contributions to entities associated with the storage object (block 1612) to effect the simultaneous file exchange. In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked" and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example, if an entity does not make a contribution by the expiration time when the determination is made in (block 1608) that information may be indicated on a record. For example, if an entity makes a file contribution the time of the file contribution may be indicated on a record. For example if an entity access a file contribution made available from a simultaneous exchange that information may be indicated on a record.

Figure 17:
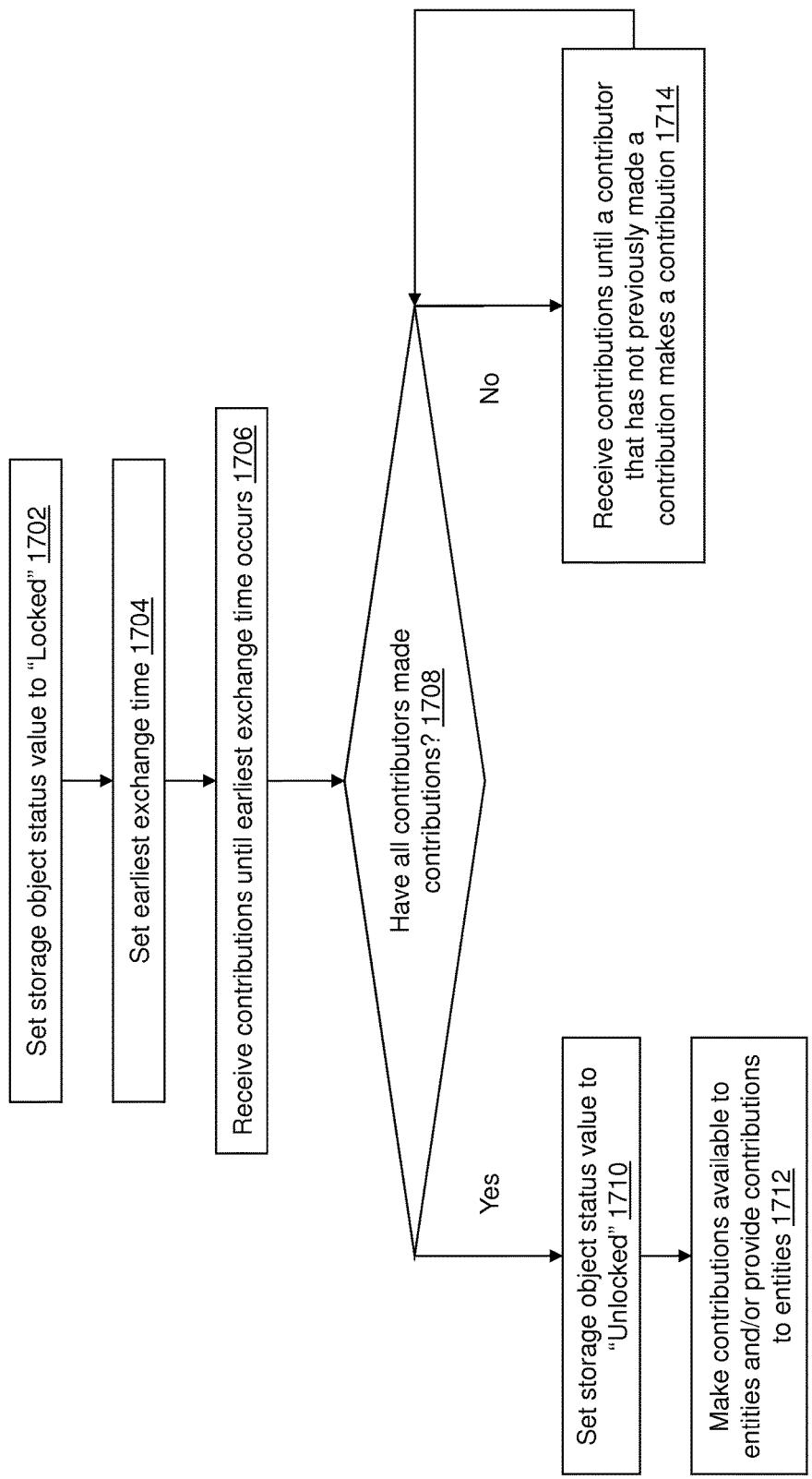
FIG. 17 is a flowchart of a method used in the operation of a storage object in some embodiments of the invention.

FIG. 17 is a flowchart of a method used in the operation of a storage object in some embodiments of the invention. Particularly, the flowchart of FIG. 17 concerns a storage object that has a type attribute value of "Unlock At or After Specific Time Once Parties Have Uploaded". In some embodiments the storage object has a type attribute value of "Unlock At or After Specific Time Once Parties Have Uploaded" as a result of receiving input from an entity associated with the storage object (e.g., a selection by the entity of "Unlock At or After Specific Time Once Parties Have Uploaded" from a the Select Storage Object Type 706 prompt on screen 700 as depicted and discussed in connection with FIG. 7). The system sets the storage object status value to "Locked" (block 1702). In some embodiments this storage object status value is set according to the system facilitating the operation of the storage object (e.g., the system implements a rule that all created storage objects begin with a "Locked" status value). The earliest exchange time is set (block 1704). In some embodiments this is a result of receiving input from an entity associated with the storage object (e.g., input from the Select Unlock Date 708 prompt on screen 700). In some embodiments this earliest exchange time is set according to the system facilitating the operation of the storage object (e.g., a fixed amount of time from the creation of a storage object is used to set earliest exchange time). Thereafter the system receives contributions until the earliest exchange time occurs (block 1706), subject to any limits on the operation of the storage object (e.g., as determined by the rules attribute for the storage object). The file contributions are received from entities associated with the storage object that are contributors to the storage object. Once the earliest exchange time occurs, the system determines whether all contributors made contributions (block 1708). In some embodiments the system knows that the earliest exchange time has occurred through the use of clocks, timers, and similar mechanisms. In some embodiments the system determines whether all contributors have made file contributions by accessing information about each of the file contributions made to the storage object (e.g., through the entry Contributions 220 within Storage Object Attributes 200 for the storage object, as depicted and discussed in connection with FIG. 2) and checking that information against information about all contributors to the storage object. In some embodiments the system determines whether all contributors have made file contributions by accessing information about each of the contributors to the storage object (e.g., through the entry Contributors 216 within Storage Object Attributes 200 for the storage object, as depicted and discussed in connection with FIG. 2), where such information identifies the file contributions that each contributor has made. If, at the earliest exchange time, all contributors have not made file contributions to the storage object the system will continue to receive contributions until a contributor that has not previously made a contribution makes a contribution (block 1714). Once a contributor that has not previously made a contribution makes a contribution the system again checks whether all contributors have made contributions (block 1708). If not all contributors have made contributions the system continues to receive contributions until a contributor that has not previously made a contribution makes a contribution (block 1714). Once the system determines as a result of (block 1708) that all contributors have made file contributions to the storage object the system will set the storage object status attribute value to "Unlocked" (block 1710), providing the simultaneous file exchange. The system makes contributions available to entities associated with the storage object and/or provides contributions to entities associated with the storage object (block 1712) to effect the simultaneous file exchange. In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked" and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example, if an entity does not make a contribution by the earliest exchange time when the determination is made in (block 1708) that information may be indicated on a record. For example, if an entity makes a file contribution the time of the file contribution may be indicated on a record. For example if an entity access a file contribution made available from a simultaneous exchange that information may be indicated on a record.

Figure 18:
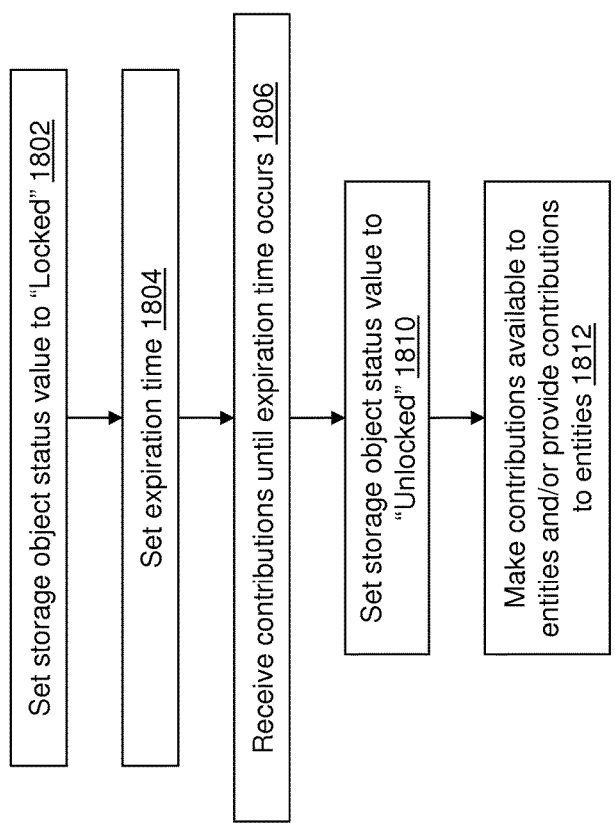
FIG. 18 is a flowchart of a method used in the operation of a storage object in some embodiments of the invention.

FIG. 18 is a flowchart of a method used in the operation of a storage object in some embodiments of the invention. Particularly, the flowchart of FIG. 18 concerns a storage object that has a type attribute value of "Unlock at Specific Time". In some embodiments the storage object has a type attribute value of "Unlock at Specific Time" as a result of receiving input from an entity associated with the storage object (e.g., a selection by the entity of "Unlock at Specific Time" from the Select Storage Object Type 706 prompt on screen 700 as depicted and discussed in connection with FIG. 7). The system sets the storage object status value to "Locked" (block 1802). In some embodiments this storage object status value is set according to the system facilitating the operation of the storage object (e.g., the system implements a rule that all created storage objects begin with a "Locked" status value). The expiration time is set (block 1804). In some embodiments this is a result of receiving input from an entity associated with the storage object (e.g., input provided by the entity in the Select Unlock Date 708 prompt on screen 700 as depicted and discussed in connection with FIG. 7). In some embodiments this expiration time is set according to the system facilitating the operation of the storage object (e.g., a fixed amount of time from the creation of a storage object is used to set the expiration time). Once the expiration time occurs the system sets the storage object status attribute value to "Unlocked" (block 1810). The system makes any contributions that were made available to entities associated with the storage object and/or provides any contributions that were made to entities associated with the storage object (block 1812). In some embodiments less than all of the entities associated with the storage object are provided with file contributions in (block 1812). For example, in some embodiments, to ensure a simultaneous exchange (as opposed to a one-way file transfer), only those entities that made file contributions to the storage object before the expiration time are provided with file contributions in (block 1812). Otherwise, it would be possible for an entity to be provided with a file contribution made to the storage object by another entity without also providing a file contribution themselves. For example, if Contributor A and Contributor B both make a file contribution to a storage object before the expiration time occurs, but Contributor C does not make a file contribution to the storage object before the expiration time occurs, then Contributor A and Contributor B will have file contributions made available to them under (block 1812) but Contributor C will not. In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked" and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example if an entity fails to make a file contribution by the expiration time that may be indicated on a record. For example, if an entity makes a file contribution the time of the file contribution may be indicated on a record. For example if an entity access a file contribution made available from a simultaneous exchange that information may be indicated on a record.

Figure 19:
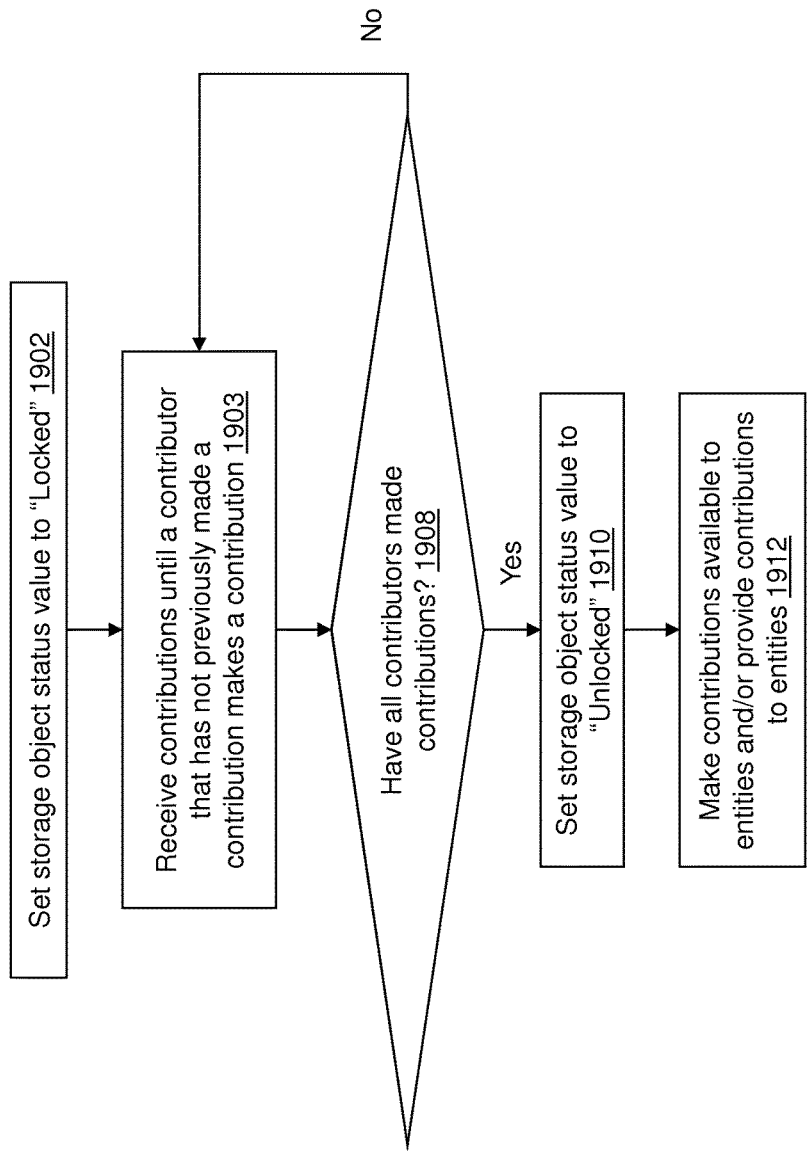
FIG. 19 is a flowchart of a method used in the operation of a storage object in some embodiments of the invention.

FIG. 19 is a flowchart of a method used in the operation of a storage object in some embodiments of the invention. Particularly, the flowchart of FIG. 19 concerns a storage object that has a type attribute value of "Unlock After Parties Have Uploaded". In some embodiments the storage object has a type attribute value of "Unlock After Parties Have Uploaded" as a result of receiving input from an entity associated with the storage object (e.g., a selection by the entity of "Unlock After Parties Have Uploaded" from the Select Storage Object Type 706 prompt on screen 700 as depicted and discussed in connection with FIG. 7). The system sets the storage object status value to "Locked"

(block 1902). In some embodiments this storage object status value is set according to the system facilitating the operation of the storage object (e.g., the system implements a rule that all created storage objects begin with a "Locked" status value). The system will then receive contributions until a contributor that has not previously made a contribution makes a contribution (block 1903). The file contributions are received from entities associated with the storage object that are contributors to the storage object. In some embodiments the system determines whether all contributors have made file contributions and/or determines whether a file contribution is received by a contributor that has not previously made a file contribution by accessing information about each of the file contributions made to the storage object (e.g., through the entry Contributions 220 within Storage Object Attributes 200 for the storage object, as depicted and discussed in connection with FIG. 2) and checking that information against information about all contributors to the storage object. In some embodiments the system determines whether all contributors have made file contributions and/or determines whether a file contribution is received by a contributor that has not previously made a file contribution by accessing information about each of the contributors to the storage object (e.g., through the entry Contributors 216 within Storage Object Attributes 200 for the storage object, as depicted and discussed in connection with FIG. 2), where such information identifies the file contributions that each contributor has made. Once a contributor that has not previously made a contribution makes a contribution the system checks whether all contributors have made contributions (block 1908). If not all contributors have made contributions the system continues to receive contributions until a contributor that has not previously made a contribution makes a contribution (block 1903). Once the system determines as a result of (block 1908) that all contributors have made file contributions to the storage object the system will set the storage object status attribute value to "Unlocked" (block 1910), providing the simultaneous file exchange. The system makes contributions available to entities associated with the storage object and/or provides contributions to entities associated with the storage object (block 1912). In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked" and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example, if an entity makes a file contribution the time of the file contribution may be indicated on a record. For example if an entity access a file contribution made available from a simultaneous exchange that information may be indicated on a record.

Figure 20:
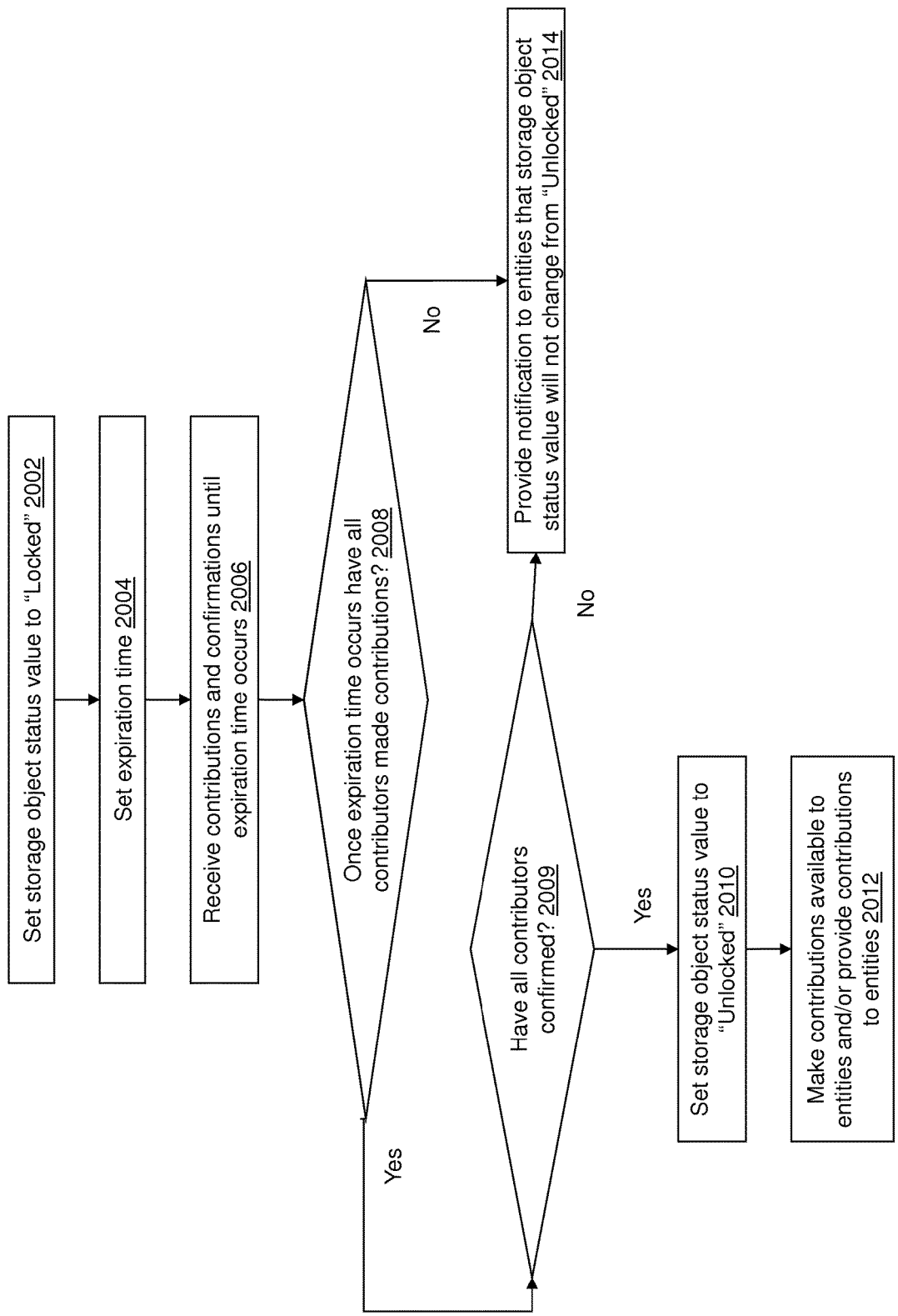
FIG. 20 is a flowchart of a method used in the operation of a storage object in some embodiments of the invention.

FIG. 20 is a flowchart of a method used in the operation of a storage object in some embodiments of the invention. Particularly, the flowchart of FIG. 20 concerns a storage object that has a type attribute value of "Unlock at Specific Time if Parties Have Uploaded" where all entities are required to confirm that their file contributions to the storage object are complete before the storage object status value is set to "Unlocked". In some embodiments the storage object has a type attribute value of "Unlock at Specific Time if Parties Have Uploaded" as a result of receiving input from an entity associated with the storage object (e.g., a selection by the entity of "Unlock at Specific Time if Parties Have Uploaded" from the Select Storage Object Type 706 prompt on screen 700 as depicted and discussed in connection with FIG. 7). In some embodiments entities are required to confirm that their file contributions to the storage object are complete before the storage object status value is set to "Unlocked" as a result of receiving input from an entity associated with the storage object (e.g., a selection by the entity of "Yes" from the Require Confirmation Before Unlock 707 prompt as depicted and discussed in connection with FIG. 7). The system sets the storage object status value to "Locked" (block 2002). In some embodiments this storage object status value is set according to the system facilitating the operation of the storage object (e.g., the system implements a rule that all created storage objects begin with a "Locked" status value). The expiration time is set (block 2004). In some embodiments this is a result of receiving input from an entity associated with the storage object (e.g., input provided by the entity in the Select Unlock Date 708 prompt on screen 700 as depicted and discussed in connection with FIG. 7). In some embodiments this expiration time is set according to the system facilitating the operation of the storage object (e.g., a fixed amount of time from the creation of a storage object is used to set the expiration time). Thereafter the system receives contributions and confirmations until the expiration time occurs (block 2006). The file contributions are received from entities associated with the storage object that are contributors to the storage object. The confirmations are confirmations from entities that they have made all of the file contributions to the storage object that they intend to make. Once expiration time occurs, the system determines whether all contributors made contributions (block 2008). In some embodiments the system knows that expiration time has occurred through the use of clocks, timers, and similar mechanisms. In some embodiments the system determines whether all contributors have made file contributions by accessing information about each of the file contributions made to the storage object (e.g., through the entry Contributions 220 within Storage Object Attributes 200 for the storage object, as depicted and discussed in connection with FIG. 2) and checking that information against information about all contributors to the storage object. In some embodiments the system determines whether all contributors have made file contributions by accessing information about each of the contributors (e.g., through the entry Contributors 216 within Storage Object Attributes 200 for the storage object, as depicted and discussed in connection with FIG. 2), where such information identifies the file contributions that each contributor has made. If, at expiration time, all contributors have not made file contributions to the storage object the system will provide notification to entities associated with the storage object that the storage object status value will not change from "Unlocked" (block 2014). That is to say, no simultaneous file exchange will occur. In some embodiments this notification is sent using email, text message, instant messaging, etc. In some embodiments this notification explains that the storage object will never allow the file contributions of one entity to be made available to other entities associated with the storage object or provide the file contributions of one entity to other entities associated with the storage object. In some embodiments when a storage object will not change from "Unlocked" a credit or refund is provided to one or more entities associated with the storage object, such credit or refund being either full or partial in relation to the costs associated with that entities' expenditures related to the storage object. If, at expiration time, all contributors have made contributions to the storage object the system will determine whether all contributors have confirmed (block 2009). In some embodiments the system determines whether all contributors have confirmed that they have made all of the file contributions they intend to make to the storage object by accessing information about each of the contributors to the storage object (e.g., through the entry Contributors 216 within Storage Object Attributes 200 for the storage object, as depicted and discussed in connection with FIG. 2), where such information identifies whether the contributor has confirmed. If all contributors have not confirmed, the system will provide notification to entities associated with the storage object that the storage object status value will not change from "Unlocked" (block 2014). That is to say, no simultaneous file exchange will occur. If all contributors have confirmed the system will set the storage object status attribute value to "Unlocked" (block 2010), providing the simultaneous file exchange. The system makes contributions available to entities associated with the storage object and/or provides contributions to entities associated with the storage object (block 2012) to effect the simultaneous file exchange. In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked" and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example, if an entity does not make a file contribution and/or does not confirm they have made all of their file contributions by the expiration time (i.e., when the determination is made in (block 2008) or (block 2009)) that information may be indicated on a record. For example, if an entity makes a file contribution the time of the file contribution may be indicated on a record. For example if an entity access a file contribution made available from a simultaneous exchange that information may be indicated on a record.

Figure 21:
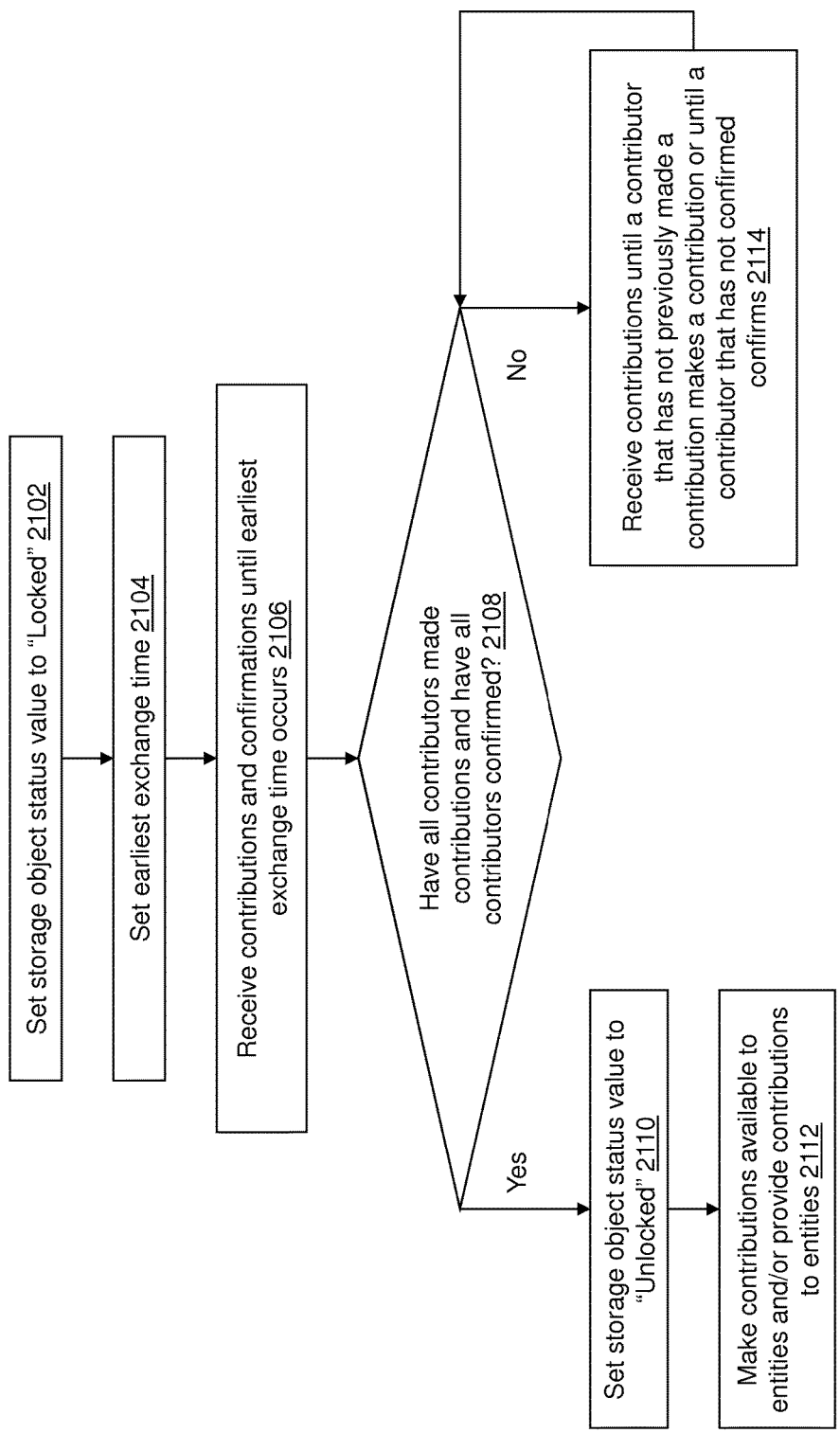
FIG. 21 is a flowchart of a method used in the operation of a storage object in some embodiments of the invention.

FIG. 21 is a flowchart of a method used in the operation of a storage object in some embodiments of the invention. Particularly, the flowchart of FIG. 21 concerns a storage object that has a type attribute value of "Unlock At or After Specific Time Once Parties Have Uploaded" where all entities are required to confirm that their file contributions to the storage object are complete before the storage object status value is set to "Unlocked". In some embodiments the storage object has a type attribute value of "Unlock At or After Specific Time Once Parties Have Uploaded" as a result of receiving input from an entity associated with the storage object (e.g., a selection by the entity of "Unlock At or After Specific Time Once Parties Have Uploaded" from the Select Storage Object Type 706 prompt on screen 700 as depicted and discussed in connection with FIG. 7). In some embodiments entities are required to confirm that their file contributions to the storage object are complete before the storage object status value is set to "Unlocked" as a result of receiving input from an entity associated with the storage object (e.g., a selection by the entity of "Yes" from the Require Confirmation Before Unlock 707 prompt as depicted and discussed in connection with FIG. 7). The system sets the storage object status value to "Locked" (block 2102). In some embodiments this storage object status value is set according to the system facilitating the operation of the storage object (e.g., the system implements a rule that all created storage objects begin with a "Locked" status value). The earliest exchange time is set (block 2104). In some embodiments this is a result of receiving input from an entity associated with the storage object (e.g., input from the Select Unlock Date 708 prompt on screen 700). In some embodiments this earliest exchange time is set according to the system facilitating the operation of the storage object (e.g., a fixed amount of time from the creation of a storage object is used to set earliest exchange time). Thereafter the system receives contributions and confirmations until the earliest exchange time occurs (block 2106). The file contributions are received from entities associated with the storage object that are contributors to the storage object. The confirmations are confirmations from entities that they have made all of the file contributions to the storage object that they intend to make. Once the earliest exchange time occurs, the system determines whether all contributors made contributions and whether all contributors have confirmed (block 2108). In some embodiments the system knows that the earliest exchange time has occurred through the use of clocks, timers, and similar mechanisms. In some embodiments the system determines whether all contributors have made file contributions by accessing information about each of the file contributions made to the storage object (e.g., through the entry Contributions 220 within Storage Object Attributes 200 for the storage object, as depicted and discussed in connection with FIG. 2) and checking that information against information about all contributors to the storage object. In some embodiments the system determines whether all contributors have made file contributions by accessing information about each of the contributors (e.g., through the entry Contributors 216 within Storage Object Attributes 200 for the storage object, as depicted and discussed in connection with FIG. 2), where such information identifies the file contributions that each contributor has made. In some embodiments the system determines whether all contributors have confirmed that they have made all of the file contributions they intend to make to the storage object by accessing information about each of the contributors to the storage object (e.g., through the entry Contributors 216 within Storage Object Attributes 200 for the storage object, as depicted and discussed in connection with FIG. 2), where such information identifies whether the contributor has confirmed. If, at the earliest exchange time, all contributors have not made file contributions to the storage object the system and/or all contributors have not confirmed the system will continue to receive contributions until a contributor that has not previously made a contribution makes a contribution or until a contributor that has not confirmed confirms (block 2114). Once that a contributor that has not previously made a contribution makes a contribution or once a contributor that has not previously confirmed confirms, the system again checks whether all contributors have made contributions and whether all contributors have confirmed (block 2108). If not all contributors have made contributions and/or if not all contributors have confirmed the system continues to receive contributions and confirmations until a contributor that has not previously made a contribution makes a contribution or until a contributor that has not confirmed confirms (block 2114). Once the system determines as a result of (block 2108) that all contributors have made contributions to the storage object and that all contributors have confirmed the system will set the storage object status attribute value to "Unlocked" (block 2110), providing the simultaneous file exchange. The system makes contributions available to entities associated with the storage object and/or provides contributions to entities associated with the storage object (block 2112) to effect the simultaneous file exchange. In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked" and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example, if an entity does not make a file contribution and/or does not confirm they have made all of their file contributions by the expiration time (i.e., when the determination is first made in (block 2108) that information may be indicated on a record. For example, if an entity makes a file contribution and/or confirms they have made their file contribution the time of the file contribution and/or the time of the confirmation may be indicated on a record. For example if an entity access a file contribution made available from a simultaneous exchange that information may be indicated on a record.

Figure 22:
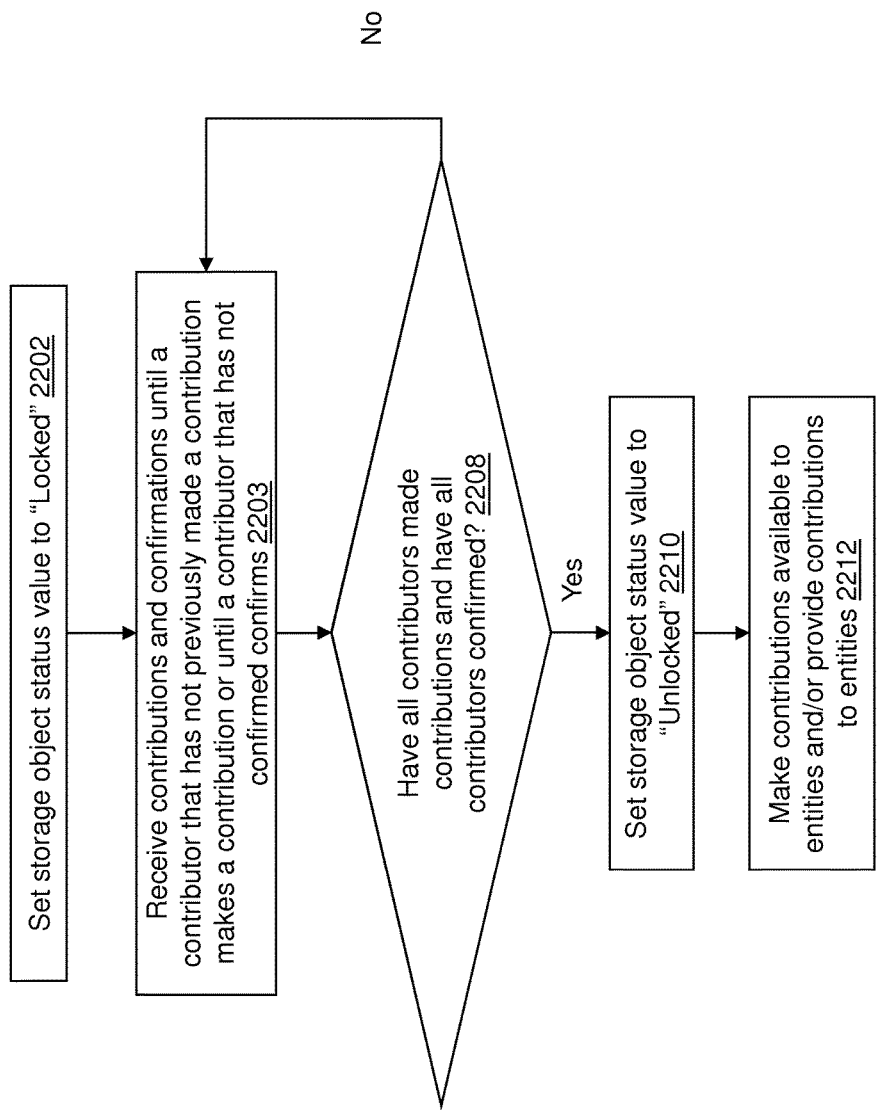
FIG. 22 is a flowchart of a method used in the operation of a storage object in some embodiments of the invention.

FIG. 22 is a flowchart of a method used in the operation of a storage object in some embodiments of the invention. Particularly, the flowchart of FIG. 22 concerns a storage object that has a type attribute value of "Unlock After Parties Have Uploaded" where all entities are required to confirm that their file contributions to the storage object are complete before the storage object status value is set to "Unlocked". In some embodiments the storage object has a type attribute value of "Unlock After Parties Have Uploaded" as a result of receiving input from an entity associated with the storage object (e.g., a selection by the entity of "Unlock After Parties Have Uploaded" from the Select Storage Object Type 706 prompt on screen 700 as depicted and discussed in connection with FIG. 7). In some embodiments entities are required to confirm that their file contributions to the storage object are complete before the storage object status value is set to "Unlocked" as a result of receiving input from an entity associated with the storage object (e.g., a selection by the entity of "Yes" from the Require Confirmation Before Unlock 707 prompt as depicted and discussed in connection with FIG. 7). The system sets the storage object status value to "Locked" (block 2202). In some embodiments this storage object status value is set according to the system facilitating the operation of the storage object (e.g., the system implements a rule that all created storage objects begin with a "Locked" status value). The system will then receive contributions and confirmations until a contributor that has not previously made a contribution makes a contribution or until a contributor that has not confirmed confirms (block 2203). The file contributions are received from entities associated with the storage object that are contributors to the storage object. The confirmations are confirmations from entities that they have made all of the file contributions to the storage object that they intend to make. In some embodiments the system determines whether all contributors have made file contributions and/or determines whether a file contribution is received by a contributor that has not previously made a file contribution by accessing information about each of the file contributions made to the storage object (e.g., through the entry Contributions 220 within Storage Object Attributes 200 for the storage object, as depicted and discussed in connection with FIG. 2) and checking that information against information about all contributors to the storage object. In some embodiments the system determines whether all contributors have made file contributions and/or determines whether a file contribution is received by a contributor that has not previously made a file contribution by accessing information about each of the contributors to the storage object (e.g., through the entry Contributors 216 within Storage Object Attributes 200 for the storage object, as depicted and discussed in connection with FIG. 2), where such information identifies the file contributions that each contributor has made. In some embodiments the system determines whether all contributors have confirmed that they have made all of the file contributions they intend to make to the storage object by accessing information about each of the contributors to the storage object (e.g., through the entry Contributors 216 within Storage Object Attributes 200 for the storage object, as depicted and discussed in connection with FIG. 2), where such information identifies whether the contributor has confirmed. Once a contributor that has not previously made a contribution makes a contribution or a contributor that has not confirmed confirms, the system checks whether all contributors have made contributions and whether all contributors have confirmed (block 2208). If not all contributors have made contributions and/or not all contributors have confirmed the system continues to receive contributions and confirmations until a contributor that has not previously made a contribution makes a contribution or until a contributor that has not confirmed confirms (block 2203). Once the system determines as a result of (block 2208) that all contributors have made contributions to the storage object and that all contributors have confirmed the system will set the storage object status attribute value to "Unlocked" (block 2210), providing the simultaneous file exchange. The system makes contributions available to entities associated with the storage object and/or provides contributions to entities associated with the storage object (block 2212) to effect the simultaneous file exchange. In some embodiments, file contributions made by contributors to the storage object that were previously unavailable to an entity are made available through an interface associated with the system facilitating the operation of the storage object (e.g., a website, application, app, etc.). In some embodiments a notification is sent to entities associated with the storage object that the status attribute value has been set to "Unlocked"

and/or that file contributions made by other entities are accessible (e.g., through a website, application, app, etc. associated with the system facilitating the operation of the storage object). In some embodiments a notification is sent to entities associated with the storage object that includes file contributions made by other entities associated with the storage object. In some embodiments one or more record is created by the system facilitating the operation of the storage object and made available to one or more entity associated with the storage object or another entity, where the record indicates some or all of the actions of the entities associated with the storage object. For example, if an entity makes a file contribution or confirms they have made their file contribution the time of the file contribution and/or the time of the confirmation may be indicated on a record. For example if an entity access a file contribution made available from a simultaneous exchange that information may be indicated on a record.

FIG. 23 is a diagram depicting interaction with a system facilitating the operation of a storage object wherein an entity is invited to a storage object. In the diagram, the approximate time an action occurs is indicated with the parenthesis that precede the action. Contributor A 2302A and Contributor B 2303B are both entities that are contributors to a storage object. System 2302C is a system facilitating the operation of the storage object that Contributor A 2302A and Contributor B 2302B are contributors to. In the example given by FIG. 23, at 08:00 Contributor A 2302A submits a request to create a storage object (2304A). The request is sent to System 2302C. System 2302C receives the request to create the storage object and creates the storage object (2304C). Though both the actions (2304A) and (2304C) are shown to occur at approximately 08:00, action (2304A) necessarily precedes action (2304C) in the example, though the two actions may take place at close to the same time. At 09:00 Contributor A 2302A submits a request to invite Contributor B to the storage object (2306A). The request is sent to System 2302C. System 2302C receives the request to invite Contributor B to the storage object and invites Contributor B to the storage object (block 2306C). Contributor B 2302B receives the invitation to the storage object (2306B). Though the actions (2306A), (2306B), and (2306C) are each shown to occur at approximately 09:00, action (2306A) necessarily precedes action (2306C) and action (2306C) necessarily precedes action (2306B) in the example, though the three actions may happen very close in time.

Figure 24:
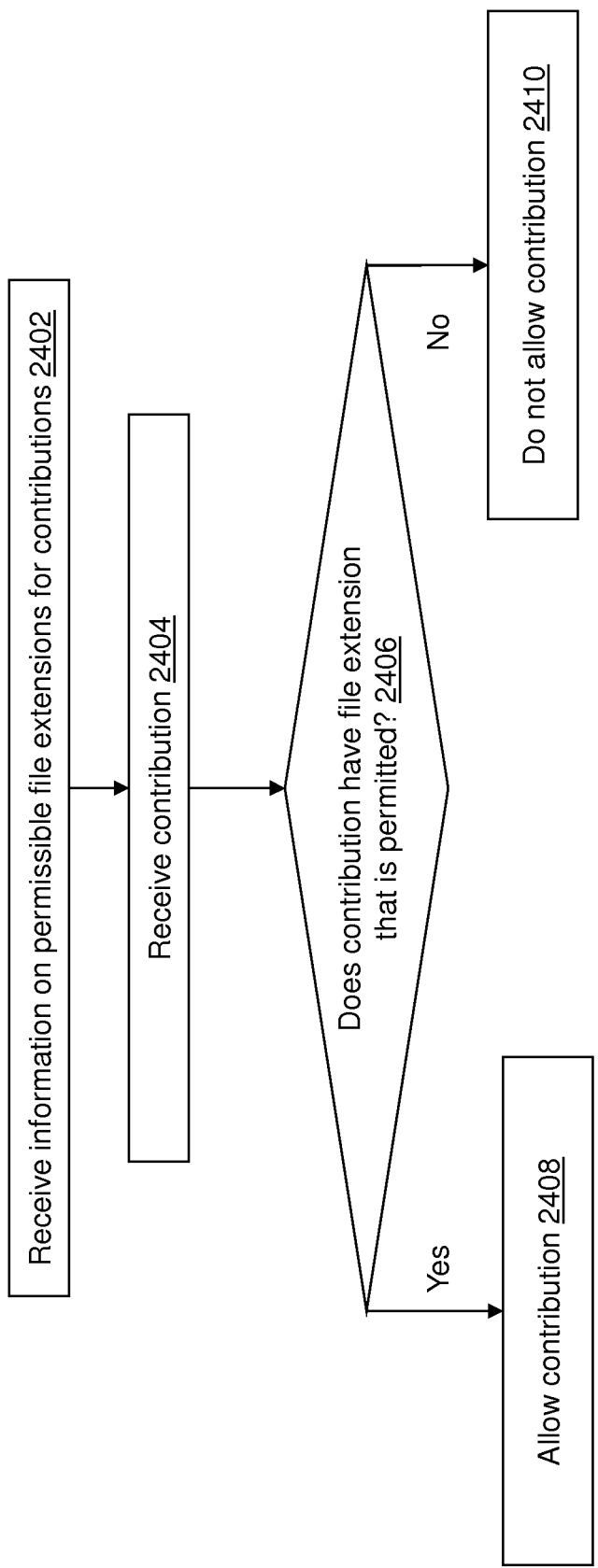
FIG. 24 is a flowchart of a method used in the operation of a storage object in some embodiments of the invention for determining whether a file contribution has a file extension that is permitted.

FIG. 24 is a flowchart of a method used in the operation of a storage object in some embodiments of the invention for determining whether a file contribution has a file extension that is permitted. The system facilitating the operation of the storage object receives information on permissible file extensions for contributions (block 2402). This information may be supplied, for example, by entities associated with the storage object in the form of permissible file extensions or impermissible file extensions. Thereafter the system receives a file contribution (block 2404). The file contribution can be any file provided to the storage object by a contributor. After receiving the file contribution the system determines whether the file contribution has a file extension that is permitted (block 2406). In some embodiments the determination may be made at least in part by comparing the file extension of the file contribution to a list of permissible file extensions (e.g., as expressed in a file, as expressed as a variable held in memory). In some embodiments the determination may be made at least in part by comparing the file extension of the file contribution to a list of impermissible file extensions (e.g., as expressed in a file, as expressed as a variable held in memory). If the file extension is permitted the system allows the file contribution (block 2408). If the file extension is not permitted the system does not allow the file contribution (block 2410). In some embodiments a message indicating that the file contribution is not permitted is provided to the contributor that attempted the file contribution. The method depicted in the flowchart of FIG. 24, and in particular the determination made in (block 2406) is suitable for implementation whenever a file contribution is made to a storage object (e.g., in conjunction with (block 1606) as depicted and discussed in connection with FIG. 16, in conjunction with (block 1706) as depicted and discussed in connection with FIG. 17, in conjunction with (block 1806) as depicted and discussed in connection with FIG. 18, in conjunction with (block 1903) as depicted and discussed in connection with FIG. 19, in conjunction with (block 2006) as depicted and discussed in connection with FIG. 20, in conjunction with (block 2106) as depicted and discussed in connection with FIG. 21, in conjunction with (block 2203) as depicted and discussed in connection with FIG. 22, etc.).

Figure 25:
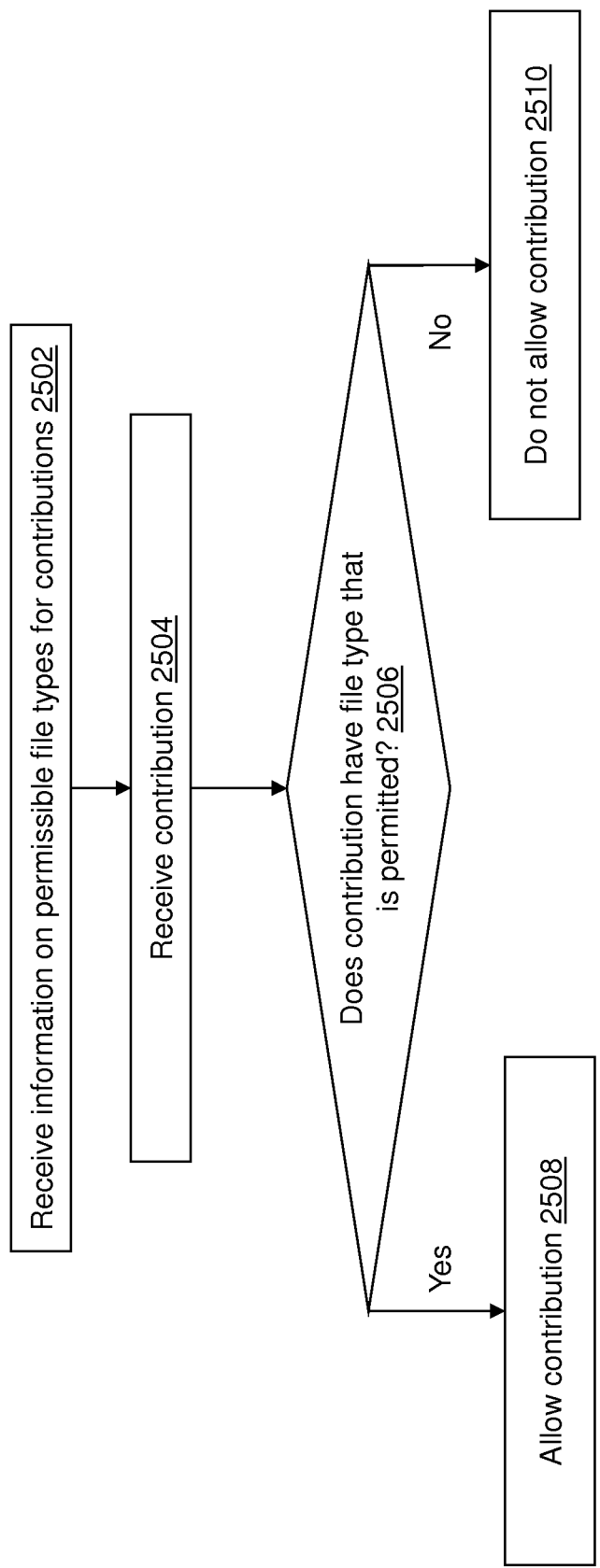
FIG. 25 is a flowchart of a method used in the operation of a storage object in some embodiments of the invention for determining whether a file contribution has a file type that is permitted.

FIG. 25 is a flowchart of a method used in the operation of a storage object in some embodiments of the invention for determining whether a file contribution has a file type that is permitted. The system facilitating the operation of the storage object receives information on permissible file types for contributions (block 2502). This information may be supplied, for example, by entities associated with the storage object in the form of permissible file types or impermissible file types. Thereafter the system receives a file contribution (block 2504). The file contribution can be any file provided to the storage object. After receiving the file contribution the system determines whether the file contribution has a file type that is permitted (block 2506). In some embodiments the determination may be made at least in part by comparing the file type of the file contribution to a list of permissible file types (e.g., as expressed in a file, as expressed as a variable held in memory). In some embodiments the determination may be made at least in part by comparing the file type of the file contribution to a list of impermissible file types (e.g., as expressed in a file, as expressed as a variable held in memory). If the file type is permitted the system allows the file contribution (block 2508). If the file type is not permitted the system does not allow the file contribution (block 2510). In some embodiments a message indicating that the file contribution is not permitted is provided to the contributor that attempted the file contribution. The method depicted in the flowchart of FIG. 25, and in particular the determination made in (block 2506) is suitable for implementation whenever a file contribution is made to a storage object (e.g., in conjunction with (block 1606) as depicted and discussed in connection with FIG. 16, in conjunction with (block 1706) as depicted and discussed in connection with FIG. 17, in conjunction with (block 1806) as depicted and discussed in connection with FIG. 18, in conjunction with (block 1903) as depicted and discussed in connection with FIG. 19, in conjunction with (block 2006) as depicted and discussed in connection with FIG. 20, in conjunction with (block 2106) as depicted and discussed in connection with FIG. 21, in conjunction with (block 2203) as depicted and discussed in connection with FIG. 22, etc.).

Figure 26:
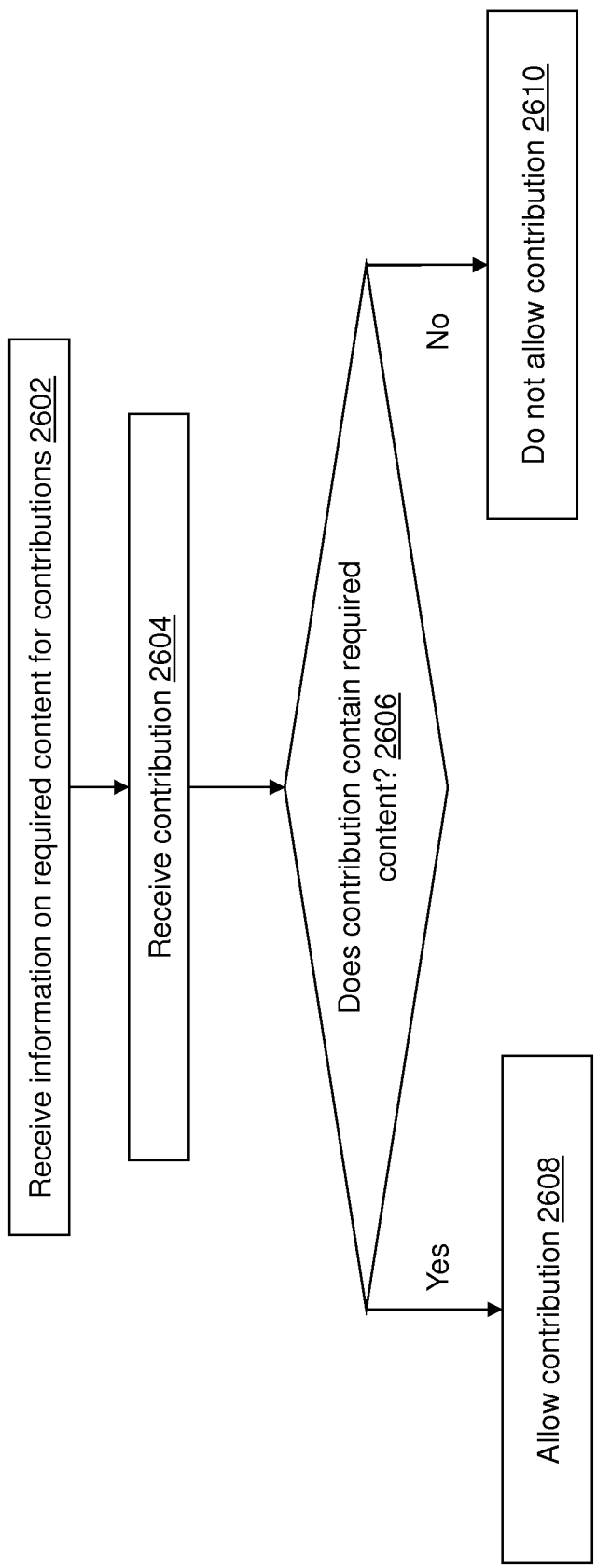
FIG. 26 is a flowchart of a method used in the operation of a storage object in some embodiments of the invention for determining whether a file contribution contains required content.

FIG. 26 is a flowchart of a method used in the operation of a storage object in some embodiments of the invention for determining whether a file contribution contains required content. The system facilitating the operation of the storage object receives information on required content for contributions (block 2602). Thereafter the system receives a file contribution (block 2604). The file contribution can be any file provided to the storage object. After receiving the file contribution the system determines whether the file contribution has required content (block 2606). In some embodiments the determination may be made at least in part by searching the content of the file contribution for required elements (e.g., where it is required that the content contain a monetary expression, the "$" symbol may be searched for in the file contribution; where it is required that the content of a file contribution contain English words, the file contribution will be searched for words that exist in a database of words in an English dictionary; where it is required that the content contain a monetary amount within a certain range, the content will be searched for a numeric expression within that range; etc.). In some embodiments the determination is made by examining metadata in the file contribution (e.g., to indicate that the file contribution is a version of a document that is expected to be provided). In some embodiments the determination is made by examining whether the file contribution contains markup (e.g., comments, track-changes, etc.). If the file contribution contains the required content the system allows the file contribution (block 2608). If the file contribution does not contain the required content the system does not allow the file contribution (block 2610). In some embodiments a message indicating that the file contribution is not permitted is provided to the contributor that attempted the file contribution. The method depicted in the flowchart of FIG. 26, and in particular the determination made in (block 2606) is suitable for implementation whenever a file contribution is made to a storage object (e.g., in conjunction with (block 1606) as depicted and discussed in connection with FIG. 16, in conjunction with (block 1706) as depicted and discussed in connection with FIG. 17, in conjunction with (block 1806) as depicted and discussed in connection with FIG. 18, in conjunction with (block 1903) as depicted and discussed in connection with FIG. 19, in conjunction with (block 2006) as depicted and discussed in connection with FIG. 20, in conjunction with (block 2106) as depicted and discussed in connection with FIG. 21, in conjunction with (block 2203) as depicted and discussed in connection with FIG. 22, etc.).

Figure 27:
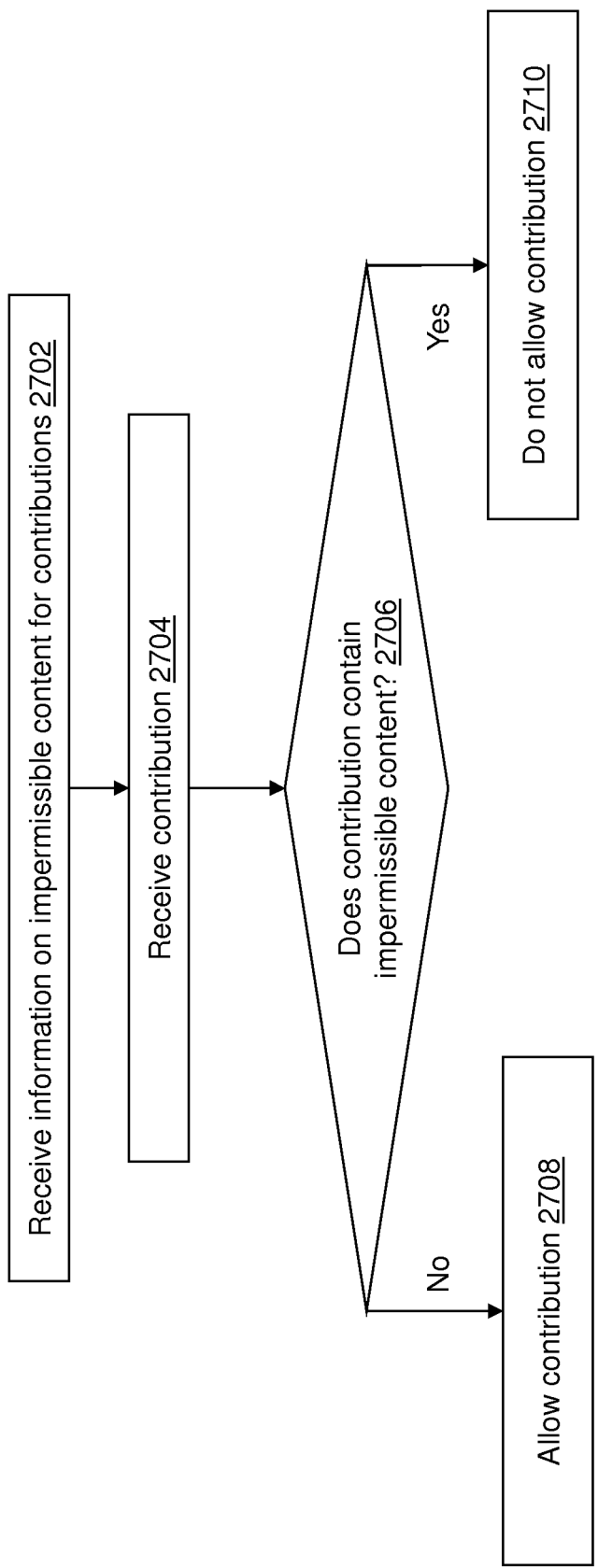
FIG. 27 is a flowchart of a method used in the operation of a storage object in some embodiments of the invention for determining whether a file contribution contains impermissible content.

FIG. 27 is a flowchart of a method used in the operation of a storage object in some embodiments of the invention for determining whether a file contribution contains impermissible content. The system facilitating the operation of the storage object receives information on impermissible content for contributions (block 2702). This information may be supplied, for example, by entities associated with the storage object in the form of impermissible content. Thereafter the system receives a file contribution (block 2704). The file contribution can be any file provided to the storage object. After receiving the file contribution the system determines whether the file contribution has impermissible content (block 2706). In some embodiments the determination may be made at least in part by searching the content of the file contribution for impermissible elements (e.g., where it is required that the content contain only a monetary expression or a numeric expression, characters that are letters may be searched for in the file contribution; where it is required that the content of a file contribution contain no images, the file contribution will be searched for images; where it is required that the content contain no profanity, the file contribution will be searched for words that are on a list of profane words; etc.). In some embodiments the determination is made by examining metadata in the file contribution (e.g., to indicate that the file contribution is a version of a document that is expected to be provided). In some embodiments the determination is made by examining whether the file contribution contains pornographic imagery (e.g., by examining the filename for naming conventions that conform the naming conventions for pornography, by using image content analysis based on skin detection, or many other well known methods). In some embodiments the determination is made by examining whether the file contribution contains markup (e.g., comments, track-changes, etc.). If the file contribution does not contain impermissible content the system allows the file contribution (block 2708). If the file contribution does contain impermissible content the system does not allow the file contribution (block 2710). In some embodiments a message indicating that the file contribution is not permitted is provided to the contributor that attempted the file contribution. The method depicted in the flowchart of FIG. 27, and in particular the determination made in (block 2706) is suitable for implementation whenever a file contribution is made to a storage object (e.g., in conjunction with (block 1606) as depicted and discussed in connection with FIG. 16, in conjunction with (block 1706) as depicted and discussed in connection with FIG. 17, in conjunction with (block 1806) as depicted and discussed in connection with FIG. 18, in conjunction with (block 1903) as depicted and discussed in connection with FIG. 19, in conjunction with (block 2006) as depicted and discussed in connection with FIG. 20, in conjunction with (block 2106) as depicted and discussed in connection with FIG. 21, in conjunction with (block 2203) as depicted and discussed in connection with FIG. 22, etc.).

FIG. 28 is a diagram depicting actions taken with a system facilitating the operation of a storage object wherein a storage object is created to facilitate a simultaneous file exchange where the file exchange is to occur once both parties make file contributions, and where the file exchange is to occur at or after a certain time. In the diagram, the approximate time an action occurs is indicated with the parenthesis that precede the action. Contributor A 2802A and Contributor B 2802B are both entities that are contributors to a storage object. System 2802C is a system facilitating the operation of the storage object that Contributor A 2802A and Contributor B 2302B are contributors to. In the example given by FIG. 28, at 08:00 Contributor A 2802A submits a request to create a storage object where the exchange is to occur once both parties make contributions and where the exchange occurs at or after 11:00 (2804A). The request is sent to System 2802C. System 2302C receives the request to create the storage object where the exchange is to occur once both parties make contributions and where the exchange occurs at or after 11:00 and creates the storage object (2804C). Though both the actions (2804A) and (2804C) are shown to occur at approximately 08:00, action (2804A) necessarily precedes action (2804C) in the example, though the two actions may take place at close to the same time. At 09:00 Contributor A 2802A makes a file contribution to the storage object (2806A). At 10:00 Contributor B 2302B makes a file contribution to the storage object (2808B). Though after action (2808B) both Contributor A 2802A and Contributor B 2802B have made file contributions to the storage object, the file contributions made to the storage object are not yet made available to parties (i.e., the simultaneous file exchange does not occur yet). This is because the exchange must occur at or after 11:00 (e.g., as specified in the rules attribute for the storage object). At 11:00 System 2802C performs the simultaneous file exchange by providing the contributions made to the storage object to both parties (2810C). This may be accomplished by making the file contributions available on a website or app that Contributor A 2802A and Contributor B 2802B can access, for example. This may also be accomplished by providing the file contributions to Contributor A 2802A and Contributor B 2802B through email.

FIG. 29 is a diagram depicting actions taken with a system facilitating the operation of a storage object wherein a storage object is created to facilitate a simultaneous file exchange where the file exchange is to occur once both parties make file contributions, and where the file exchange is to occur at or after a certain time. In the diagram, the approximate time an action occurs is indicated with the parenthesis that precede the action. Contributor A 2902A and Contributor B 2902B are both entities that are contributors to a storage object. System 2902C is a system facilitating the operation of the storage object that Contributor A 2902A and Contributor B 2902B are contributors to. In the example given by FIG. 29, at 08:00 Contributor A 2902A submits a request to create a storage object where the exchange is to occur once both parties make contributions and where the exchange occurs at or after 11:00 (2904A). The request is sent to System 2902C. System 2902C receives the request to create the storage object where the exchange is to occur once both parties make contributions and where the exchange occurs at or after 11:00 and creates the storage object (2904C). Though both the actions (2904A) and (2904C) are shown to occur at approximately 08:00, action (2904A) necessarily precedes action (2904C) in the example, though the two actions may take place at close to the same time. At 09:00 Contributor A 2902A makes a file contribution to the storage object (2906A). At 12:00 Contributor B 2902B makes a file contribution to the storage object (2908B). After action (2802B) both Contributor A 2802A and Contributor B 2802B have made file contributions to the storage object. This means that the criteria for the exchange to occur has been met (e.g., as specified in the rules attribute for the storage object). At 12:00 System 2802C performs the simultaneous file exchange by providing the contributions made to the storage object to both parties (2808C). Though both the actions (2908B) and (2908C) are shown to occur at approximately 12:00, action (2908B) necessarily precedes action (2908C) in the example, though the two actions may take place at close to the same time. FIG. 29 and FIG. 28 both concern the operation of a storage object that performs the simultaneous file exchange according to the same rules. The difference in the inputs (e.g., the time of the actions by the contributors) depicted in the two examples given in FIG. 28 and FIG. 29 results in different outcomes (e.g., the time the system performs the simultaneous file exchange) in those examples.

FIG. 30 is a diagram depicting actions taken with a system facilitating the operation of a storage object wherein a storage object is created to facilitate a simultaneous file exchange where the file exchange is to occur once both parties make file contributions. In the diagram, the approximate time an action occurs is indicated with the parenthesis that precede the action. Contributor A 3002A and Contributor B 3002B are both entities that are contributors to a storage object. System 3002C is a system facilitating the operation of the storage object that Contributor A 3002A and Contributor B 3002B are contributors to. In the example given by FIG. 30, at 08:00 Contributor A 3002A submits a request to create a storage object where the exchange is to occur once both parties make contributions (3004A). The request is sent to System 3002C. System 3002C receives the request to create the storage object where the exchange is to occur once both parties make contributions and creates the storage object and creates the storage object (3004C). Though both the actions (3004A) and (3004C) are shown to occur at approximately 08:00, action (3004A) necessarily precedes action (3004C) in the example, though the two actions may take place at close to the same time. At 09:00 Contributor A 3002A makes a file contribution to the storage object (3006A). At 10:00 Contributor B 3002B makes a file contribution to the storage object (3008B). After action (3008B) both Contributor A 3002A and Contributor B 3002B have made file contributions to the storage object. This means that the criteria for the simultaneous file exchange to occur has been met (e.g., as specified in the rules attribute for the storage object). At 10:00 System 2802C performs the exchange by providing the contributions made to the storage object to both parties (3008C). Though both the actions (3008B) and (3008C) are shown to occur at approximately 10:00, action (3008B) necessarily precedes action (3008C) in the example, though the two actions may take place at close to the same time.

FIG. 31 is a diagram depicting actions taken with a system facilitating the operation of a storage object wherein a storage object is created to facilitate a simultaneous file exchange where the file exchange is to occur once both parties make file contributions. In the diagram, the approximate time an action occurs is indicated with the parenthesis that precede the action. Contributor A 3102A and Contributor B 3102B are both entities that are contributors to a storage object. System 3102C is a system facilitating the operation of the storage object that Contributor A 3102A and Contributor B 3102B are contributors to. In the example given by FIG. 31, at 08:00 Contributor A 3102A submits a request to create a storage object where the exchange is to occur once both parties make contributions (3104A). The request is sent to System 3102C. System 3102C receives the request to create the storage object where the exchange is to occur once both parties make contributions and creates the storage object (3104C). Though both the actions (3104A) and (3104C) are shown to occur at approximately 08:00, action (3104A) necessarily precedes action (3104C) in the example, though the two actions may take place at close to the same time. At 09:00 Contributor A 3102A makes a file contribution to the storage object (3106A). At 12:00 Contributor B 3102B makes a file contribution to the storage object (3108B). After action (3102B) both Contributor A 3102A and Contributor B 3102B have made file contributions to the storage object. This means that the criteria for the simultaneous file exchange to occur has been met (e.g., as specified in the rules attribute for the storage object). At 12:00 System 3102C performs the simultaneous file exchange by providing the contributions made to the storage object to both parties (3108C). Though both the actions (3108B) and (3108C) are shown to occur at approximately 12:00, action (3108B) necessarily precedes action (3108C) in the example, though the two actions may take place at close to the same time. FIG. 30 and FIG. 31 both concern the operation of a storage object that performs the simultaneous file exchange according to the same rules. The difference in the inputs (e.g., the time of the actions by the contributors) depicted in the two examples given in FIG. 30 and FIG. 31 results in different outcomes (e.g., the time the system performs the simultaneous file exchange) in those examples.

FIG. 32 is a diagram depicting actions taken with a system facilitating the operation of a storage object wherein a storage object is created to facilitate a simultaneous file exchange where the file exchange is to occur once both parties make file contributions, where the exchange is to occur once both parties confirm they have made their file contribution, and where the file exchange is to occur at or after a certain time. In the diagram, the approximate time an action occurs is indicated with the parenthesis that precede the action. Contributor A 3202A and Contributor B 3202B are both entities that are contributors to a storage object. System 3202C is a system facilitating the operation of the storage object that Contributor A 3202A and Contributor B 3202B are contributors to. In the example given by FIG. 32, at 08:00 Contributor A 3202A submits a request to create a storage object where the exchange is to occur once both parties make contributions, once both parties confirm they have made their contributions, and where the exchange occurs at or after 11:00 (3204A). The request is sent to System 3202C. System 3202C receives the request to create the storage object where the exchange is to occur once both parties make contributions, once both parties confirm they have made their contributions, and where the exchange occurs at or after 11:00 and creates the storage object (3204C). Though both the actions (3204A) and (3204C) are shown to occur at approximately 08:00, action (3204A) necessarily precedes action (3204C) in the example, though the two actions may take place at close to the same time. At 09:00 Contributor A 3202A makes a file contribution to the storage object (3206A). At 10:00 Contributor A 3202A confirms their contribution has been made (3208A). At 10:00 Contributor B 3202B makes a file contribution to the storage object and confirms their contribution has been made (3208B). Though after action (3202B) both Contributor A 3202A and Contributor B 3202B have made file contributions to the storage object and have confirmed their file contributions have been made, the file contributions made to the storage object are not yet made available to parties (i.e., the simultaneous file exchange does not occur yet). This is because the exchange must occur at or after 11:00 (e.g., as specified in the rules attribute for the storage object). At 11:00 System 3202C performs the simultaneous file exchange by providing the contributions made to the storage object to both parties (3210C). This may be accomplished by making the file contributions available on a website or app that Contributor A 3202A and Contributor B 3202B can access, for example. This may also be accomplished by providing the file contributions to Contributor A 3202A and Contributor B 3202B through email. In some embodiments, by requiring that both Contributor A 3202A and Contributor B 3202B to confirm that their file contributions have been made before the exchange occurs, both Contributor A 3202A and Contributor B 3202B are afforded the opportunity to review the files that they have contributed (and thus have the chance to substitute or remove such files from the storage object) before the exchange occurs.

FIG. 33 is a diagram depicting actions taken with a system facilitating the operation of a storage object wherein a storage object is created to facilitate a simultaneous file exchange where the file exchange is to occur once both parties make file contributions, where the exchange is to occur once both parties confirm they have made their file contribution, and where the file exchange is to occur at or after a certain time. In the diagram, the approximate time an action occurs is indicated with the parenthesis that precede the action. Contributor A 3302A and Contributor B 3302B are both entities that are contributors to a storage object. System 3302C is a system facilitating the operation of the storage object that Contributor A 3302A and Contributor B 3302B are contributors to. In the example given by FIG. 33, at 08:00 Contributor A 3302A submits a request to create a storage object where the exchange is to occur once both parties make contributions, once both parties confirm they have provided their contributions, and where the exchange occurs at or after 11:00 (3304A). The request is sent to System 3302C. System 3302C receives the request to create the storage object where the exchange is to occur once both parties make contributions, once both parties confirm their contributions, and where the exchange occurs at or after 11:00 and creates the storage object (3304C). Though both the actions (3304A) and (3304C) are shown to occur at approximately 08:00, action (3304A) necessarily precedes action (3304C) in the example, though the two actions may take place at close to the same time. At 09:00 Contributor A 3302A makes a file contribution to the storage object (3306A). At 10:00 Contributor A 3302A confirms their contribution has been made (3308A). At 12:00 Contributor B 3302B makes a file contribution to the storage object and confirms their contribution has been made (3310B). After action (3310B) both Contributor A 3302A and Contributor B 3302B have made file contributions to the storage object and have confirmed their contributions have been made. At 12:00 System 3302C performs the simultaneous file exchange by providing the contributions made to the storage object to both parties (3310C). This may be accomplished by making the file contributions available on a website or app that Contributor A 3302A and Contributor B 3302B can access, for example. This may also be accomplished by providing the file contributions to Contributor A 3302A and Contributor B 3302B through email. In some embodiments, by requiring that both Contributor A 3302A and Contributor B 3302B confirm that their file contributions have been made before the exchange occurs, both Contributor A 3302A and Contributor B 3302B are afforded the opportunity to review the files that they have contributed (and thus have the chance to substitute or remove such files from the storage object) before the exchange occurs. FIG. 32 and FIG. 33 both concern the operation of a storage object that performs the simultaneous file exchange according to the same rules. The difference in the inputs (e.g., the time of the actions by the contributors) depicted in the two examples given in FIG. 32 and FIG. 33 results in different outcomes (e.g., the time the system performs the simultaneous file exchange) in those examples.

FIG. 34 is a diagram depicting actions taken with a system facilitating the operation of a storage object wherein a storage object is created to facilitate a simultaneous file exchange where the file exchange is to occur once both parties make file contributions and where the exchange is to occur once both parties confirm they have made their file contribution. In the diagram, the approximate time an action occurs is indicated with the parenthesis that precede the action. Contributor A 3402A and Contributor B 3402B are both entities that are contributors to a storage object. System 3402C is a system facilitating the operation of the storage object that Contributor A 3402A and Contributor B 2302B are contributors to. In the example given by FIG. 34, at 08:00 Contributor A 3402A submits a request to create a storage object where the exchange is to occur once both parties make contributions and once both parties confirm they have provided their contributions (3404A). The request is sent to System 3402C. System 3402C receives the request to create the storage object where the exchange is to occur once both parties make contributions and once both parties confirm their contributions and creates the storage object (3404C). Though both the actions (3404A) and (3404C) are shown to occur at approximately 08:00, action (3404A) necessarily precedes action (3404C) in the example, though the two actions may take place at close to the same time. At 09:00 Contributor A 3402A makes a file contribution to the storage object (3406A). At 10:00 Contributor A 3402A confirms their contribution has been made (3408A). At 10:00 Contributor B 3402B makes a file contribution to the storage object (3408B). At 11:00 Contributor B 3402B confirms their contribution has been made (3410B). After action (3410B) both Contributor A 3402A and Contributor B 3402B have made file contributions to the storage object and have confirmed their contributions have been made. At 11:00 System 3402C performs the simultaneous file exchange by providing the contributions made to the storage object to both parties (3410C). This may be accomplished by making the file contributions available on a website or app that Contributor A 3402A and Contributor B 3402B can access, for example. This may also be accomplished by providing the file contributions to Contributor A 3402A and Contributor B 3402B through email. Though both the actions (3410B) and (3410C) are shown to occur at approximately 11:00, action (3410B) necessarily precedes action (3410C) in the example, though the two actions may take place at close to the same time. In some embodiments, by requiring that both Contributor A 3402A and Contributor B 3402B to confirm that their file contributions have been made before the exchange occurs, both Contributor A 3402A and Contributor B 3402B are afforded the opportunity to review the files that they have contributed (and thus have the chance to substitute or remove such files from the storage object) before the exchange occurs.

FIG. 35 is a diagram depicting actions taken with a system facilitating the operation of a storage object wherein a storage object is created to facilitate a simultaneous file exchange where the file exchange is to occur once both parties make file contributions and where the exchange is to occur once both parties confirm they have made their file contribution. In the diagram, the approximate time an action occurs is indicated with the parenthesis that precede the action. Contributor A 3502A and Contributor B 3502B are both entities that are contributors to a storage object. System 3502C is a system facilitating the operation of the storage object that Contributor A 3502A and Contributor B 3502B are contributors to. In the example given by FIG. 35, at 08:00 Contributor A 3502A submits a request to create a storage object where the exchange is to occur once both parties make contributions and once both parties confirm they have provided their contributions (3504A). The request is sent to System 3502C. System 3502C receives the request to create the storage object where the exchange is to occur once both parties make contributions and once both parties confirm their contributions and creates the storage object (3504C). Though both the actions (3504A) and (3504C) are shown to occur at approximately 08:00, action (3504A) necessarily precedes action (3504C) in the example, though the two actions may take place at close to the same time. At 09:00 Contributor A 3502A makes a file contribution to the storage object (3506A). At 11:00 Contributor A 3502A confirms their contribution has been made (3508A). At 12:00 Contributor B 3502B makes a file contribution to the storage object and confirms their contribution has been made (3510B). After action (3510B) both Contributor A 3502A and Contributor B 3502B have made file contributions to the storage object and have confirmed their contributions have been made. At 12:00 System 3502C performs the simultaneous file exchange by providing the contributions made to the storage object to both parties (3510C). This may be accomplished by making the file contributions available on a website or app that Contributor A 3502A and Contributor B 3502B can access, for example. This may also be accomplished by providing the file contributions to Contributor A 3502A and Contributor B 3502B through email. Though both the actions (3510B) and (3510C) are shown to occur at approximately 12:00, action (3510B) necessarily precedes action (3510C) in the example, though the two actions may take place at close to the same time. In some embodiments, by requiring that both Contributor A 3502A and Contributor B 3502B to confirm that their file contributions have been made before the exchange occurs, both Contributor A 3502A and Contributor B 3502B are afforded the opportunity to review the files that they have contributed (and thus have the chance to substitute or remove such files from the storage object) before the exchange occurs. FIG. 34 and FIG. 35 both concern the operation of a storage object that performs the simultaneous file exchange according to the same rules. The difference in the inputs (e.g., the time of the actions by the contributors) depicted in the two examples given in FIG. 34 and FIG. 35 results in different outcomes (e.g., the time the system performs the simultaneous file exchange) in those examples.

Figure 36:
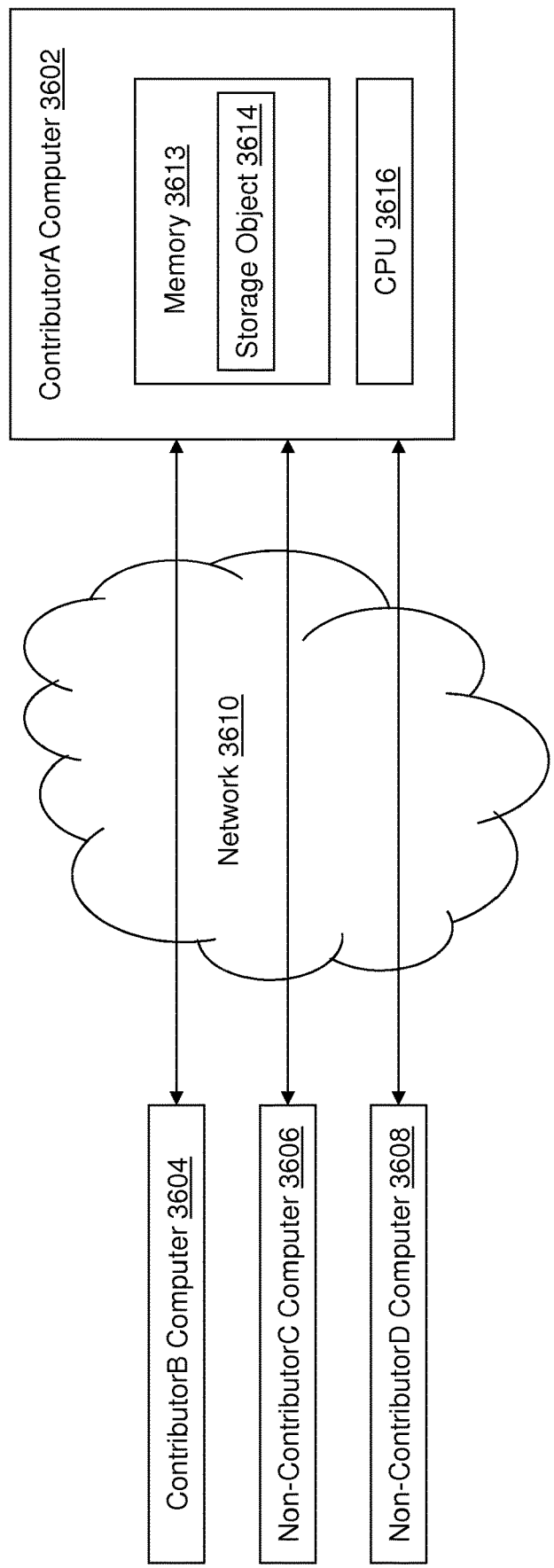
FIG. 36 is a block diagram depicting a system for use in some embodiments of the invention wherein a storage object is held on memory on a contributor computer.

FIG. 36 is a block diagram depicting a system for use in some embodiments of the invention wherein a storage object is held on memory on a contributor computer. In a network environment ContributorB Computer 3604, Non-ContributorC Computer 3606, and Non-ContributorD Computer 3608 each connect to ContributorA Computer 3602 through Network 3610. ContributorA Computer 3602 is used by an entity known as ContributorA that is a contributor to Storage Object 3614. ContributorB Computer 3604 is used by an entity known as ContributorB that is a contributor to Storage Object 3614. Non-ContributorC Computer 3606 is used by an entity known as Non-ContributorC that is a non-contributor to Storage Object 3614. Non-ContributorD Computer 3608 is used by an entity known as Non-ContributorD that is a non-contributor to Storage Object 3614. It should be appreciated that, though the figure illustrates two contributor computers and two non-contributor computers, in some embodiments there will be a different number of contributor computers and/or non-contributor computers. Network 3610 may be the Internet or some other network. ContributorB Computer 3604, Non-ContributorC Computer 3606, and Non-ContributorD Computer 3608 each can communicate bi-directionally with ContributorA Computer 3602. ContributorA, ContributorB, Non-ContributorC, and Non-ContributorD each are entities associated with Storage Object 3614. ContributorA Computer 3602 includes Memory 3613 and CPU 3616. Memory 3613 includes Storage Object 3614. CPU (central processing unit) 3616 accesses Memory 3613 and executes instructions therein to facilitate the operation of Storage Object 3614. Though depicted as one entity in the figure, in some embodiments ContributorA Computer 3602 comprises one or more separate computers, located in one or more physical locations. Though depicted as existing entirely within Memory 3613, in some embodiments Storage Object 3614 exists in part in Memory 3613 and in part in other memory (e.g., other memory within a computer other than ContributorA Computer 3602, other memory within ContributorA Computer 3602 not depicted in the figure, etc.). In some embodiments Memory 3613 contains software that provides the state of Storage Object 3614 to other computers (e.g., through Network 3610), as well as the functionality to process inputs to and provide outputs from Storage Object 3614. In some embodiments such instructions are provided by the system that facilitates the operation of Storage Object 3614, where such instructions exist at least in part in Memory 3613. For example, in some embodiments Memory 3613 includes software for making information held in Storage Object 3614 available to other entities through their computers (e.g., ContributorB Computer 3604, Non-ContributorC Computer 3606, Non-ContributorD Computer 3608, etc.) through a website, application, app, etc. Storage Object 3614 receives one or more file contribution from ContributorA Computer 3602. Storage Object 3614 receives one or more file contribution from ContributorB Computer 3604. According to rules concerning the operation of Storage Object 3614 (e.g., rules attributes for Storage Object 3614) one or more of the file contributions from ContributorA Computer 3602 and the file contributions from ContributorB Computer 3604 may be made available to entities within the network environment. For example, upon the satisfaction of certain requirements (e.g., as indicated in rules attributes for Storage Object 3614) file contributions made to Storage Object 3614 are made available and/or provided to one or more of: ContributorA Computer 3602, ContributorB Computer 3604, Non-ContributorC Computer 3606, and Non-ContributorD Computer 3608. In some embodiments Memory 3613 (or portions thereof) are not accessible to ContributorA even though Memory 3613 exists on ContributorA Computer 3602. For example, where a storage object is "Locked" a file contribution made by ContributorB (e.g., through the use of ContributorB Computer 3604) may not be accessible to Contributor A even though the file contribution exists in Memory 3613.

Figure 37:
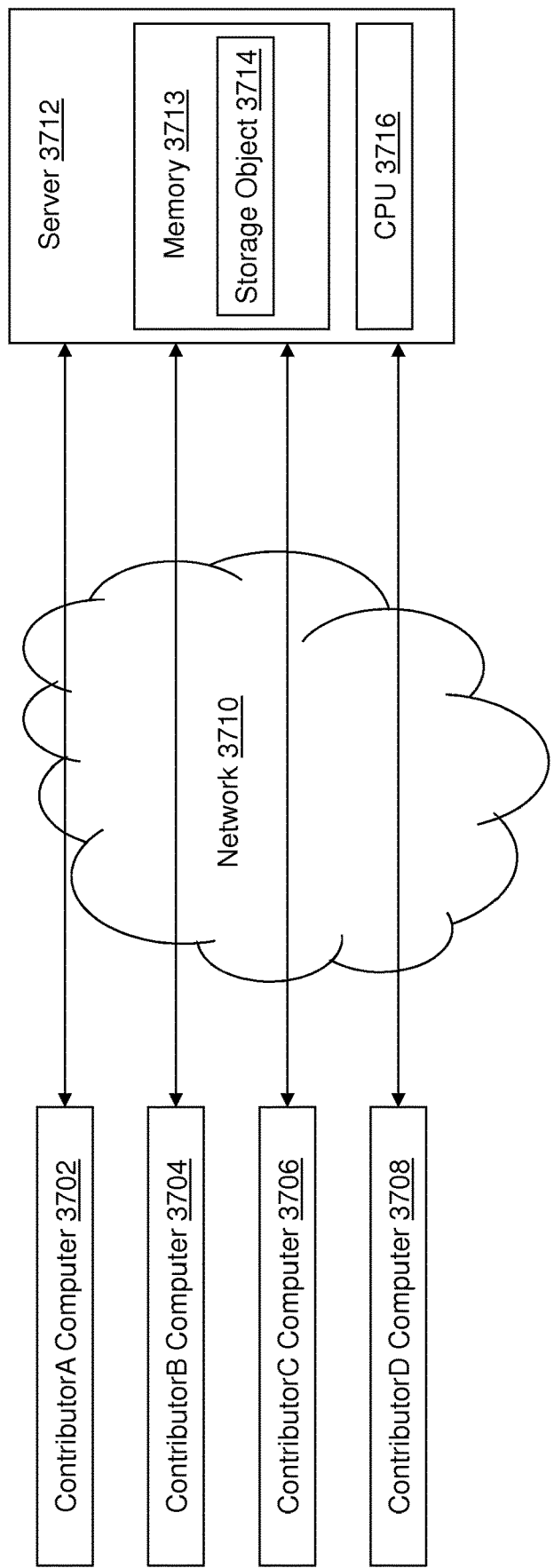
FIG. 37 is a block diagram depicting a system for use in some embodiments of the invention wherein a storage object is held on memory on a server.

FIG. 37 is a block diagram depicting a system for use in some embodiments of the invention wherein a storage object is held on memory on a server. In a network environment ContributorA Computer 3702, ContributorB Computer 3704, ContributorC Computer 3706, and ContributorD Computer 3708 each connect to Server 3712 through Network 3710. ContributorA Computer 3702 is used by an entity known as ContributorA that is a contributor to Storage Object 3714. ContributorB Computer 3704 is used by an entity known as ContributorB that is a contributor to Storage Object 3714. ContributorC Computer 3706 is used by an entity known as ContributorC that is a contributor to Storage Object 3714. ContributorD Computer 3708 is used by an entity known as ContributorD that is a contributor to Storage Object 3714. It should be appreciated that, though the figure illustrates four contributor computers, in some embodiments there will be a different number of contributor computers and a different number of contributors. Network 3710 may be the Internet or some other network. ContributorA Computer 3702, ContributorB Computer 3704, ContributorC Computer 3706, and ContributorD Computer 3708 each can communicate bi-directionally with Server 3712. ContributorA, ContributorB, ContributorC, and ContributorD each are entities associated with Storage Object 3714. Server 3712 includes Memory 3713 and CPU 3716. Memory 3713 includes Storage Object 3714. CPU (central processing unit) 3716 accesses Memory 3713 and executes instructions therein to facilitate the operation of Storage Object 3714. Though depicted as one entity in the figure, in some embodiments Server 3712 comprises one or more separate servers, located in one or more physical locations. Though depicted as existing entirely within Memory 3713, in some embodiments Storage Object 3714 exists in part in Memory 3713 and in part in other memory (e.g., other memory within a computer other than Server 3712, other memory within Server 3712 not depicted in the figure, etc.). In some embodiments Memory 3713 contains software that provides the state of Storage Object 3714 to other computers (e.g., through Network 3710), as well as the functionality to process inputs to and provide outputs from Storage Object 3714. In some embodiments such instructions are provided by the system that facilitates the operation of Storage Object 3714, where such instructions exist at least in part in Memory 3713. For example, in some embodiments Memory 3713 includes software for making information held in Storage Object 3714 available to other entities through their computers (e.g., ContributorA Computer 3702, ContributorB Computer 3704, ContributorC Computer 3706, ContributorD Computer 3708, etc.) through a website, application, app, etc. Storage Object 3714 receives one or more file contribution from ContributorA Computer 3702. Storage Object 3714 receives one or more file contribution from ContributorB Computer 3704. Storage Object 3714 receives one or more file contribution from ContributorC Computer 3706. Storage Object 3714 receives one or more file contribution from ContributorD Computer 3708. According to rules concerning the operation of Storage Object 3714 (e.g., rules attributes for Storage Object 3714) one or more of the file contributions from ContributorA Computer 3702, ContributorB Computer 3704, ContributorC Computer 3706, and/or ContributorD Computer 3708 may be made available to entities within the network environment. For example, upon the satisfaction of certain requirements (e.g., as indicated in rules attributes for Storage Object 3714) file contributions made to Storage Object 3714 are made available and/or provided to one or more of: ContributorA Computer 3702, ContributorB Computer 3704, ContributorC Computer 3706, and ContributorD Computer 3708.

Figure 38:
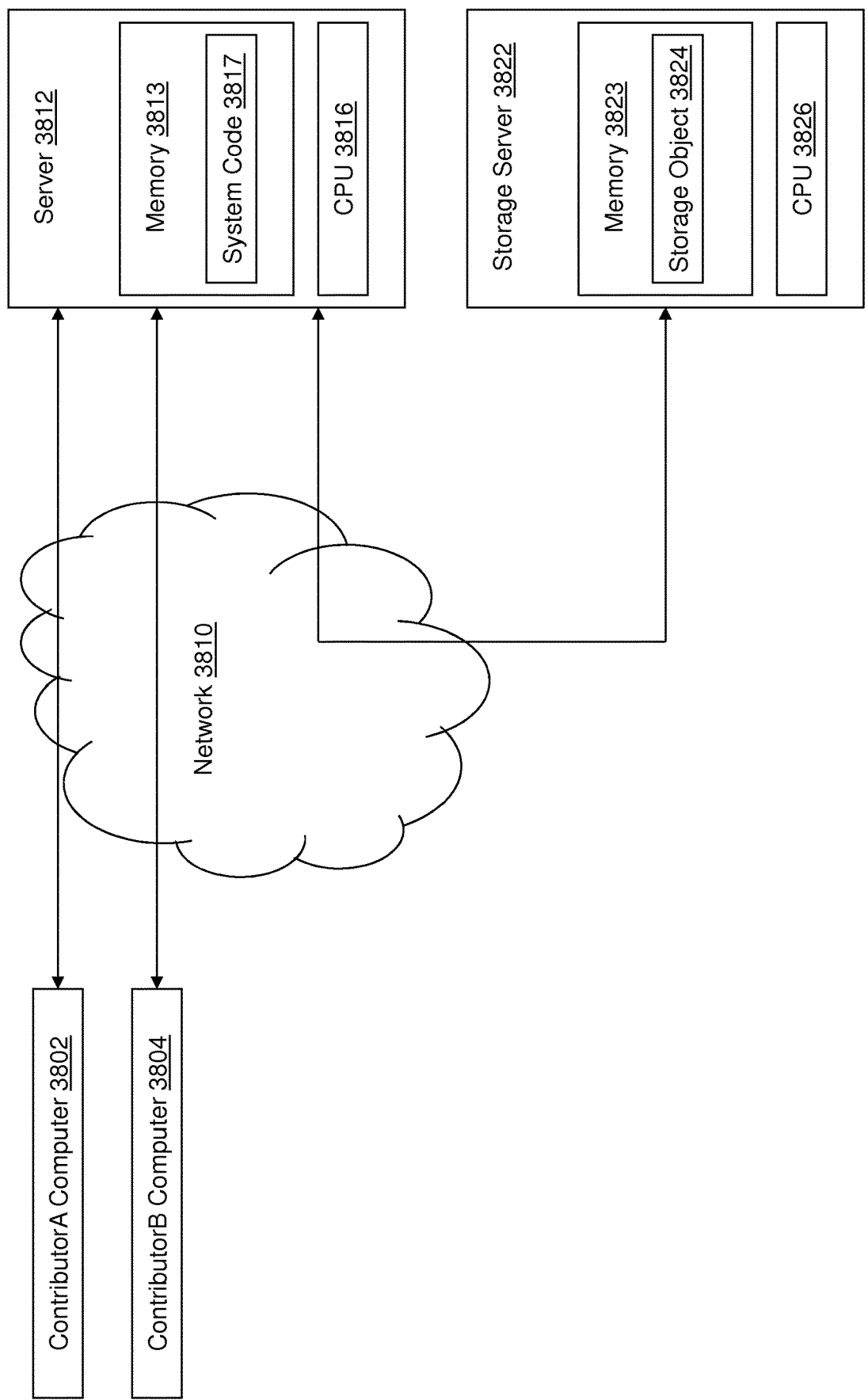
FIG. 38 is a block diagram depicting a system for use in some embodiments of the invention wherein system code for facilitating the operation of storage objects is held in memory on a server and wherein a storage object is held on a storage server.

FIG. 38 is a block diagram depicting a system for use in some embodiments of the invention wherein system code for facilitating the operation of storage objects is held in memory on a server and wherein a storage object is held on a storage server. In a network environment ContributorA Computer 3802 and ContributorB Computer 3804 each connect to Server 3812. ContributorA Computer 3802 connects to Server 3812 through Network 3810. ContributorB Computer 3804 connects to Server 3812 through Network 3810. ContributorA Computer 3802 is used by an entity known as ContributorA that is a contributor to Storage Object 3824. ContributorB Computer 3804 is used by an entity known as ContributorB that is a contributor to Storage Object 3824. ContributorA and ContributorB each are entities associated with both Storage Object 3824. Server 3812 connects to Storage Server 3822 through network 3810. In some embodiments Server 3812 connects to Storage Server 3822 through a network other than Network 3810. Communication between ContributorA Computer 3802 and Storage Server 3822 is achieved through Server 3812. Communication between ContributorB Computer 3804 and Storage Server 3822 is achieved through Server 3812. In an alternate embodiment both ContributorA Computer 3802 and ContributorB Computer 3804 are able to communicate with Storage Server 3822 without going through Server 3812 (e.g., by communicating directly through Network 3810).

Network 3810 may be the Internet or some other network. ContributorA Computer 3802, ContributorB Computer 3804, and Server 3812 can each communicate bi-directionally with one another. Storage Server 3822 can communicate bi-directionally with Server 3812. Server 3812 includes Memory 3813 and CPU 3816. Though depicted as one entity in the figure, in some embodiments Server 3812 comprises one or more separate servers, located in one or more physical locations. Memory 3813 includes System Code 3817. CPU (central processing unit) 3816 accesses Memory 3813 and executes System Code 3817 therein to facilitate the operation of Storage Object 3824 held on Storage Server 3822. System Code 3817 includes instructions to facilitate the operation of Storage Object 3824. In some embodiments System Code 3817 exists as the system to facilitate the operation of Storage Object 3824. In some embodiments System Code 3817 exists in part within Memory 3813 and in part in other memory (e.g., other memory within a computer other than Server 3812, other memory within Server 3812 not depicted in the figure, Memory 3823 existing on Storage Server 3822, etc.). In some embodiments System Code 3817 contains some or all of the instructions to provide a website, application, or app that allows ContributorA (e.g., through the use of ContributorA Computer 3802) and ContributorB (e.g., through the use of ContributorB Computer 3804) to access Storage Object 3824. In some embodiments System Code 3817 contains instructions to provide notifications (e.g., email, text messages, instant messages, etc.) to ContributorA (e.g., through the use of ContributorA Computer 3802) and ContributorB (e.g., through the use of ContributorB Computer 3804) related to Storage Object 3824. In some embodiments System Code 3817 contains instructions to handle at least part of the billing related to entities' access to Storage Object 3824 and. In some embodiments System Code 3817 contains instructions to handle at least part of the billing related to entities' access to the interface to access Storage Object 3824 (e.g., a website, application, app, etc.). In some embodiments System Code 3817 comprises or is part of an online social network. In some embodiments System Code 3817 is implemented as part of a file sharing system that does not always require the use of storage objects (e.g., a system that allows users of the system to share or exchange files with one another without the use of storage objects, a system that allows users of the system to store files on network servers without the use of storage objects, etc.). In some embodiments System Code 3817 is software installed on Server 3812. In some embodiments System Code 3817 is provided to Server 3812 by ContributorA Computer 3802 or ContributorB Computer 3804. In some embodiments file contributions provided to Storage Object 3824 are held in Memory 3823. In some embodiments file contributions provided to Storage Object 3824 are held in Memory 3813. In some embodiments file contributions provided to Storage Object 3824 are held in computer memory other than Memory 3813 and Memory 3823 (e.g. on other servers such as cloud servers).

Though depicted as one entity in the figure, in some embodiments Storage Server 3822 comprises one or more separate servers, located in one or more physical locations. In some embodiments Storage Server 3822 is not controlled by the same entity that controls Server 3812. In some embodiments Storage Server 3822 is a cloud storage server (e.g., as made commercially available through cloud storage service, a privately owned cloud storage server, etc.). In some embodiments ContributorA and/or ContributorB are not provided with information on the identity of the entity that controls Storage Server 3822. Storage Server 3822 contains Memory 3823 and CPU 3826. CPU (central processing unit) 3826 accesses Memory 3823 and executes instructions therein to facilitate the operation of Storage Object 3824. In an alternate embodiment Storage Server 3822 does not have CPU 3826. In such an embodiment Server 3812 may access Memory 3823 through Network 3810 (e.g., through the use of CPU 3816). Memory 3823 contains Storage Object 3824. Though depicted as existing entirely within Memory 3823, in some embodiments Storage Object 3824 exists in part in Memory 3823 and in part in other memory (e.g., other memory within a computer other than Storage Server 3822, other memory within Storage Server 3822 not depicted in the figure, Memory 3813 within Server 3812, etc.). It should be appreciated that, though the figure illustrates one storage object in Memory 3823 (Storage Object 3824), in some embodiments there will be a different number of storage objects within Memory 3823 (e.g., two or more).

In some embodiments System Code 3817 receives or accesses the state of Storage Object 3824 and provides the state of Storage Object 3824 to other computers (e.g., to ContributorA Computer 3802 through Network 3810, to ContributorB Computer 3804 through Network 3810). In some embodiments System Code 3817 provides the functionality to process inputs to Storage Object 3824 (e.g., by receiving inputs from ContributorA Computer 3802 and ContributorB Computer 3804 and providing them to Storage Server 3822 through Network 3810). In some embodiments System Code 3817 provides instructions to process outputs from Storage Object 3824. For example, in some embodiments System Code 3817 includes instructions for making information held in Storage Object 3824 available to other entities through their computers (e.g., by receiving outputs from Storage Server 3822 and providing them to ContributorA Computer 3802, ContributorB Computer 3804, etc.) through a website, application, app, etc.

Storage Object 3824 receives one or more file contribution from ContributorA Computer 3802. Storage Object 3824 receives one or more file contribution from ContributorB Computer 3804. Each of these file contributions are stored in memory. In some embodiments these file contributions are stored in Memory 3813. In some embodiments these file contributions are stored in Memory 3823. According to rules concerning the operation of Storage Object 3824 (e.g., according to rules attributes for Storage Object 3824) one or more of the file contributions from ContributorA Computer 3802 and one or more of the file contributions from ContributorB Computer 3804 will be made available to entities associated with Storage Object 3824. For example, upon the satisfaction of certain requirements (e.g., as indicated in rules attributes for Storage Object 3824) file contributions made to Storage Object 3824 are made available and/or provided to one or more of ContributorA (through the use of ContributorA Computer 3802) and ContributorB (through the use of ContributorB Computer 3804).

Figure 39:
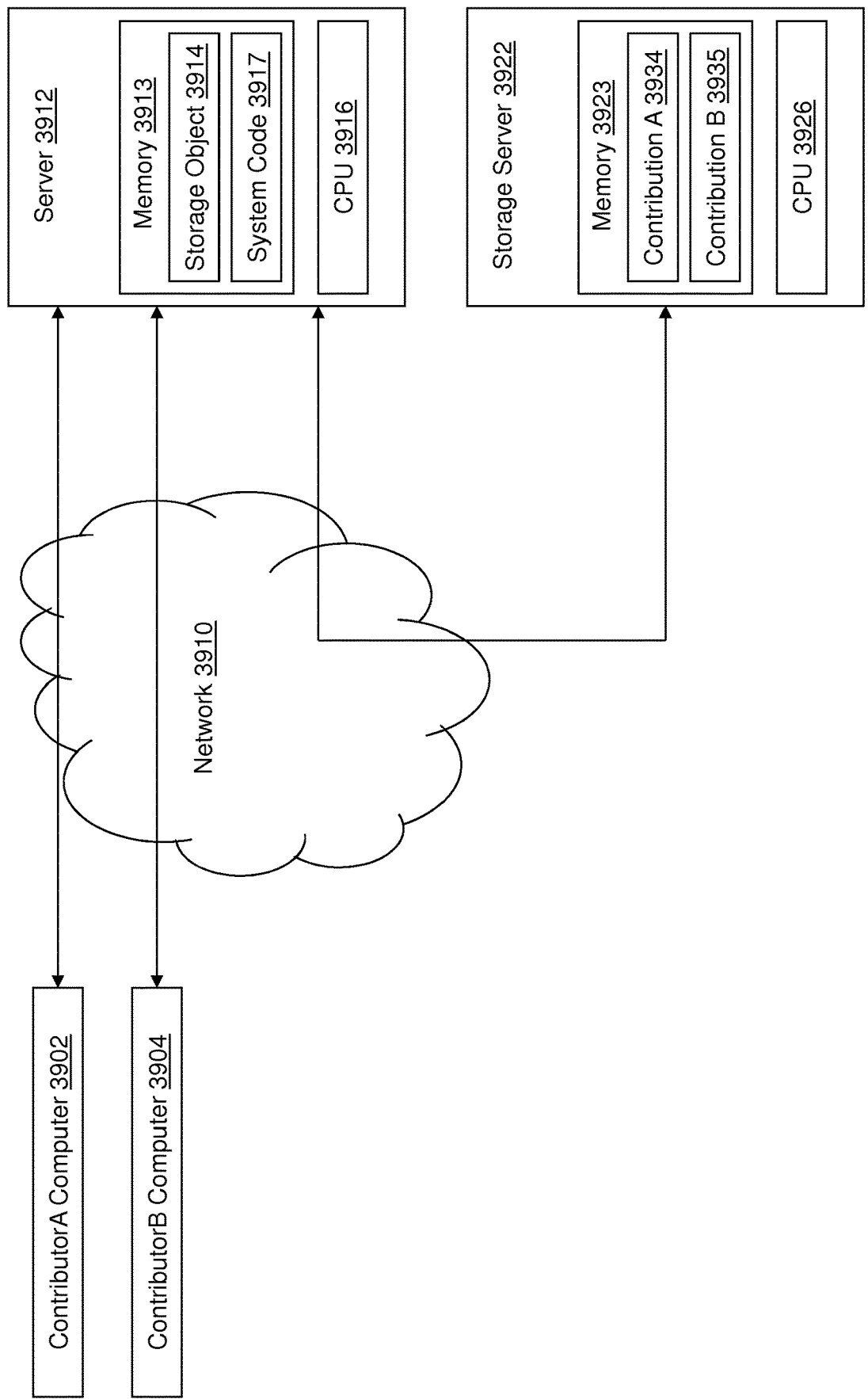
FIG. 39 is a block diagram depicting a system for use in some embodiments of the invention wherein system code for facilitating the operation of storage objects as well as a storage object is held in memory on a server and wherein file contributions are held in memory on a storage server.

FIG. 39 is a block diagram depicting a system for use in some embodiments of the invention wherein system code for facilitating the operation of storage objects as well as a storage object is held in memory on a server and wherein file contributions are held in memory on a storage server. In a network environment ContributorA Computer 3902 and ContributorB Computer 3904 each connect to Server 3912. ContributorA Computer 3902 connects to Server 3912 through Network 3910. ContributorB Computer 3904 connects to Server 3912 through Network 3910. ContributorA Computer 3902 is used by an entity known as ContributorA that is a contributor to Storage Object 3914. ContributorB Computer 3904 is used by an entity known as ContributorB that is a contributor to Storage Object 3914. ContributorA and ContributorB each are each entities associated with both Storage Object 3914. Server 3912 connects to Storage Server 3922 through network 3910. In some embodiments Server 3912 connects to Storage Server 3922 through a network other than Network 3910. Communication between ContributorA Computer 3902 and Storage Server 3922 is achieved through Server 3912. Communication between ContributorB Computer 3904 and Storage Server 3922 is achieved through Server 3912. In an alternate embodiment both ContributorA Computer 3902 and ContributorB Computer 3904 are able to communicate with Storage Server 3922 without going through Server 3912 (e.g., by communicating directly through Network 3910).

Network 3910 may be the Internet or some other network. ContributorA Computer 3902, ContributorB Computer 3904, and Server 3912 can each communicate bi-directionally with one another. Storage Server 3922 can communicate bi-directionally with Server 3912. Server 3912 includes Memory 3913 and CPU 3916. Memory 3913 may be or may comprise a non-transitory computer readable medium. Though depicted as one entity in the figure, in some embodiments Server 3912 comprises one or more separate servers, located in one or more physical locations. Memory 3913 includes System Code 3917 and Storage Object 3914. CPU (central processing unit) 3916 accesses Memory 3913 and executes System Code 3917 therein to facilitate the operation of Storage Object 3914. System Code 3917 includes instructions to facilitate the operation of Storage Object 3914. In some embodiments System Code 3917 exists as the system to facilitate the operation of Storage Object 3914. In some embodiments System Code 3917 exists in part within Memory 3913 and in part in other memory (e.g., other memory within a computer other than Server 3912, other memory within Server 3912 not depicted in the figure, Memory 3923 existing on Storage Server 3922, etc.). In some embodiments System Code 3917 contains some or all of the instructions to provide a website, application, or app that allows ContributorA (e.g., through the use of ContributorA Computer 3902) and ContributorB (e.g., through the use of ContributorB Computer 3904) to access Storage Object 3914. In some embodiments System Code 3917 contains instructions to provide notifications (e.g., email, text messages, instant messages, etc.) to ContributorA (e.g., through the use of ContributorA Computer 3902) and ContributorB (e.g., through the use of ContributorB Computer 3904) related to Storage Object 3914. In some embodiments System Code 3917 contains instructions to handle at least part of the billing related to entities' access to Storage Object 3914 and. In some embodiments System Code 3917 contains instructions to handle at least part of the billing related to entities' access to the interface to access Storage Object 3914 (e.g., a website, application, app, etc.). In some embodiments System Code 3917 comprises or is part of an online social network. In some embodiments System Code 3917 is implemented as part of a file sharing system that does not always require the use of storage objects (e.g., a system that allows users of the system to share or exchange files with one another without the use of storage objects, a system that allows users of the system to store files on network servers without the use of storage objects, etc.). In some embodiments System Code 3917 is software installed on Server 3912. In some embodiments System Code 3917 is provided to Server 3912 by ContributorA Computer 3902 or ContributorB Computer 3904. File contributions provided to Storage Object 3914 are held in Memory 3923. For example, Contribution A 3934 is a file contribution provided to Storage Object 3914 from Contributor A. Contribution A 3934 is held in Memory 3923 on Storage Server 3922. For example, Contribution B 3935 is a file contribution provided to Storage Object 3914 from Contributor B. Contribution B 3935 is held in Memory 3923 on Storage Server 3922

Though depicted as one entity in the figure, in some embodiments Storage Server 3922 comprises one or more separate servers, located in one or more physical locations. In some embodiments Storage Server 3922 is not controlled by the same entity that controls Server 3912. In some embodiments Storage Server 3922 is a cloud storage server (e.g., as made commercially available through cloud storage service, a privately owned cloud storage server, etc.). In some embodiments ContributorA and/or ContributorB are not provided with information on the identity of the entity that controls Storage Server 3922. Storage Server 3922 contains Memory 3923 and CPU 3926. In an alternate embodiment Storage Server 3922 does not have CPU 3926. In such an embodiment Server 3912 may access Memory 3923 through Network 3910 (e.g., through the use of CPU 3916). Memory 2923 contains Contribution A 3934 and Contribution B 3935. Though depicted as existing entirely within Memory 3923, in some embodiments Contribution A 3934 and/or Contribution B 3935 exist in part in Memory 3923 and in part in other memory (e.g., other memory within a computer other than Storage Server 3922, other memory within Storage Server 3922 not depicted in the figure, Memory 3913 within Server 3912, etc.). It should be appreciated that, though the figure illustrates two contributions in Memory 3923 (Contribution A 3934 and Contribution B 3935), in some embodiments there will be a different number of storage objects within Memory 3923 (e.g., three or more).

In some embodiments System Code 3917 receives or accesses the state of Storage Object 3914 and provides the state of Storage Object 3914 to other computers (e.g., to ContributorA Computer 3902 through Network 3910, to ContributorB Computer 3904 through Network 3910). In some embodiments System Code 3917 provides the functionality to process inputs to Storage Object 3914 (e.g., by receiving inputs from ContributorA Computer 3902 and ContributorB Computer 3904 and providing them to Storage Server 3922 through Network 3910). In some embodiments System Code 3917 provides instructions to process outputs from Storage Object 3914. For example, in some embodiments System Code 3917 includes instructions for making information held in Storage Object 3914 or held in Memory 3923 (e.g., Contribution A 3934, Contribution B 3935, etc.) available to other entities through their computers (e.g., by receiving outputs from Storage Server 3922 and providing them to ContributorA Computer 3902, ContributorB Computer 3904, etc.) through a website, application, app, etc.

Storage Object 3914 receives one or more file contribution from ContributorA Computer 3902. Storage Object 3914 receives one or more file contribution from ContributorB Computer 3904. Each of these file contributions are stored in Memory 3923 on Storage Server 3922 (e.g., through the execution of instructions from System Code 3917). According to rules concerning the operation of Storage Object 3914 (e.g., according to rules attributes for Storage Object 3914) one or more of the file contributions from ContributorA Computer 3902 (e.g., Contribution A 3934) and one or more of the file contributions from ContributorB Computer 3904 (e.g., Contribution B 3935) will be made available to entities associated with Storage Object 3914. For example, upon the satisfaction of certain requirements (e.g., as indicated in rules attributes for Storage Object 3914) file contributions made to Storage Object 3914 are made available and/or provided to one or more of ContributorA (through the use of ContributorA Computer 3902) and ContributorB (through the use of ContributorB Computer 3904).

Figure 40:
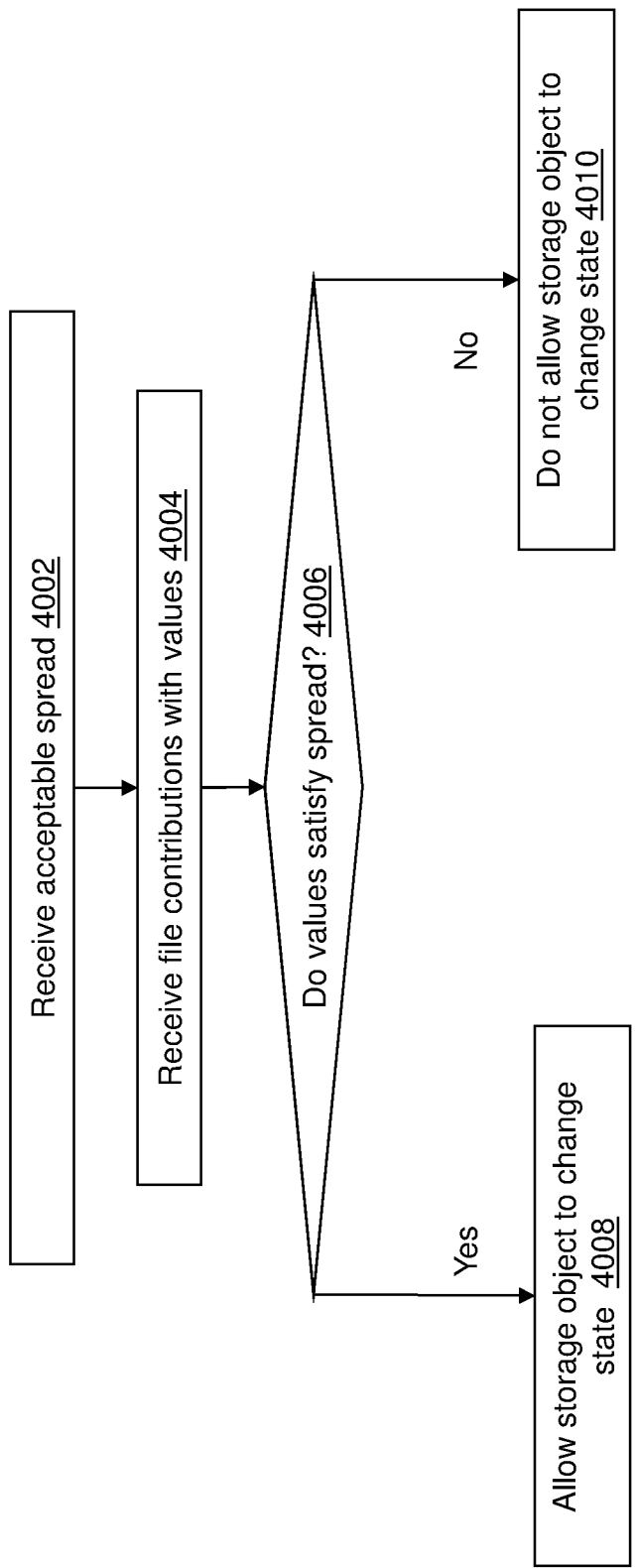
FIG. 40 is a flowchart of a method used in conjunction with a simultaneous file exchange in some embodiments of the invention where an acceptable spread is received by the system.

FIG. 40 is a flowchart of a method used in conjunction with a simultaneous file exchange in some embodiments of the invention where an acceptable spread is received by the system. Particularly, the embodiment depicted in FIG. 40 concerns files provided to the system facilitating the operation of a storage object, where the files contain information in the form of a value. The files are provided to the system facilitating the operation of the storage object by contributors to the storage object.

In some embodiments the files contain information in the form of a value that is expressed numerically. In some embodiments a value expressed numerically represents a measurable quantity (e.g., a monetary amount, a length of time, an age, a representation of a physical dimension, a representation of a speed, a quality indicator, a rating, etc.). In some embodiments the value is not expressed numerically. For example, in some embodiments where the value is not expressed numerically, the value is expressed as a quality indicator or a rating (e.g., "fair", "good", excellent). For example, in some embodiments where the value is not expressed numerically, a value is expressed as a decision (e.g., "Yes", "No", "Maybe", "Sometimes", etc.). For example, in some embodiments where the value is not expressed numerically, a value is expressed as an opinion or evaluation (e.g., "sufficient", "insufficient"). For example, in some embodiments where the value is not expressed numerically, a value is expressed in a form so as to correspond to a numerical value (e.g., the symbol "A" corresponds to the number "1", etc.).

The system receives an acceptable spread (block 4002). The spread is received from one or more contributor to a storage object. In some embodiments the spread is provided to or made accessible to one or more of the contributors to a storage object. In some embodiments the spread is not provided to and not made available to one or more of the contributors to a storage object. In some embodiments the spread is provided to or made known to a contributor to a storage object only upon a certain event (e.g., the step of (block 4004) described below occurring, the step of (block 4006) described below occurring, etc.)

In some embodiments the spread represents a maximum or minimum difference between values, where the spread is used for thresholding purposes. For example, where the information provided to the system in the file contributions is numerical, the spread may represent the maximum difference between the values that can exist where the files are still allowed to be exchanged. For example, where the information provided to the system in the file contributions is numerical, the spread may represent the minimum difference between the values that can exist where the files are allowed to be exchanged. Information on the spread may be implemented as an attribute of a storage object (e.g., within the rules attribute for the storage object). Information on the spread may be provided at the time a storage object is created by one or more entity associated with the storage object (e.g., through the use of an interface similar to screen 700 as depicted and discussed in connection with FIG. 7). By way of example, where the spread is set as "greater than or equal to $500" and where the values in the files represent monetary amounts, the two contributors would have to provide monetary amounts in their files that differed by at least $500 in order for the file exchange to be allowed.

For example, where the information provided to the system in the file contributions is not numerical, the spread may represent the extent to which a difference between the values can exist such that the files are allowed to be exchanged or are not allowed to be exchanged. By way of example, where the spread is set as "some difference" and where the values in the files represent a "Yes" or "No" decision, two contributors would have to each provide differing values (e.g., one provides "Yes" and the other provides "No") in their files in order for a file exchange between them to be allowed. By way of example, where the spread is set as "at least two gradation levels difference" and where the values in the files represent a rating with possible values of "poor", "average", and "excellent", where the values are ordered as indicated, the two contributors would have to provide values in their files that had two gradation levels of difference between them in order for the file exchange to be allowed. In this particular example it follows that the simultaneous files exchange would be allowed only when one contributor provided the value "poor" and the other party provided the value "excellent" (since these values are separated by two gradation levels, which is required by the spread).

The system receives file contributions with values (block 4004). The system then determines whether the values satisfy the spread (block 4006). The determination is made by comparing the values provided in the file contributions and evaluating whether the criteria required by the spread is met given that comparison. This determination may be made as part of a larger determination the system makes of whether or not to make the files available to the parties in a simultaneous file exchange.

If the values do satisfy the spread the files are allowed to be exchanged (block 4008). If the values do not satisfy the spread the files are not allowed to be exchanged (block 4010).

FIG. 41 is a diagram depicting actions taken with a system facilitating the operation of a storage object wherein a storage object receives an acceptable spread and determines if values in received file contributions allow the storage object to change state. In some embodiments a storage object begins in a state with the value "Locked", where when the state changes from "Locked" to "Unlocked" the system facilitating the operation of the storage object performs a simultaneous file exchange by providing file contributions made to the storage object to some or all of the entities associated with the storage object (e.g., entities that are contributors to the storage object, entities associated with the storage object that are non-contributors to the storage object).

Contributor A 4102A and Contributor B 4102B are both entities that are contributors to a storage object. System 4102C is a system facilitating the operation of the storage object that Contributor A 4102A and Contributor B 4102B are contributors to. In the example given by FIG. 41, at 08:00 Contributor A 4102A provides the acceptable spread with a value of "less than $50" (4104A). System 4102C receives the acceptable spread of "less than $50" (4104C). Information on the value of the spread may be provided from Contributor A 4102A to System 4102C in the form of or as part of a file, for example. Though both the actions (4104A) and (4104C) are shown to occur at approximately 08:00, action (4104A) necessarily precedes action (4104C) in the example. However, the two actions may take place at close to the same time. At 09:00 Contributor A 4102A makes a file contribution to the storage object with a value of $275 (4106A). System 4102C receives the file contribution from Contributor A with the value of $275 (4106C). Though both the actions (4106A) and (4106C) are shown to occur at approximately 09:00, action (4106A) necessarily precedes action (4106C) in the example. However, the two actions may take place at close to the same time. At 10:00 Contributor B 4102B makes a file contribution to the storage object with a value of $200 (block 4108B). System 4102C receives the file contribution from Contributor B with the value of $200, determines that the values provided by the file contributions do not satisfy the spread, and does not allow the storage object to change state (4108C). The determination that the values provided by the file contributions do not satisfy the spread occurs, for example, by first comparing the values found in the contributions and then comparing that information to the information on the spread. The values from the file contributions are compared by finding the difference between the value of the contribution of Contributor A 4102A ($275) and the value of the contribution of Contributor B 4102B ($200). The resulting difference of $75 is then compared to the value of the spread, which has a value of "less than $50". Since the difference of the values found in the contributions does not satisfy the spread the storage object is not allowed to change state. Though both the actions (4108B) and (4108C) are shown to occur at approximately 10:00, action (4108B) necessarily precedes action (4108C) in the example. However, the two actions may take place at close to the same time. The method for determining the above described system behavior is depicted and discussed in connection with FIG. 40.

FIG. 42 is a diagram depicting actions taken with a system facilitating the operation of a storage object wherein a storage object receives an acceptable spread and determines if values in received file contributions allow the storage object to change state. In some embodiments a storage object begins in a state with the value "Locked", where when the state changes from "Locked" to "Unlocked" the system facilitating the operation of the storage object performs a simultaneous file exchange by providing file contributions made to the storage object to each of the entities associated with the storage object (e.g., entities that are contributors to the storage object, entities associated with the storage object that are non-contributors to the storage object).

Contributor A 4202A and Contributor B 4202B are both entities that are contributors to a storage object. System 4202C is a system facilitating the operation of the storage object that Contributor A 4202A and Contributor B 4202B are contributors to. In the example given by FIG. 42, at 08:00 Contributor A 4202A provides the acceptable spread with a value of "less than $50" (4204A). System 4202C receives the acceptable spread of "less than $50" (4204C). Information on the value of the spread may be provided from Contributor A 4202A to System 4202C in the form of or as part of a file, for example. Though both the actions (4204A) and (4204C) are shown to occur at approximately 08:00, action (4204A) necessarily precedes action (4204C) in the example. However, the two actions may take place at close to the same time. At 09:00 Contributor A 4202A makes a file contribution to the storage object with a value of $275 (4206A). System 4202C receives the file contribution from Contributor A with the value of $275 (4206C). Though both the actions (4206A) and (4206C) are shown to occur at approximately 09:00, action (4206A) necessarily precedes action (4206C) in the example. However, the two actions may take place at close to the same time. At 10:00 Contributor B 4202B makes a file contribution to the storage object with a value of $250 (block 4208B). System 4202C receives the file contribution from Contributor B with the value of $250, determines that the values provided by the file contributions satisfy the spread, and allows the storage object to change state (4208C). The determination that the values provided by the file contributions satisfy the spread occurs by first comparing the values found in the contributions and then comparing that information to the information on the spread. The values from the file contributions are compared by finding the difference between the value of the contribution of Contributor A 4202A ($275) and the value of the contribution of Contributor B 4202B ($250). The resulting difference of $25 is then compared to the value of the spread, which has a value of "less than $50". Since the difference of the values found in the contributions satisfies the spread the storage object is allowed to change state. Though both the actions (4208B) and (4208C) are shown to occur at approximately 10:00, action (4208B) necessarily precedes action (4208C) in the example. However, the two actions may take place at close to the same time. The method for determining the above described system behavior is depicted and discussed in connection with FIG. 40.

FIG. 43 is a diagram depicting actions taken with a system facilitating the operation of a storage object wherein a storage object receives an acceptable spread and determines if values in received file contributions allow the storage object to change state. In some embodiments a storage object begins in a state with the value "Locked", where when the state changes from "Locked" to "Unlocked" the system facilitating the operation of the storage object performs a simultaneous file exchange by providing file contributions made to the storage object to each of the entities associated with the storage object (e.g., entities that are contributors to the storage object, entities associated with the storage object that are non-contributors to the storage object).

Contributor A 4302A and Contributor B 4302B are both entities that are contributors to a storage object. System 4302C is a system facilitating the operation of the storage object that Contributor A 4302A and Contributor B 4302B are contributors to. In the example given by FIG. 43, at 08:00 Contributor A 4302A provides the acceptable spread with a value of "greater than $50" (4304A). System 4302C receives the acceptable spread of "greater than $50" (4304C). Information on the value of the spread may be provided from Contributor A 4302A to System 4302C in the form of or as part of a file, for example. Though both the actions (4304A) and (4304C) are shown to occur at approximately 08:00, action (4304A) necessarily precedes action (4304C) in the example. However, the two actions may take place at close to the same time. At 09:00 Contributor A 4302A makes a file contribution to the storage object with a value of $275 (4306A). System 4302C receives the file contribution from Contributor A with the value of $275 (4306C). Though both the actions (4306A) and (4306C) are shown to occur at approximately 09:00, action (4306A) necessarily precedes action (4306C) in the example. However, the two actions may take place at close to the same time. At 10:00 Contributor B 4302B makes a file contribution to the storage object with a value of $200 (block 4308B). System 4302C receives the file contribution from Contributor B with the value of $200, determines that the values provided by the file contributions satisfy the spread, and allows the storage object to change state (4308C). The determination that the values provided by the file contributions satisfy the spread occurs by first comparing the values found in the contributions and then comparing that information to the information on the spread. The values from the file contributions are compared by finding the difference between the value of the contribution of Contributor A 4302A ($275) and the value of the contribution of Contributor B 4302B ($200). The resulting difference of $75 is then compared to the value of the spread, which has a value of "greater than $50". Since the difference of the values found in the contributions satisfies the spread the storage object is allowed to change state. Though both the actions (4308B) and (4308C) are shown to occur at approximately 10:00, action (4308B) necessarily precedes action (4308C) in the example. However, the two actions may take place at close to the same time. The method for determining the above described system behavior is depicted and discussed in connection with FIG. 40.

FIG. 44 is a diagram depicting actions taken with a system facilitating the operation of a storage object wherein a storage object receives an acceptable spread and determines if values in received file contributions allow the storage object to change state. In some embodiments a storage object begins in a state with the value "Locked", where when the state changes from "Locked" to "Unlocked" the system facilitating the operation of the storage object performs a simultaneous file exchange by providing file contributions made to the storage object to each of the entities associated with the storage object (e.g., entities that are contributors to the storage object, entities associated with the storage object that are non-contributors to the storage object).

Contributor A 4402A and Contributor B 4402B are both entities that are contributors to a storage object. System 4402C is a system facilitating the operation of the storage object that Contributor A 4402A and Contributor B 4402B are contributors to. In the example given by FIG. 44, at 08:00 Contributor A 4402A provides the acceptable spread with a value of "greater than $50" (4404A). System 4402C receives the acceptable spread of "greater than $50" (4404C). Information on the value of the spread may be provided from Contributor A 4402A to System 4402C in the form of or as part of a file, for example. Though both the actions (4404A) and (4404C) are shown to occur at approximately 08:00, action (4404A) necessarily precedes action (4404C) in the example. However, the two actions may take place at close to the same time. At 09:00 Contributor A 4402A makes a file contribution to the storage object with a value of $275 (4406A). System 4402C receives the file contribution from Contributor A with the value of $275 (4406C). Though both the actions (4406A) and (4406C) are shown to occur at approximately 09:00, action (4406A) necessarily precedes action (4406C) in the example. However, the two actions may take place at close to the same time. At 10:00 Contributor B 4402B makes a file contribution to the storage object with a value of $250 (block 4408B). System 4402C receives the file contribution from Contributor B with the value of $250, determines that the values provided by the file contributions do not satisfy the spread, and does not allow the storage object to change state (4408C). The determination that the values provided by the file contributions do not satisfy the spread occurs by first comparing the values found in the contributions and then comparing that information to the information on the spread. The values from the file contributions are compared by finding the difference between the value of the contribution of Contributor A 4402A ($275) and the value of the contribution of Contributor B 4402B ($250). The resulting difference of $25 is then compared to the value of the spread, which has a value of "greater than $50". Since the difference of the values found in the contributions does not satisfy the spread the storage object is not allowed to change state. Though both the actions (4408B) and (4408C) are shown to occur at approximately 10:00, action (4408B) necessarily precedes action (4408C) in the example. However, the two actions may take place at close to the same time. The method for determining the above described system behavior is depicted and discussed in connection with FIG. 40.

It should be appreciated that in discussions of FIG. 40-FIG. 44 above, the values provided in the file contributions that are compared and measured against the spread may be arbitrarily complex. For example, a contributor may submit in a single file with payment information that takes the form of a payment schedule that specifies an amount of a lump sum payment, a continuing payment, and the time and amount of each. Together the entirety of the payment information comprises a value to be compared. As such, the logic to determine if the information in multiple files satisfy a threshold may be arbitrarily complex. This allows with values combining multiple inputs (e.g., lump sum payments, continuing payments, the timing payments, etc.) to be compared.

By way of example, using the framework above, the threshold provided to the system facilitating the operation of a storage object may be that the total sum of all payments must differ by "less than $2,000". Consider that a first contributor provides a file with a payment schedule that specifies a $10,000 lump sum payment on Jan. 1, 2019 and continuing payments of $5,000 on January 1 of each of the following four years. Consider that a second contributor provides a file with a payment schedule that specifies a $20,000 lump sum payment on Jun. 1, 2019 and continuing payments of $1,000 on the first of the month for each of the following five months. The total sum of all payments in the file the first contributor provided is $30,000 ($10,000 lump sum payment and four continuing payments of $5,000 each). The total sum of all payments in the file the second contributor provided is $25,000 ($20,000 lump sum payment and five continuing payments of $1,000 each). The difference between the two values (where the value is the total sum of all payments) is $5,000 ($30,000-$25,000). This figure does not satisfy the spread, which required that the total sum of all payments must differ by "less than $2,000". As such, in this example the storage object would not be allowed to change state from "Locked" to "Unlocked" (i.e., the simultaneous file exchange would not occur).

Example Computer System

FIG. 14 is a depiction of an example computer system for use with some embodiments of the invention. Embodiments of a system for exchanging electronic information as described herein may be executed on one or more computer systems, which may interact with various other devices. One such computer system is illustrated in FIG. 14. In different embodiments, computer system 1400 may be any of various types of devices, including, but not limited to, a personal computer system, desktop computer, laptop computer, notebook computer, netbook computer, mainframe computer system, handheld computer, tablet computer, workstation, network computer, camera, set top box, mobile device (e.g., a mobile phone, a tablet, a handheld computer, a wearable computer), video game console, handheld video game device, application server, wearable computer, computer implanted in a human body, storage device, a peripheral device such as a switch, modem, router, or in general any type of computing or electronic device.

In the illustrated embodiment, computer system 1400 includes one or more processors 1401 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some embodiments multiple instances of computer system 1400 are implemented, or multiple nodes making up computer system 1400, are implemented. For example, in some embodiments some elements may be implemented via one or more nodes of computer system 1400 that are distinct from those nodes implementing other elements.

In some embodiments, computer system 1400 may be a uniprocessor system including one processor 1401, or a multiprocessor system including several processors 1401 (e.g., two, four, eight, or another suitable number). Processors 1401 may be any suitable processor capable of executing instructions. For example, in some embodiments, processors 1401 may be general-purpose or embedded processors implementing any of a variety of instruction set architectures (ISAs), such as the x86, PowerPC, SPARC, or MIPS ISAs, or any other suitable ISA. In multiprocessor systems, each of processors 1401 may commonly, but not necessarily, implement the same ISA.

In some embodiments, at least one processor 1401 may be a graphics processing unit. A graphics processing unit or GPU may be considered a dedicated graphics-rendering device for computing device. Modern GPUs may be efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1420 may be configured to store program instructions and/or data accessible by processor 1401. In various embodiments, system memory 1420 may be implemented using any suitable memory technology, such as static random access memory (SRAM), synchronous dynamic RAM (SDRAM), nonvolatile/Flash-type memory, or any other type of memory. System memory 1420 may be or may comprise non-transitory memory such that memory 1420 is a non-transitory computer readable medium. In the illustrated embodiment, program instructions and data implementing desired functions, such as those described above for embodiments of a module that makes use of one or more storage object for the exchange of electronic information, are shown stored within system memory 1420 as program instructions 1425 and data storage 1435, respectively. In some embodiments, program instructions and/or data may be received, sent or stored upon different types of computer-accessible media or on similar media separate from system memory 1420 or computer system 1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1401, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1401). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1401.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1425, configured to implement embodiments of a module that makes use of one or more storage object for the exchange of electronic information as described herein, and data storage 1435, comprising various data accessible by program instructions 1425. In one embodiment, program instructions 1425 may include software elements of embodiments of a module that makes use of one or more storage object for the exchange of electronic information as depicted and discussed in this specification. Data storage 1435 may include data that may be used in some embodiments. In other embodiments, other or different software elements and data may be included.

Those skilled in the art will appreciate that computer system 1400 is merely illustrative. In particular, the computer system and devices may include any combination of hardware or software that can perform the indicated functions. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

CONCLUSION

This specification includes references to "some embodiments". This phrase should be understood to mean "one or more embodiments". This phrase should not necessarily be understood to mean "less than all embodiments". The appearance of this phrase does not necessarily refer to the same embodiments at each instance. Particular features, structures, or characteristics may be combined in any suitable manner consistent with this disclosure across embodiments.

Any feature or combination of features described herein are included within the scope of the invention, provided that the features included in any such combination are not mutually inconsistent as will be apparent from the context, this specification, and the knowledge of one skilled in the art. For purposes of summarizing the invention, certain aspects, advantages and novel features of the invention are described herein. Of course, it is to be understood that not necessarily all such aspects, advantages or features will be embodied in any particular embodiment of the invention. Additional advantages and aspects of the invention are apparent from the figures, detailed description, and claims.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, for example, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the invention may be practiced with other computer system configurations.

Although specific embodiments have been described above, these embodiments are not intended to limit the scope of the invention, even where only a single embodiment is described with respect to a particular feature. Examples of features provided in the disclosure are intended to be illustrative rather than restrictive unless stated otherwise. The above description is intended to cover alternatives, modifications, and equivalents as would be apparent to a person skilled in the art having the benefit of this disclosure.

The scope of the present disclosure includes any feature or combination of features disclosed herein (either explicitly or implicitly), or any generalization thereof. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

Specific exemplary embodiments of the invention have been described with reference to the accompanying figures. This invention may, however, be embodied in many different forms and should not be construed as limited to the embodiments set forth herein. Rather, these embodiments have been provided so that this disclosure will convey the scope of the invention to those skilled in the art. It will be understood that two or more non-inconsistent embodiments of the invention as presented herein may be combined in whole or in part to form one or more additional embodiments within the scope of the invention.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof.

The invention may be embodied in hardware and/or in software (including firmware, resident software, microcode, etc.). Furthermore, the invention may take the form of a computer program product on a computer-usable or computer-readable storage medium having computer-usable or computer-readable code embodied in the medium for use by or in connection with an instruction execution system. In the context of this invention, a computer-usable or computer-readable medium may be any medium that can contain, store, communicate, propagate, and/or transport the program for use by or in connection with the instruction execution system, apparatus, or device.

It should also be noted that in some embodiments, the functions/acts noted in the blocks of the block diagrams/flowcharts may occur out of the order noted in the block diagram/flowcharts (and the accompanying descriptions thereof). For example, two blocks shown in succession may in fact be executed substantially concurrently or the blocks may sometimes be executed in the reverse order, depending upon the functionality/acts involved. Moreover, the functionality of a given block of the flowcharts/block diagrams may be separated into multiple blocks and/or the functionality of two or more blocks of the flowcharts/block diagrams may be at least partially integrated.

Additionally, it should be noted that although figures and embodiments list certain elements, attributes, features, etc., every such element, attribute, features, etc. is not required in any particular embodiment and the same may be used in other embodiments without specifically listing the same.

What is claimed is:

1. A method for enabling the simultaneous exchange of electronic information, comprising:
    creating a storage object based on information received from a first entity, the information received from the first entity including
        one or more attributes for said storage object provided by or selected by the first entity, and
        second entity information pertaining to a second entity;
    sending a notification to the second entity indicating that the storage object has been created;
    receiving one or more file contributions of the first entity for use with the storage object;
    receiving one or more file contributions of the second entity for use with the storage object;
    checking the one or more file contributions of the first entity made to the storage object against predetermined requirements pertaining at least to content for the one or more file contributions of the first entity made to the storage object;

checking the one or more file contributions of the second entity made to the storage object against the predetermined requirements pertaining at least to the content for the one or more file contributions of the second entity made to the storage object; and simultaneously sending or making available
from the storage object to the first entity, at least one of the one or more file contributions of the second entity, and
from the storage object to the second entity, at least one of the one or more file contributions of the first entity;

wherein the step of simultaneously sending or making available occurs
only on or after receipt of one or more file contributions from the first entity to the storage object and only on or after receipt of one or more file contributions from the second entity to the storage object, and
only after the one or more file contributions of the first entity made to the storage object are determined to satisfy the predetermined requirements and the one or more file contributions of the second entity made to the storage object are determined to satisfy the predetermined requirements, wherein the simultaneously sending or making available step is performed only with those one or more file contributions of the first entity made to the storage object that satisfy the predetermined requirements pertaining at least to the content for the one or more contributions of the first entity and only with those one or more file contributions of the second entity made to the storage object that satisfy the predetermined requirements pertaining at least to the content for the one or more contributions of the second entity, and wherein no portion of the content of the one or more file contributions from the first entity are made available to the second entity prior to the simultaneous sending or making available and no portion of the content of the one or more file contributions from the second entity are made available to the first entity prior to the simultaneous sending or making available.

2. The method of claim 1 wherein the step of simultaneously sending or making available comprises providing a single notification email to both the first entity and the second entity.

3. The method of claim 1 wherein the step of simultaneously sending or making available comprises providing a first notification email to the first entity and providing a second notification email to the second entity.

4. The method of claim 1 wherein the step of simultaneously sending or making available comprises:
making available to the first entity, at least one of the one or more file contributions of the second entity made to the storage object through a web interface or an app;
making available to the second entity, at least one of the one or more file contributions of the first entity made to the storage object through a web interface or an app.

5. The method of claim 1 wherein the predetermined requirements pertaining at least to content for the one or more file contributions of the first entity made to the storage object include one or more requirements pertaining to one or more of the following characteristics of a file: file size, file type, file extension, creation date, last modified date, author, content of the file, presence or absence of encryption of the file, presence or absence of metadata in the file.

6. The method of claim 1 wherein the step of simultaneously sending or making available comprises
simultaneously sending or making available
to the first entity, each of the one or more file contributions of the second entity made to the storage object, and
to the second entity, each of the one or more file contributions of the first entity made to the storage object.

7. The method of claim 1 further comprising:
one or both of the following:
providing notification to the first entity of the receipt of one or more file contributions of the second entity made to the storage object, wherein the step of providing notification to the first entity of the receipt of one or more file contributions of the second entity made to the storage object occurs only on or after receipt of one or more file contributions of the second entity for use with the storage object; and
providing notification to the second entity of the receipt of one or more file contributions of the first entity made to the storage object, wherein the step of providing notification to the second entity of the receipt of one or more file contributions of the first entity made to the storage object occurs only on or after receipt of one or more file contributions of the first entity for use with the storage object.

8. The method of claim 1 further comprising:
one or more of the following:
providing notification to the first entity that the one or more file contributions of the second entity made to the storage object are made available, wherein the step of providing notification to the first entity that the one or more file contributions of the second entity made to the storage object are made available occurs only upon or after the step of simultaneously sending or making available; and
providing notification to the second entity that the one or more file contributions of the first entity made to the storage object are made available, wherein the step of providing notification to the second entity that the one or more file contributions of the first entity made to the storage object are made available occurs only upon or after the step of simultaneously sending or making available.

9. The method of claim 1 wherein the step of simultaneously sending or making available occurs only on or after receipt of a confirmation that the first entity has made to the storage object all of the file contributions they intend to make and only on or after receipt of a confirmation that the second entity has made to the storage object all of the file contributions they intend to make.

10. The method of claim 1 wherein the information received from the first entity further includes third entity information pertaining to a third entity.

11. The method of claim 1 wherein the storage object exists on a computer that is not controlled by either of the first entity or the second entity.

12. The method of claim 1 wherein the storage object exists on a computer that is controlled by one or more of the first entity and the second entity.

13. The method of claim 1 wherein a part of the storage object is held on a first computer and another part of the storage object is held on a second computer.

14. The method of claim 1 wherein
  in addition to the first entity and in addition to the second entity, one or more non-contributing entities are associated with the storage object, and
  wherein no file contributions for use with the storage object are received from the one or more non-contributing entities.

15. A method for enabling the simultaneous exchange of electronic information, comprising:
  creating a storage object based on information received from a first entity, the information received from the first entity including
    one or more attributes for said storage object provided by or selected by the first entity, and
    second entity information pertaining to a second entity;
  sending a notification to the second entity indicating that the storage object has been created;
  receiving one or more file contributions of the first entity for use with the storage object;
  receiving one or more file contributions of the second entity for use with the storage object;
  checking the one or more file contributions of the first entity made to the storage object against predetermined requirements pertaining at least to content for the one or more file contributions of the first entity made to the storage object;
  checking the one or more file contributions of the second entity made to the storage object against the predetermined requirements pertaining at least to the content for the one or more file contributions of the second entity made to the storage object; and
    if any of the one or more file contributions of the first entity made to the storage object do not satisfy the predetermined requirements pertaining at least to the content for the one or more contributions of the first entity made to the storage object or if any of the one or more file contributions of the second entity made to the storage object do not satisfy the predetermined requirements pertaining at least to the content for the one or more contributions of the second entity made to the storage object, then not simultaneously sending or making available
      to the first entity, any of the one or more file contributions of the second entity made to the storage object, and
      to the second entity, any of the one or more file contributions of the first entity made to the storage object; and
    if all of the one or more file contributions of the first entity made to the storage object satisfy the predetermined requirements pertaining at least to the content for the one or more contributions of the first entity made to the storage object and all of the one or more file contributions of the second entity made to the storage object satisfy the predetermined requirements pertaining at least to the content for the one or more contributions of the second entity made to the storage object, then simultaneously sending or making available
      to the first entity, each of the one or more file contributions of the second entity made to the storage object, and
      to the second entity, each of the one or more file contributions of the first entity made to the storage object;
        wherein the step of simultaneously sending or making available occurs only on or after receipt of one or more file contributions from the first entity made to the storage object and only on or after receipt of one or more file contributions from the second entity made to the storage object,
    wherein the simultaneously sending or making available step is performed only with those one or more file contributions of the first entity made to the storage object that satisfy the predetermined requirements pertaining at least to the content for the one or more contributions of the first entity and only with those one or more file contributions of the second entity made to the storage object that satisfy the predetermined requirements pertaining at least to the content for the one or more contributions of the second entity,
    and wherein no portion of the content of the one or more file contributions from the first entity are made available to the second entity prior to the simultaneous sending or making available and no portion of the content of the one or more file contributions from the second entity are made available to the first entity prior to the simultaneous sending or making available.

16. A method for enabling the simultaneous exchange of electronic information comprising:
  creating a storage object to receive one or more electronic contributions of a first entity and one or more electronic contributions of a second entity, the storage object having a predefined expiration time before which the one or more electronic contributions of the first entity and the one or more electronic contributions of the second entity must be received at the storage object;
  sending a notification to one or more of the first entity and the second entity that the storage object has been created;
  receiving at the storage object, prior to the predefined expiration time, the one or more electronic contributions of the first entity and the one or more electronic contributions of the second entity; and
  at or after the predefined expiration time, and only if one or more electronic contributions have been received at the storage object from the first entity that satisfy one or more requirements pertaining at least to the content for the one or more contributions of the first entity made to the storage object and one or more electronic contributions have been received from the second entity that satisfy one or more requirements pertaining at least to the content for the one or more contributions of the second entity made to the storage object, simultaneously sending or making available to
    the first entity, at least one of the one or more electronic contributions of the second entity made to the storage object, and
    the second entity, at least one of the one or more electronic contributions of the first entity made to the storage object,
  wherein the simultaneously sending or making available step is performed only with those one or more file contributions of the first entity made to the storage object that satisfy the predetermined requirements pertaining at least to the content for the one or more contributions of the first entity and only with those one or more file contributions of the second entity made to the storage object that satisfy the predetermined requirements pertaining at least to the content for the one or more contributions of the second entity, and wherein no portion of the content of the one or more file contributions from the first entity are made available to the second entity prior to the simultaneous sending or making available and no portion of the content of the one or more file contributions from the second entity are made available to the first entity prior to the simultaneous sending or making available.

17. The method of claim 16 further comprising:

checking the one or more electronic contributions of the first entity made to the storage object against predetermined requirements pertaining at least to the content for the one or more contributions of the first entity made to the storage object;

checking the one or more electronic contributions of the second entity made to the storage object against the predetermined requirements pertaining at least to the content for the one or more contributions of the second entity made to the storage object; and if any of the one or more electronic contributions of the first entity made to the storage object do not satisfy the predetermined requirements pertaining at least to the content for the one or more contributions of the first entity made to the storage object or if any of the one or more electronic contributions of the second entity made to the storage object do not satisfy the predetermined requirements pertaining at least to the content for the one or more contributions of the second entity made to the storage object, then performing the simultaneously sending or making available step only with those one or more electronic contributions of the first entity made to the storage object that satisfy the predetermined requirements pertaining at least to the content for the one or more contributions of the first entity made to the storage object and those one or more electronic contributions of the second entity made to the storage object that satisfy the predetermined requirements pertaining at least to the content for the one or more contributions of the second entity made to the storage object.

18. The method of claim 16 further comprising:

checking the one or more electronic contributions of the first entity made to the storage object against predetermined requirements pertaining at least to the content for the one or more contributions of the first entity made to the storage object;

checking the one or more electronic contributions of the second entity made to the storage object against the predetermined requirements pertaining at least to the content for the one or more contributions of the second entity made to the storage object; and performing the simultaneously sending or making available step only upon or after each of the one or more electronic contributions of the first entity made to the storage object has been determined to satisfy the predetermined requirements pertaining at least to the content for the one or more contributions of the first entity made to the storage object and each of the one or more electronic contributions of the second entity made to the storage object has been determined to satisfy the predetermined requirements pertaining at least to the content for the one or more contributions of the second entity made to the storage object.

19. The method of claim 16 wherein the one or more electronic contributions of the first entity made to the storage object are files and wherein the one or more electronic contributions of the second entity made to the storage object are files.

20. The method of claim 1 wherein the predetermined requirements pertaining at least to the content for the one or more file contributions of the first entity made to the storage object and the predetermined requirements pertaining at least to the content for the one or more file contributions of the second entity made to the storage object are the same requirements.

21. The method of claim 1 wherein the storage object ceases to exist after a predetermined time.

22. The method of claim 1 wherein the predetermined requirements pertaining at least to the content for the one or more file contributions of the first entity made to the storage object and the predetermined requirements pertaining at least to the content for the one or more file contributions of the second entity made to the storage object are provided by one or more of the first entity and the second entity.

* * * * *